United States Patent [19]

Suzuki

[11] Patent Number: 5,859,921
[45] Date of Patent: Jan. 12, 1999

[54] APPARATUS FOR PROCESSING AN IMAGE OF A FACE

[75] Inventor: Hiroyoshi Suzuki, Tokyo, Japan

[73] Assignee: Mitsubishi Denki Kabushiki Kaisha, Tokyo, Japan

[21] Appl. No.: 608,062

[22] Filed: Feb. 28, 1996

[30] Foreign Application Priority Data

May 10, 1995 [JP] Japan ................................. 7-112050

[51] Int. Cl.⁶ ........................................................ G06K 9/00
[52] U.S. Cl. ........................ 382/118; 382/171; 382/173; 382/257
[58] Field of Search .................................. 382/104, 118, 382/171, 172, 173, 264, 274, 276, 174, 257; 348/77, 78, 113, 118, 169, 172; 356/375, 385; 395/905; 340/937

[56] References Cited

U.S. PATENT DOCUMENTS

| 5,008,946 | 4/1991 | Ando ........................................... 382/2 |
| 5,293,427 | 3/1994 | Ueno et al. .................................. 382/1 |
| 5,481,622 | 1/1996 | Gerhardt et al. .......................... 382/103 |

FOREIGN PATENT DOCUMENTS

| 44 41 332 A1 | 11/1993 | Germany . |
| 195 09 689 A1 | 3/1994 | Germany . |
| 6332154 | 2/1994 | Japan . |
| 6255388 | 9/1994 | Japan . |
| 6266981 | 9/1994 | Japan . |

OTHER PUBLICATIONS

Hiroshi Ueno, Masayuki Kaneda, Masataka Tsukino, *Development of Drowsiness Dectection System*, IEEE Publications, Jul. 1994, pp. 15–20, Jul. 1994.

Yoshinobu Ebisawa, Koichi Kaneko, Shoji Kojima, Takashi Ushikubo, Tatsuo Miyakawa, *Non–Invasive Eye–Gaze Position Detecting Method Used on Man/Machine Interface for the Disabled,* IEEE, 1991, pp. 374–380, 1991.

*Primary Examiner*—Joseph Mancuso
*Assistant Examiner*—Brian P. Werner
*Attorney, Agent, or Firm*—Sughrue, Mion, Zinn, Macpeak & Seas, PLLC

[57] ABSTRACT

The invention provides an apparatus for processing an image of a face, capable of quickly and correctly detecting eyes not only under artificial illumination but also under sunlight regardless of the direction or altitude of the sun and regardless of circumstance conditions such as sunlight filtering down through trees, and still regardless of the variation in the face shape from person to person. An image of the face of a car driver is taken by a camera, and input to image signal input means. Gray level conversion means performs signal level conversion of picture elements of the face image received via the image signal input means in such a manner as to extract black-level areas smaller at least in the dimension along one image axis parallel or nearly parallel to the vertical direction of a face than a predefined length corresponding to the up-to-down width of an eye, thereby extracting black level areas having a size nearly equal to or less than the up-to-down width of the eye and thus extracting characteristic feature areas such as eyes, eyebrows, nares, and line between lips from the input face image. Variable binarization means converts the characteristic feature image into a binary image. Eye searching area setting means sets eye searching areas in the binary image. Candidate area setting means sets eye candidate areas in the eye searching areas. Eye area detection means detects eye areas from the eye candidate areas.

36 Claims, 33 Drawing Sheets

SUMX : SUM OF THE PICTURE ELEMENT SIGNAL LEVELS TAKEN ALONG THE X-DIRECTION

SUMX : SUM OF THE PICTURE ELEMENT SIGNAL LEVELS TAKEN ALONG THE X-DIRECTION

SUMX : SUM OF THE PICTURE ELEMENT SIGNAL LEVELS TAKEN ALONG THE X-DIRECTION

SUMX : SUM OF THE PICTURE ELEMENT SIGNAL LEVELS TAKEN ALONG THE X-DIRECTION

APPARATUS FOR PROCESSING AN IMAGE OF A FACE

BACKGROUND OF THE INVENTION

1. Field of the Invention

The present invention relates to an apparatus for processing an image of a face and more particularly to an apparatus of processing an image of a face for processing the image of a driver's face taken with a camera in such a manner as to extract a characteristic feature area of the face and then detect a driving condition of the driver on the basis of the condition of the extracted characteristic feature area.

2. Description of the Related Art

An apparatus of processing an image of a face is known in the art, that extracts an eye, which is one of characteristic features of a face, by processing the image of a driver's face taken with a camera disposed in a car, thereby detecting a driving condition such as looking off or dozing. In one known apparatus, an eye is extracted, by means of template matching, directly from a face image in the form of a halftone image without being converted into another form (Japanese Patent Laid-Open No. 6-255388 (1984)). In another known technique, an eye is extracted by detecting the darkest point of a face image (Japanese Patent Laid-Open No. 6-266981 (1984)). In still another known technique, a halftone image is converted into a binary (two-level) image, and then an eye is extracted by detecting a black area inside the face contour of the binary image (Japanese Patent Laid-Open No. 6-32154 (1994)). Of these conventional techniques, the technique disposed in Japanese Patent Laid-Open No. 6-32154 (1994) will be described in greater detail below.

FIG. 42 is a flow chart of the process of detecting the condition of a driver according to the technique disclosed in Japanese Patent Laid-Open No. 6-32154 (1994). FIG. 43 is a schematic representation of the process of converting a face image into a binary form according to this technique.

In the first step S88 shown in FIG. 42, an image of a driver's face is taken with a camera and the resultant halftone image signal is applied to image input means (not shown). The image signal in analog form is then converted into digital form, and the resultant digital halftone image is stored in a frame memory (not shown) in step S89.

In step S90, the image data is read from the frame memory, and converted by binarization means (not shown) into a binary image with respect to a proper threshold. In step S91, a starting line of scanning the face image in a horizontal direction (also referred to as Y-direction) is defined, and white-level picture elements are searched for by scanning the face image in the horizontal direction starting from the starting line. In step S92, the number of successive white-level picture elements is counted. In step S93, the vertical boundary of the face image is recognized by detecting the ends of an area including the greatest number of successive white-level picture elements.

In step S94 the Y-coordinates of an eye searching area are defined on the basis of the vertical boundary of the face image determined in step S93. In step S95, a starting line of scanning the face image in a vertical direction (also referred to as X-direction) is defined. In step S96, black areas containing successive black picture elements in the eye searching area are detected by scanning the face image starting from the starting line defined above. In step S97, an eye area is identified judging from the positional relationship among the detected black areas and also from the number of black picture elements counted in the vertical direction.

Finally in step S98, instantaneous eye detection means (not shown) detects open-and-close motion of an eye by detecting the number of black picture elements counted in the vertical direction within the eye area identified in the previous step. In step S99, doze judgement means (not shown) determines whether the driver is dozing or not on the basis of the information of the open-and-close motion detected in the previous step.

In the above-described conventional technique, however, it is required to always illuminate the face by a near-infrared light ray with a high intensity to obtain a stable binary image. In particular, in daytime operation, a very high intensity of illumination is required to reduce the disturbance due to the near-infrared components of sunlight.

In some cases, the face image is taken under illumination of sunlight without using artificial illumination which needs high electric power. However, in this technique, the illumination of sunlight is disturbed, during running of a car, by the direction or altitude of the sun and other circumstances such as sunlight filtering down through trees. As a result, a face can be shaded and thus the face image cannot be converted into a correct binary image, which brings about a problem in extracting an eye. In the example shown in FIG. 43, the face of a driver is illuminated by sunlight coming obliquely from the front of the driver wherein the upper half of the face is shaded by the frame or sun visor of a car. If the face image is converted into a binary form according to the conventional technique, a great difference occurs in picture element signal level between the upper half and lower half of the face, and thus the threshold value in the binary conversion process becomes high due to the bright portion of the face image. Thus, in the example shown in FIG. 43, although nares and a line between lips can be detected, the upper half part including eyes, hair, and eyebrows is recognized as a single black area and thus it is impossible to extract an eye area.

On the other hand, in a technique of extracting an eye from a halftone image without using a binary image, a high-capacity frame memory is required for storing a halftone image. However, this results in high cost. Furthermore, the dealing with the halftone image requires a rather long time, and it is difficult to achieve a high enough speed in real time operation.

Furthermore, in the technique of detecting an eye using the face contour, if the background is bright, the face contour cannot be extracted correctly. In the technique based on the pattern matching, variations in the shape or positions of eyes or glasses lead to a difficulty in the pattern matching process. On the other hand, in the technique based on the detection of the darkest point, it is difficult to distinguish a pupil of an eye from other black areas such as a mole.

SUMMARY OF THE INVENTION

It is a general object of the present invention to solve the above problems. More specifically, it is an object of the present invention to provide a low-cost face image processing apparatus capable of correctly detecting the driving condition not only under artificial illumination but also under illumination of sunlight regardless of the direction or altitude of the sun and regardless of circumstance conditions such as sunlight filtering down through trees, and still regardless of the variation in the face shape from person to person.

According to one aspect of the present invention, there is provided an apparatus for processing an image of a face, comprising: a camera for taking an image of a face; image signal input means for inputting an image signal from the camera; gray level conversion means for converting the gray level of a face image input via the image signal input means in such a manner as to extract a black-level area smaller at least in the dimension along one image axis (X-axis) parallel or nearly parallel to a vertical direction of a face than a predefined length corresponding to an up-to-down width of an eye; variable binarization means for converting an output image of said gray level conversion means into a binary image according to a variable threshold; eye searching area setting means for setting an eye searching area in a binary image provided by the variable binarization means; candidate area setting means for setting one or more candidate areas in the eye searching area; and eye area detection means for detecting an eye area from the candidate areas.

In this aspect of the invention, an image of a driver's face is taken with a camera, and the resultant face image is input to the image signal input means. Then the gray level conversion means extracts, by means of filtering, black-level areas having a size smaller than the up-to-down width of an eye from the input face image thereby extracting the characteristic feature areas such as eyes, eyebrows, nares, and a line between lips. The resultant characteristic feature image is then converted into a binary image by the variable binarization means. This ensures that the face image is correctly converted into a binary image regardless of disturbance such as shading of sunlight and thus only characteristic features of a face can be correctly extracted. Furthermore, this technique results in a great reduction in the amount of image information to be processed, and thus less memory space is required. Furthermore, the eye searching area setting means defines eye searching areas in the binary image, and then, eye candidate areas are set in this eye searching area by the candidate area setting means. From these candidate areas, eye areas are correctly detected by the eye area detection means regardless of variations in shape of a face from person to person and regardless of the circumstance conditions such as the shading of sunlight. In this technique, since the eye detection process is performed for the restricted area, eyes can be detected correctly for a short time.

In a preferred form, the above-described gray level conversion means extracts a black level in a direction parallel to the picture element scanning direction of the camera. This allows the picture element gray level conversion to be performed at a higher speed. Furthermore, the gray level conversion means is preferably implemented with hardware so as to achieve a higher operation speed.

According to another aspect of the present invention, there is provided an apparatus for processing an image of a face, comprising: a camera for taking an image of a face; image signal input means for inputting an image signal from the camera; first gray level conversion means for performing gray level conversion on the face image received via the image signal input means in such a manner as to extract a black-level area smaller in the dimension along the X-axis than a predefined length corresponding to an up-to-down width of an eye; first variable binarization means for converting an output image of the first gray level conversion means into a binary image according to a variable threshold; second gray level conversion means for extracting a black-level area smaller in the dimension along the Y-axis perpendicular to the X-axis less than a predetermined length corresponding to the up-to-down width of an eye; second variable binarization means for converting an output image of said second gray level conversion means into a binary image according to a variable threshold; logical-AND-of-image calculation means for calculating the product of binary images provided by the first and second variable binarization means; eye searching area setting means for setting an eye searching area in a binary image obtained as a result of the logical AND operation; candidate area setting means for setting one or more candidate areas in the eye searching area; and eye area detection means for detecting an eye area from the candidate areas.

In this aspect of the invention, an image of a driver's face is taken with a camera, and the resultant face image is input to the image signal input means. Then the first gray level conversion means extracts, by means of filtering, black-level areas having a size smaller than the up-to-down width of an eye from the input face image thereby extracting the characteristic feature areas such as eyes, eyebrows, nares, and a line between lips. The resultant characteristic feature image is then converted into a binary image by the first variable binarization means. Then the second gray level conversion means extracts, by means of filtering, black-level areas having a horizontal length smaller than the up-to-down width of an eye from the input face image thereby extracting the characteristic feature areas such as iris-and-pupil areas and nares. The resultant characteristic feature image is then converted into a binary image by the second variable binarization means. This ensures that the face image is correctly converted into a binary image regardless of disturbance such as shading of sunlight and thus only characteristic features of a face can be correctly extracted. Furthermore, the logical-AND-of-image calculation means calculates the product of the binary images output by the first and second variable binarization means thereby obtaining a more restricted characteristic feature areas which include substantially only iris-and-pupil areas. This enhances the probability of correctly extracting eyes. Furthermore, eye searching area setting means sets an eye searching area in a binary image obtained as a result of the above logical AND operation, and then the candidate area setting means sets eye candidate areas in the above eye searching area. The eye area detection means detects correct eye areas from these candidate areas. In this technique, the eye detection process is restricted in a narrow area, and thus eyes can be detected with high reliability.

In a preferred form, the above-described gray level conversion means includes: maximum value extraction filter for extracting a maximum signal level among neighboring picture elements located at successive positions within a predetermined range; minimum value extraction filter for extracting a minimum signal level from the output image of the maximum value extraction filter in the same range as that in the maximum value extraction filter; and a subtractor for subtracting the output of said minimum value extraction filter from the input face image.

Thus, in the gray level conversion means, the maximum value extraction filter redefines the signal level of each picture element of the face image so that the signal level of the picture element is equal to the maximum signal level of its neighboring picture elements located at successive positions in a predetermined range containing that picture element at its center position. Then the minimum value extraction filter redefines the signal level of each picture element output by the maximum value extraction filter so that the signal level of the picture element is equal to the minimum signal level of its neighboring picture elements located at successive positions in a predetermined range containing that picture element at its center position. Finally, the subtractor subtracts the output of the minimum value extraction filter from the input face image thereby extracting the above-described black-level area having a size less than the predetermined value. The gray level conversion means can be readily implemented with hardware at a low cost, and thus it is possible to achieve a high-speed operation.

In still another preferred form, the gray level conversion means includes: maximum value extraction filter for extracting a maximum signal level of picture elements selected one every predetermined number of picture elements from its neighboring picture elements located in a predetermined range; minimum value extraction filter for extracting a minimum signal level of the output image of the maximum value extraction filter in such a manner that picture elements are selected one every predetermined number of picture elements from its neighboring picture elements located in the same range as that in the maximum value extraction filter, and a minimum signal level of those selected picture elements is taken as the output of the minimum value extraction filter; and a subtractor for subtracting the output of said minimum value extraction filter from the input face image.

Thus, in the gray level conversion means, the maximum value filtering operation with the maximum value extraction filter and also the minimum value filtering operation with the minimum value extraction filter are performed for every predetermined number of picture elements. This allows a reduction in the hardware circuit scale of the filters.

In a further preferred form, the variable binarization means performs binarization on picture elements on a scanning line on the basis of a binarization threshold determined as a function of the sum of at least the weighted peak level and the weighted average of the picture elements on the previous scanning line.

In this form, the variable binarization means converts the signal level of picture elements into binary level for each scanning line with hardware at a high speed. In this operation, since the binarization threshold is determined as a function of the sum of the weighted peak level and the weighted average of the picture elements, binarization can be correctly performed even if there is a local distribution in the gray level of the image.

In another preferred form, the eye searching area setting means includes face centroid detection means for calculating a centroid position of the face within the binary image, and the eye searching area setting means disposes two rectangular eye searching areas at two base positions on the right and left sides of the face, each base position being a predetermined distance apart from the centroid position of the face, one side of each rectangular eye searching area extending by a predetermined distance from the corresponding base position in a direction along the vertical direction of the face, another side of each rectangular eye searching area extending by a predetermined distance from the corresponding base position along the horizontal direction of the face.

In a binary image consisting of extracted characteristic feature areas, eye areas are located near the face centroid. Taking into account this fact, the eye searching area setting means disposes two rectangular eye searching areas on the right and left sides of the face so that their respective base positions are a predetermined distance apart from the centroid position of the face, thereby restricting the eye detection operation in narrower areas. This leads to a reduction in the operation time required to extract eyes.

In a further preferred form, said eye searching area setting means includes face centroid detection means for calculating a centroid position of the face within said binary image and also includes face center line detection means for calculating a vertical center line of the face, and the eye searching area setting means disposes two rectangular eye searching areas at two base positions on the right and left sides of the face, each base position being a predetermined distance apart from the centroid position of the face, one side of each rectangular eye searching area extending parallel to the face center line by a predetermined distance from the corresponding base position in a direction along the vertical direction of the face, another side of each rectangular eye searching area extending by a predetermined distance from the corresponding base position along the horizontal direction of the face.

In a binary image consisting of extracted characteristic feature areas, eye areas are located near the face centroid wherein one eye area is located at the right of the vertical center line of the face and the other one is located at the left of the vertical center line of the face. Thus, in this invention, the eye searching area setting means disposes two rectangular eye searching areas at two base positions on the right and left sides of the face, respectively, each base position being a predetermined distance apart from the centroid position of the face, one side of each rectangular eye searching area extending parallel to the face center line, thereby restricting the eye detection operation in a further narrower area. This ensures that eyes may be extracted with higher reliability for a shorter time. Furthermore, this technique allows eyes to be extracted successfully even when the face is slanted in the image.

In a further preferred form, the eye searching area setting means includes face centroid detection means for detecting a naris area in the binary image, and the eye searching area setting means disposes two rectangular eye searching areas at two base positions on the right and left sides of the face, respectively, each base position being a predetermined distance apart from the middle point between right and left naris areas, one side of each rectangular eye searching area extending by a predetermined distance from the corresponding base position in a direction along the vertical direction of the face, another side of each rectangular eye searching area extending by a predetermined distance from the corresponding base position along the horizontal direction of the face.

Thus, taking into account the fact that eye areas are located above nares, the eye searching area setting means disposes two rectangular area as eye searching areas at the upper right and upper left locations determined relative to the middle point between naris areas thereby restricting the eye extraction operation in narrow areas. Thus, it is possible to extract eyes for a shorter time. Furthermore, even if an eye searching area cannot be defined with respect to the face centroid for some reason, it is possible to dispose an eye searching area at a proper location with reference to the naris location.

In still another preferred form, the eye area detection means includes vertical histogram calculation means for calculating the horizontal profile of the sum of the binary levels taken along the vertical direction of the face within a candidate area, and when the horizontal width of the candidate area is within a predetermined range, the eye area detection means judges whether the candidate area is an eye area or not on the basis of an evaluation function including both the representative value of the magnitude of the vertical histogram and the representative value of the shape of the vertical histogram.

Thus, the eye area detection means selects a limited number of eye candidate areas on the basis of the width of eye candidate areas relative to the typical width of an eye. This allows a reduction in the amount of calculation required to extract eyes. Furthermore, the processing relating to the vertical histogram can be readily achieved with hardware and thus it is possible to correctly and quickly detect eye areas using both the representative value of the magnitude of the vertical histogram and the representative value of the shape of the vertical histogram as an evaluation function.

In still another preferred form, the eye area detection means includes memory means for storing the evaluation function value of each candidate area in the two right and left rectangular eye searching areas, the evaluation function value being stored for each image, and the eye area detection means examines the evaluation function values stored in the memory means and regards a candidate area having a maximum variation in the evaluation function among over a predetermined number of images as an eye.

Thus, taking into the account the fact that eye areas vary in shape with time to a greater extent than the other characteristic feature areas, the eye area detection means detects an eye area judging from the variations with time of the evaluation function values stored in memory for each image without having confusion with other parts such as eyebrows or glasses.

In yet another preferred form, the eye area detection means includes representative point calculation means for calculating a representative point of each candidate area which has been regarded as an eye in said rectangular eye searching area, and a candidate area whose distance between the face centroid and the representative point of the candidate area regarded as an eye is smallest is ultimately determined to be an eye.

Thus, taking into account the fact that eyes are located nearer to the face centroid than other characteristic feature areas are, the eye area detection means can ultimately detect correct eye areas by selecting a candidate area whose distance between the face centroid and the representative point of the candidate area regarded as an eye is smallest. This leads to a further improvement in reliability in detecting eye areas.

In further preferred form, the eye area detection means includes representative point calculation means for calculating a representative point of each candidate area which has been regarded as an eye in each of the two right and left rectangular eye searching areas, and one right candidate area and one left candidate area whose distance between the face centroid and the representative point of the candidate area regarded as an eye is smallest of all and less than a predetermined value are ultimately determined to be eyes.

Thus, taking into account the fact that eye areas are located nearer to the face centroid than other characteristic feature areas are, wherein one eye area is on the right side of the image and the other one is on the left side at positions which are substantially symmetric about the face centroid, the eye area detection means can ultimately detect correct eye areas by selecting one right candidate area and one left candidate area whose distance between the face centroid and the representative point of the candidate area regarded as an eye is smallest of all and less than a predetermined value. This leads to a further improvement in reliability in detecting eye areas.

In further preferred form, said naris area detection means includes: candidate area setting means for setting one or more candidate areas in the binary image; face center line detection means for determining a vertical center line of the face in the binary image; naris searching area setting means for disposing a naris searching area between two parallel lines, one being at the right of the face center line, the other being at the left of the face center line, each line being apart from the face center line by a predetermined constant distance; whereby a nares is detected from the candidate areas contained in the naris searching area.

Thus, taking into account the fact that nares area located adjacent to the face center line, the naris area detection means limits a naris searching area in a narrow area between two parallel lines, one being at the right of the vertical center line of the face and the other being at the left so that nares can be detected from candidate areas contained in this narrow area between the parallel lines. As a result, nares can be easily extracted with a small amount of calculation without being disturbed by the presence of glasses or the like.

In further preferred form, the naris searching area setting means includes candidate area representative point calculation means for calculating the representative point coordinates of each candidate area disposed in the binary image, whereby the average distance between the Y-coordinates of the representative points of candidate areas having the same vertical representative point coordinates and the Y-coordinates of the face center line is calculated, and the distance between the parallel lines is determined as a function of the average distance.

Thus, the naris searching area is limited in the area between the parallel lines wherein the distance between the parallel lines is determined on the basis of the average distance of the representative points of candidate areas having the same vertical representative point coordinates with respect to the face center line thereby setting the naris searching area at a correct location regardless of the variation in the face shape from person to person.

In further preferred form, said naris area detection means includes: candidate area setting means for setting one or more candidate areas in the binary image; face centroid detection means for calculating a centroid position of the face in the binary image; and naris searching area setting means by which a naris searching area is set in an area lower than a horizontal line which is apart downward by a predetermined distance from the face centroid; whereby a nares is detected from the candidate areas contained in the naris searching area.

Thus, taking into account the fact that in a binary image consisting of extracted characteristic features of a face, nares are located at lower positions rather far from the face centroid, the naris area detection means sets a naris searching area in such a manner that the naris searching area is limited in an area lower than a horizontal line which is apart downward by a predetermined distance from the face centroid so that nares can be detected from candidate areas located in this limited naris searching area. As a result, nares can be readily extracted with a small amount of calculation without being disturbed by the presence of glasses or the like.

In further preferred form, the naris searching area setting means includes: candidate area representative point calculation means for calculating candidate area representative points in the binary image; and band-shaped area representative point calculation means for creating a band-shaped area including candidate areas whose X-coordinate of the representative point is equal to each other, and then employing this X-coordinate as the X-coordinate of the representative point of the above-described band-shaped area; wherein the above-described predetermined distance is determined as a function of the number of areas included in the band-shaped area and the difference in X-coordinate between the face centroid and the representative point of each band-shaped area.

Thus, the above-described predetermined distance associated with the naris searching area is determined as a function of the number of areas included in the band-shaped area and the difference in X-coordinate between the face centroid and the representative point of each band-shaped area thereby ensuring that the naris searching area can be set correctly without being influenced by the variations in shape of face from person to person.

In further preferred form, naris extraction area limiting means defines a limited detection area in the naris searching area so that a naris detection operation is performed in this limited detection area, and the centroid of the picture elements in the limited naris extraction area is regarded as the middle point between naris areas.

Thus, the naris extraction area limiting means limits the detection area in a further narrower area in the naris searching area and the middle point between naris areas is determined simply as the centroid of the picture elements in this limited naris extraction area. This allows a greater reduction in the processing time required to extract nares.

In further preferred form, the naris area detection means includes: candidate area setting means for setting one or more candidate areas in the binary image; and candidate area representative point calculation means for calculating the coordinates of the representative point of each candidate area; whereby the Y-direction distance between candidate areas whose X-coordinate of the representative point is identical to each other is calculated, and the Y-direction distance is compared with a predefined reference naris-to-naris distance, and nares are detected on the basis of the above comparison result.

Taking into account the fact that, of symmetric pairs of characteristic feature areas, a pair of nares have the smallest distance between each other, the naris area detection means detects nares simply by comparing the distance between the representative points of candidate areas having a representative point X-coordinate equal to each other with the predefined reference naris-to-naris distance. Thus, it is possible to quickly detect nares.

In further preferred form, the naris area detection means includes: candidate area setting means for setting one or more candidate areas in the binary image; and candidate area representative point calculation means for calculating the coordinates of the representative point of each candidate area; whereby the horizontal distance between candidate areas whose X-coordinate of the representative point is identical to each other is calculated, and naris areas are detected on the basis of an evaluation function including the aspect ratio of candidate areas and the difference in Y-coordinate between the representative points.

Thus, taking into account the fact that, of symmetric pairs of characteristic feature areas, nares have the smallest distance between each other and that nares have a shape greatly different from that of other characteristic feature areas, the naris area detection means detects nares correctly on the basis of the evaluation function including the horizontal distance between candidate areas whose X-coordinate of the representative point is identical to each other and the aspect ratio of candidate areas.

In further preferred form, the naris area detection means includes: candidate area setting means for setting one or more candidate areas in the binary image; candidate area limiting means for reducing the length of the vertical sides of each candidate area defined by the candidate area setting means by shifting the lower side of each candidate area from down to up; and vertical histogram calculation means for calculating the horizontal profile of the sum of the binary levels taken along the vertical direction of the face within each candidate area, whereby naris areas are detected judging from the change in the shape of the vertical histogram which occurs when the length of the vertical sides of the candidate area is reduced.

Thus, the naris area detection means detects nares with high reliability on the basis of the change in the vertical histogram which occurs when the candidate area limiting means reduces the length of the vertical sides of the candidate area by shifting the lower side of the candidate area in the direction from down to up. Thus, it is possible to correctly detect nares even when nares are connected to each other via a mustache or a bridge.

In further preferred form, the centroid coordinates of picture elements in the binary image are employed as the coordinates representing the centroid position of the face.

Thus, the coordinates of the centroid position of the face can be readily determined simply by calculating the centroid of the picture elements in the binary image.

In further preferred form, horizontal histogram calculation means for calculating the vertical profile of the sum of the binary levels taken within the binary image along the horizontal direction of the face; band-shaped area setting means for setting a band-shaped area extending parallel to the vertical direction of the face, band-shaped area representative point calculation means for calculating the X-coordinates of the representative point of the band-shaped area; and vertical histogram calculation means for calculating the horizontal profile of the sum of the binary levels taken over the range of the X-direction width of the band-shaped area, the above-described sum being taken for all band-shaped areas; wherein the X-coordinate of the centroid position of the face is defined by the average coordinate of the representative points of band-shaped areas and the Y-coordinate of the centroid position of the face is defined by the centroid coordinate of the vertical histogram.

Thus horizontal histogram calculation means limits the band-shaped area in a narrow area between two parallel lines extending vertical directions in the binary image and the vertical histogram calculation means determines the vertical histogram of the entire band-shaped area. Furthermore, the X-coordinate of the centroid position of the face is given as the average coordinate of the representative points of band-shaped areas and the Y-coordinate of the centroid position of the face is given as the centroid coordinate of the vertical histogram. The face centroid can be determined by calculating the histogram with hardware and thus it is possible to reduce the memory space required for the calculation as well as the calculation amount. This allows a reduction in time required to calculate the coordinates of the face centroid. In still another preferred form, the face image processing apparatus further includes candidate area setting means for defining one or more candidate areas in the binary image, and the coordinates ($X_g$, $Y_g$) of the centroid position of the face is defined using the number $N_i$ of black level picture elements existing in each candidate area i, the coordinates ($X_i$, $Y_i$) of the representative point of each candidate area i, and the number m of the candidate areas i according to the following equation:

$Xg = \Sigma mNiXi/\Sigma Ni$ $Yg = \Sigma mNiYi/\Sigma Ni$

If it is assumed that the number Ni of black level picture elements are all concentrated at the representative point (Xi, Yi) of each candidate area i, then the coordinates (Xg, Yg) of the centroid position of the face can be given by the above equation. This leads to simplification in the calculation, and thus it becomes possible to more easily and more quickly determine the coordinates of the centroid position of the face.

In further preferred form, the face center line detection means includes: horizontal histogram calculation means for calculating the vertical profile of the sum of the binary levels taken along the horizontal direction; band-shaped area setting means for setting one or more band-shaped areas extending to the horizontal direction of a face, the band-shaped areas being set on the basis of the horizontal histogram calculation means; and band-shaped area centroid detection means for calculating the centroid position of picture elements existing in each band-shaped area; whereby a vertical center line of the face is determined from the centroid position of band-shaped areas.

Thus, in this face center line detection means, the band-shaped area setting means defines band-shaped areas so that characteristic feature areas such as eyebrows, eyes, and nares lying on a horizontal line are included in the respective band-shaped areas. Then, the band-shaped area centroid detection means determines the centroid position of the picture elements existing in each band-shaped area, and then a line which best fits to the centroid points of band-shaped areas is determined and the vertical center line of the face is defined by this line. Thus, the vertical center line of the face can be determined quickly by a small amount of calculation for a limited area.

In further preferred form, the face center line detection means includes: candidate area setting means for setting one or more candidate areas in the binary image; candidate area representative point calculation means for calculating the coordinates of the representative point of each candidate area; and band-shaped area representative point calculation means for calculating the average of the Y-coordinates of the representative points of candidate areas existing in a band-shaped area which is produced so that candidate areas whose representative point X-coordinate is equal to each other are included in the band-shaped area, and employing the resultant average as the representative point Y-coordinate of the band-shaped area; thereby determining the vertical center line of the face on the basis of the representative points of band-shaped areas. Thus, in this face center line detection means, the band-shaped area setting means defines band-shaped areas so that characteristic feature areas such as eyebrows, eyes, and nares lying on a horizontal line are included in the respective band-shaped areas. Then the average of the Y-coordinates of the representative points of candidate areas included in each band-shaped area is calculated and the resultant value is employed as the representative point coordinates of the band-shaped area. Furthermore, the vertical center line of the face is defined by a line which best fits to the representative point coordinates of band-shaped areas. In this technique, the vertical center line of the face can be determined quickly by performing calculation for limited areas without calculating the centroid of the band-shaped areas.

In further preferred form, the face center line detection means includes: candidate area setting means for setting one or more candidate areas in the binary image; candidate area representative point calculation means for calculating the coordinates of the representative point of each candidate area; and point-on-face-center-line candidate calculation means for calculating the coordinates of the middle point between the representative point of each candidate area and the representative point of another candidate area which exists within an area between two lines at an angle in the range of $\pm\theta$ relative to the Y-axis of the image plane; whereby the vertical center line of the face is determined on the basis of the locations of the point-on-face-center-line candidates.

Thus, taking into account the fact that characteristic feature areas are located in a symmetric fashion at the right and left sides of the face center line, the face center line detection means determines the vertical center line of the face in such a manner that the point-on-face-center-line candidate calculation means calculates the coordinates of the middle point between the representative point of each candidate area and the representative point of another candidate area which exists within an area between two lines at an angle in the range of $\pm\theta$ relative to the Y-axis of the image plane, thereby determining the vertical center line of the face on the basis of the locations of the point-on-face-center-line candidates. This ensures that the vertical center line of the face can be determined quickly with a simple calculation even if the face is slanted in the image.

In further preferred form, the face image processing apparatus further includes: fist centroid detection means for calculating the centroid position of all picture elements in the binary image; and candidate-existing area setting means for setting a rectangular area having a predetermined size around the first centroid position; wherein the eye searching area is set in the candidate-existing area, or otherwise the centroid position of the face, the face center line, or the naris areas used to set the eye searching area are determined by performing calculation within this candidate-existing area.

Thus, the first centroid detection means calculates the centroid position of all picture elements, and the candidate-existing area setting means defines a rectangular area having a predetermined size around the first centroid position so that calculation is performed within this rectangular area. By setting the eye searching area in the candidate-existing area, it becomes possible to remove the influence of background noise or black blocks other than the characteristic feature areas. Otherwise the centroid position of the face, the face center line, or the naris areas may be determined by performing calculation within the above-described rectangular area and the eye searching area may be set according to the resultant centroid position of the face, the face center line, or the naris areas.

In further preferred form, said eye searching area setting means sets an eye searching area in such a manner that a black block-existing area in a rectangular shape is defined so that the X- and Y-coordinates of its end points in the X- and Y-directions are equal to the minimum and maximum X-coordinates and the minimum and maximum Y-coordinates of all end points of black block areas present in the binary image, each black block areas containing a predetermined number of successive black picture elements, and the starting coordinates and the lengths of the sides of the eye searching area are given as a function of the starting coordinates and the lengths of the sides of the black block-existing area or as a function of the starting coordinates of the black block-existing area and the ratios of the lengths of the sides of the black block-existing area to the respective reference lengths.

Thus, in the eye searching area setting means, an area containing characteristic feature areas is defined as a black block-existing area, and then the eye searching area is defined so that the starting coordinates and the lengths of the sides of the eye searching area as a function of the starting coordinates and the lengths of the sides of the black block-existing area or as a function of the starting coordinates and the ratios of the lengths of the sides of the black block-existing area to the corresponding reference values thereby setting the eye searching area in a best fashion depending on the distance between the camera and the face to be monitored, the orientation of the face, and the shape or size of the face varying from person to person.

In further preferred form, the face image processing apparatus further includes memory means for storing the lengths of the sides of the black block-existing area for each image, and the reference lengths of the sides are set to the lengths of the sides which are greatest among a predetermined number of images stored in the memory means or set to the lengths of the sides which appear most frequently.

Thus, the reference values of the lengths of the sides of the black block-existing area are set to the values which are greatest or appear most frequently among the predetermined number of images stored in the memory so that the reference values correspond to those under the normal condition in which the driver's face is in front position thereby ensuring that the eye searching area can be set in a best fashion depending on the position of the face.

In further preferred form, the eye searching area setting means sets an eye searching area so that the eye searching area's starting coordinate and its length along the horizontal direction of the face are determined as a function of the distance between naris areas detected by the naris area detection means or as a function of the ratio of the distance between naris areas to a reference value.

Thus the starting coordinates and the lengths of the sides of the eye searching area are determined as a function of the distance between naris areas detected by the naris area detection means or as a function of the ratio of the distance between naris areas to the reference value thereby ensuring that the eye searching area can be set correctly depending on the position of the face and the distance between the camera and the face.

In further preferred form, the eye searching area setting means sets an eye searching area so that the eye searching area's starting coordinate and its length along the vertical direction of the face are determined as a function of the distance between naris areas detected by the naris area detection means and the area of the naris areas or the aspect ratio of the naris areas or as a function of the ratio of the distance between naris areas detected by the naris area detection means to its reference value and the ratio of the area of the naris areas to its reference value or the ratio of the aspect ratio of the naris areas to its reference value.

Thus the eye searching area's starting coordinate and its length along the vertical direction of the face are determined as a function of the distance between naris areas detected by the naris area detection means and the area of the naris areas or the aspect ratio of the naris areas or as a function of the ratio of the distance between naris areas detected by the naris area detection means to its reference value and the ratio of the area of the naris areas to its reference value or the ratio of the aspect ratio of the naris areas to its reference value thereby ensuring that the eye searching area can be set in an optimum fashion depending on the face position. In further preferred form, the face image processing apparatus further includes memory means for storing the distance between the naris areas and the lengths of the sides of the naris areas for each image, wherein the respective reference values of the distance between the naris areas, the area of the naris areas, and the aspect ratio of the naris areas are set to the maximum values of the distance between the naris areas among a predetermined number of images stored in the memory means or to the most-frequently-appearing values of the distance between the naris areas, the area of the naris areas, and the aspect ratio of the naris areas.

Thus the respective reference values of the distance between the naris areas, the area of the naris areas, and the aspect ratio of the naris areas are set to the maximum values of the distance between the naris areas among a predetermined number of images stored in the memory means or to the most-frequently-appearing values of the distance between the naris areas, the area of the naris areas, and the aspect ratio of the naris areas, so that the reference values correspond to those under the condition in which the driver's face is in front position or a most frequent position thereby ensuring that the eye searching area can be set in a best fashion depending on the position of the face.

In further preferred form, the candidate area setting means includes: horizontal histogram calculation means for calculating the vertical profile of the sum of the binary levels taken along the horizontal direction of the face; band-shaped area setting means for setting a band-shaped area extending parallel to the vertical direction of the face, the band-shaped area being determined on the basis of the horizontal histogram calculation means; and vertical histogram calculation means for calculating the horizontal profile of the sum of the binary levels taken over the range of the X-direction width of the band-shaped area; whereby the candidate area is set as a rectangular area having a height equal to the above-described band width and having a width equal to the width in the horizontal direction of the face determined on the basis of the vertical histogram.

Thus the candidate area setting means sets a candidate area as a rectangular area having a height equal to the band width of the vertical band-shaped area determined by the horizontal histogram calculation means and having a width equal to the width determined by the vertical histogram calculation means. This allows the candidate area to be set quickly by means of calculating histograms using hardware.

In further preferred form, the candidate area setting means includes black block area extracting means for extracting, by means of labeling, an isolated black block area containing a predetermined number of or more successive black level picture elements of the binary image, and the candidate area setting means sets a candidate area in a rectangular shape so that the rectangular candidate area surrounds the end points in the X- and Y-directions of the labelled black block area.

Thus the candidate area setting means extracts, by means of labeling, an isolated black block area containing a predetermined number of or more successive black level picture elements of the binary image, and the candidate area setting means sets a candidate area in a rectangular shape so that the rectangular candidate area surrounds the end points in the X- and Y-directions of said labelled black block area, thereby ensuring that the candidate area may be correctly set even when the face image contains complicated patterns such as glasses or a mustache.

DESCRIPTION OF THE PREFERRED EMBODIMENTS

Referring to the accompanying drawings, preferred embodiments of the present invention are described in detail below.

Embodiment 1

Figure 1:
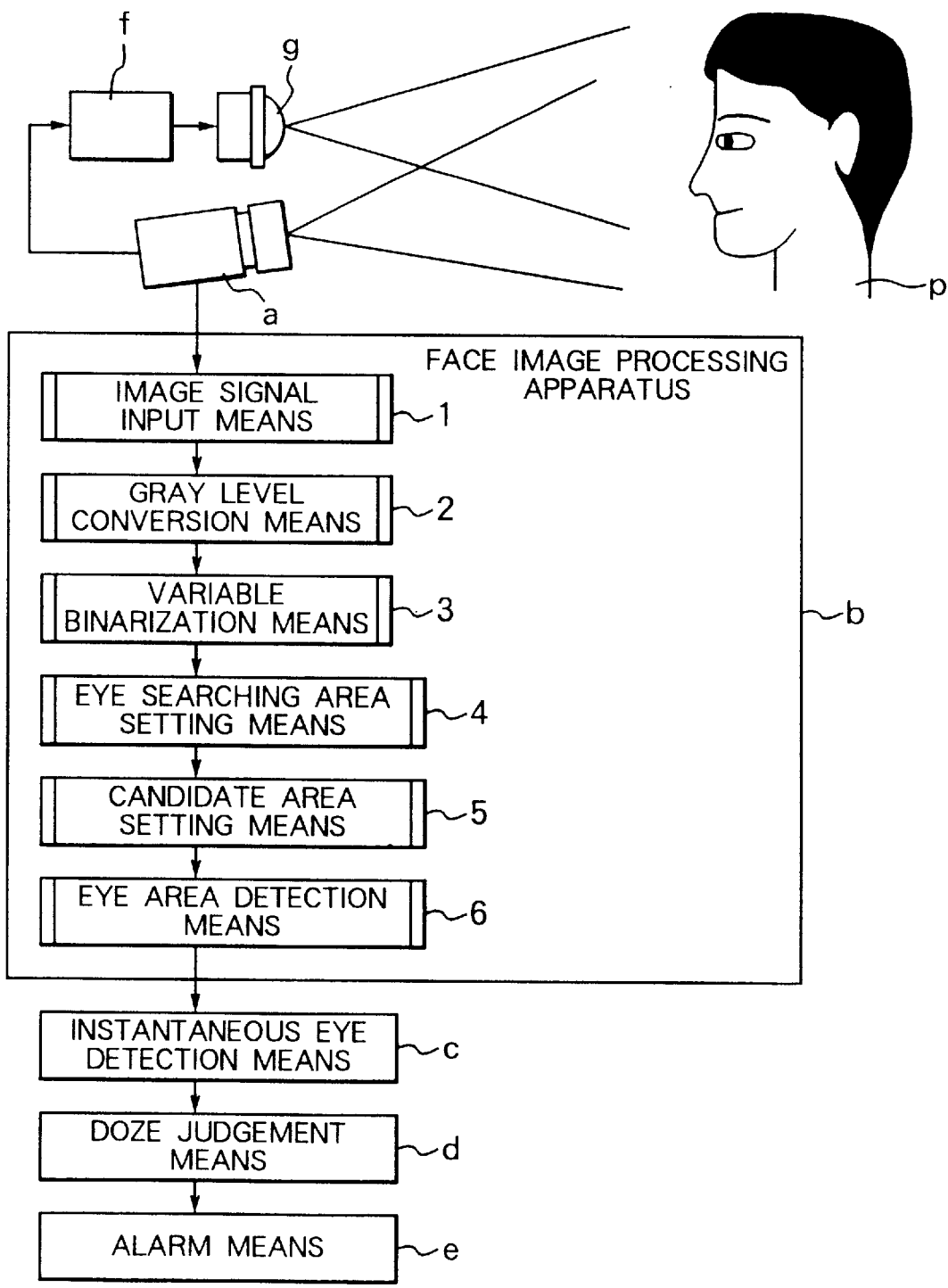
FIG. 1 is a simplified block diagram of a driver's condition detector including an apparatus of processing an image of a face, according to a first embodiment of the present invention.
Figure 2:
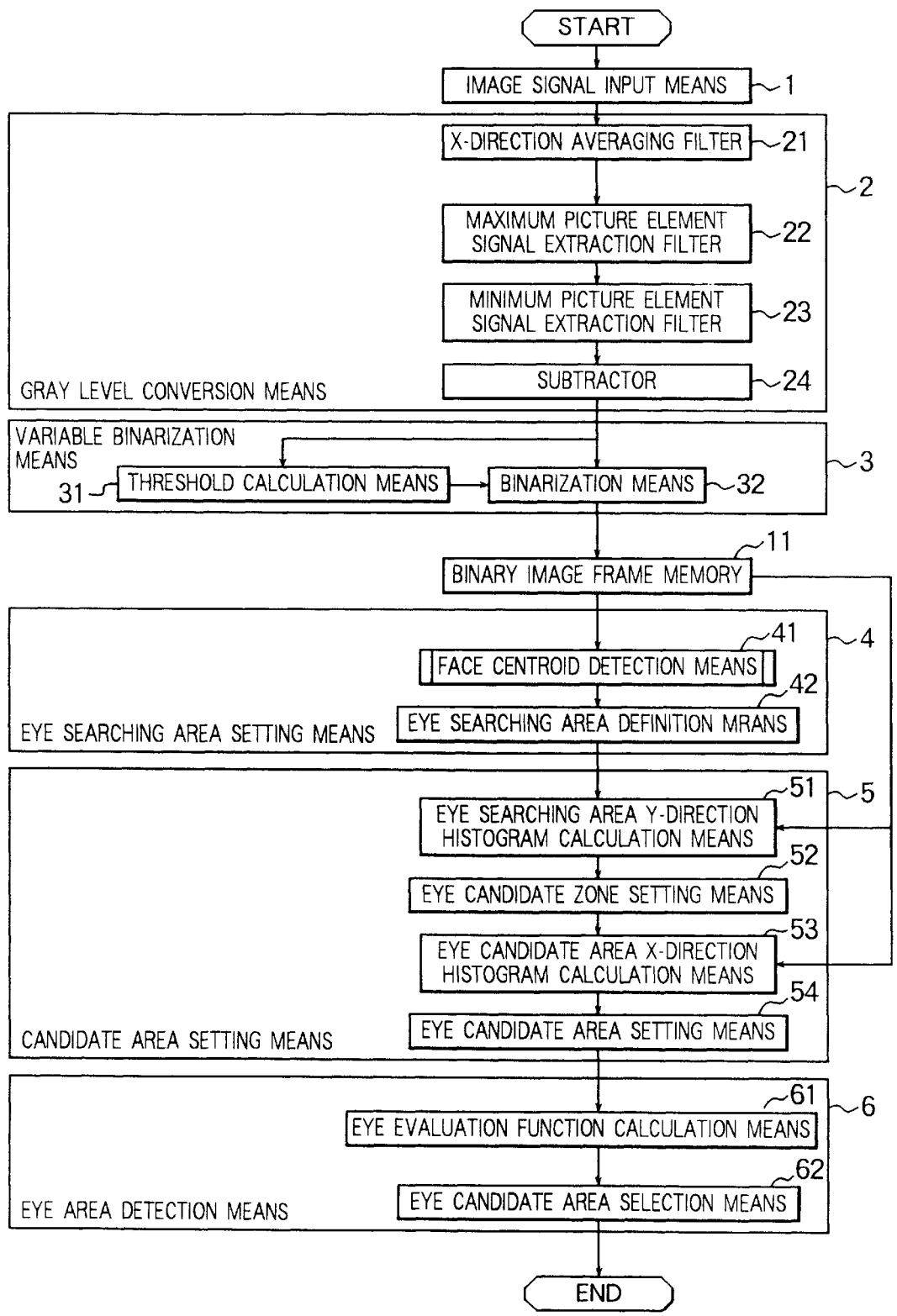
FIG. 2 is a block diagram of illustrating the detailed structure of the apparatus of processing an image of a face, according to the first embodiment.
Figure 3:
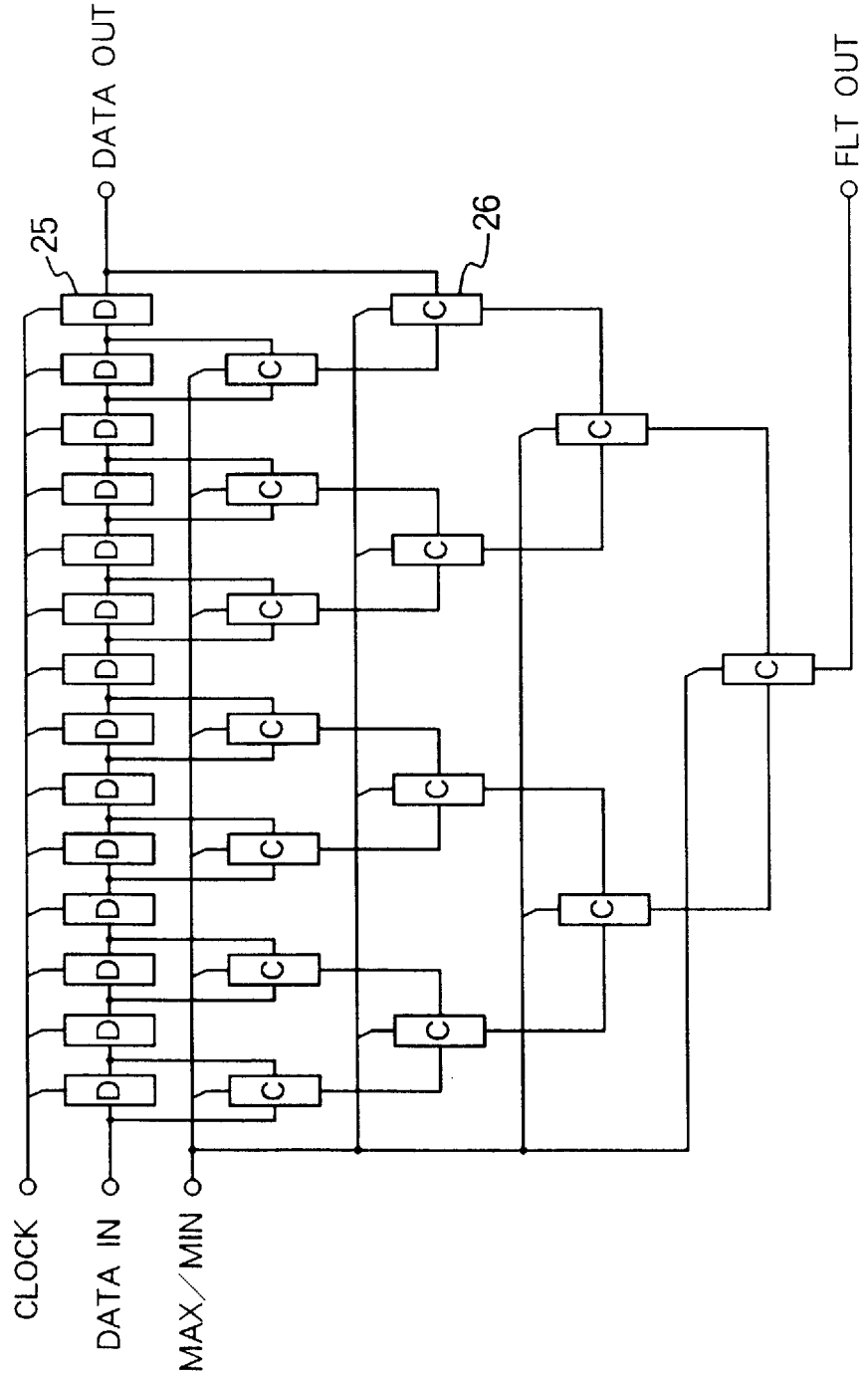
FIG. 3 is a circuit diagram of a MAX/MIN filter according to the first embodiment.
Figure 4:
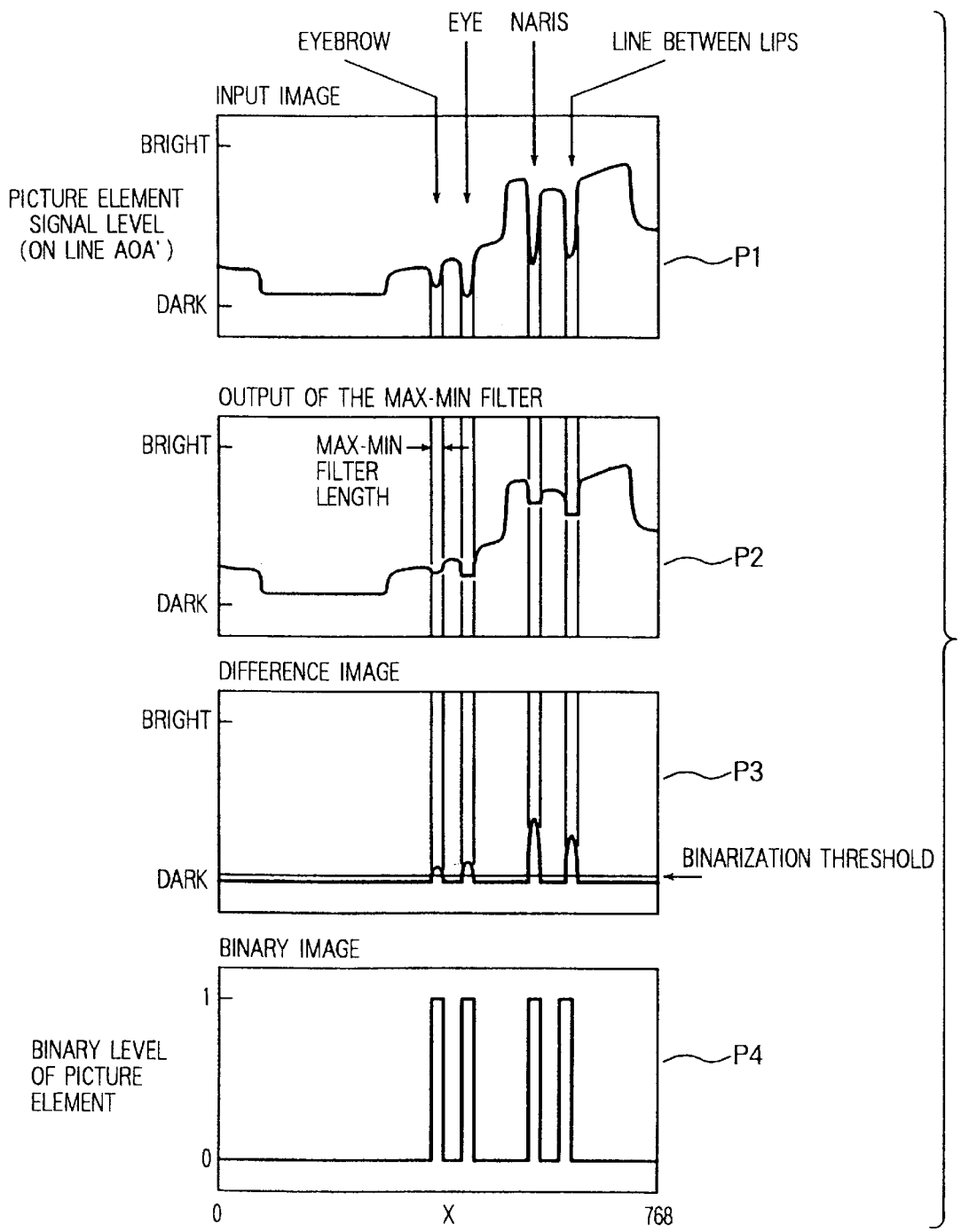
FIG. 4 is a schematic illustration of the process of converting an image into a binary image using gray level conversion means according to the first embodiment.
Figure 5:
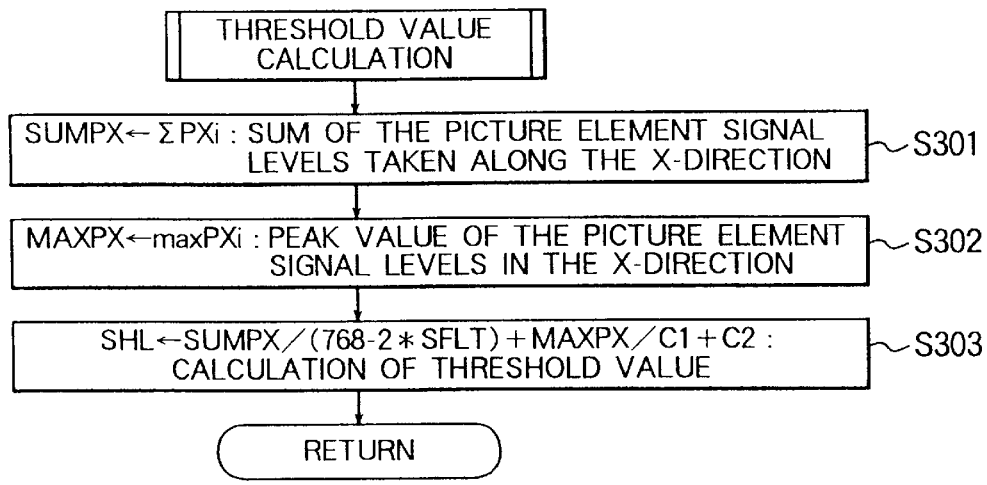
FIG. 5 is a flow chart of calculating a threshold value using variable binarization means according to the first embodiment.
Figure 6:
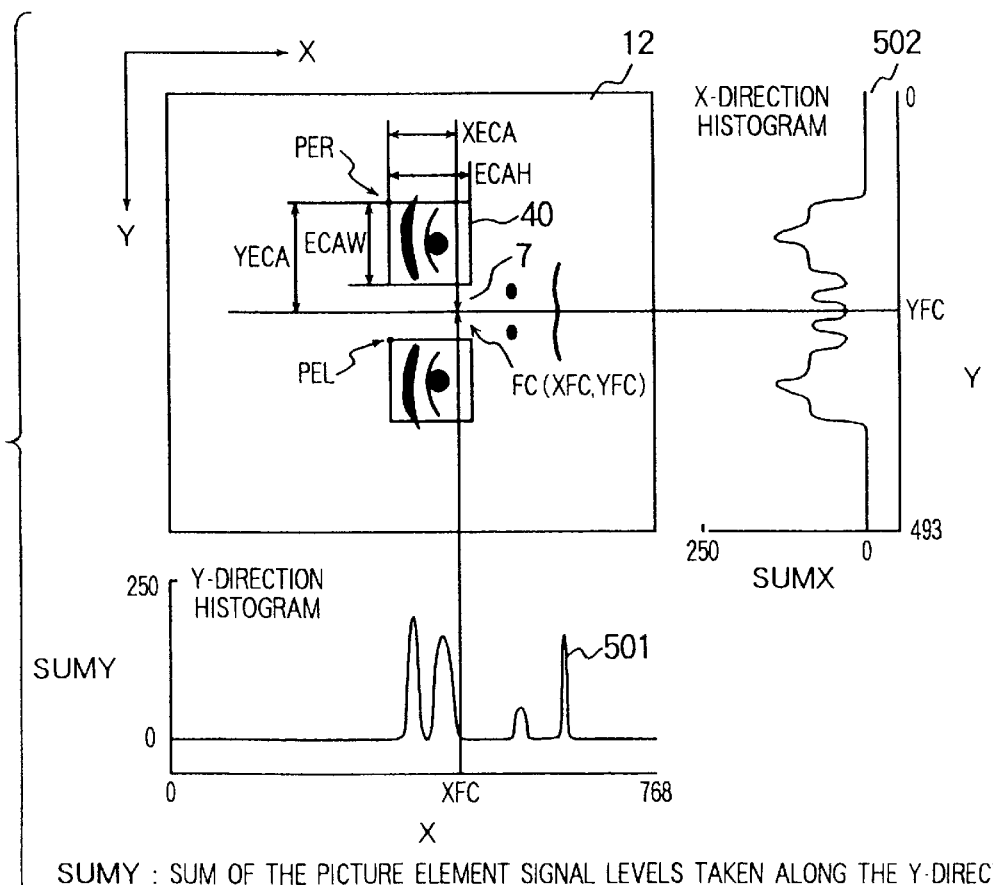
FIG. 6 is a schematic representation of the process of setting eye searching areas according to the first embodiment.
Figure 7:
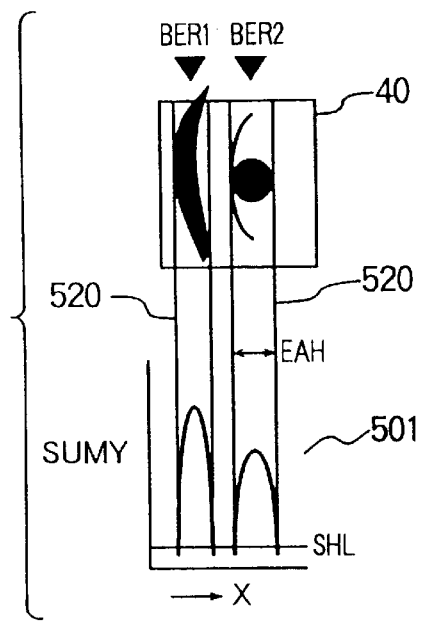
FIG. 7 is a schematic representation of the process of setting an eye searching area according to the first embodiment.
Figure 8:
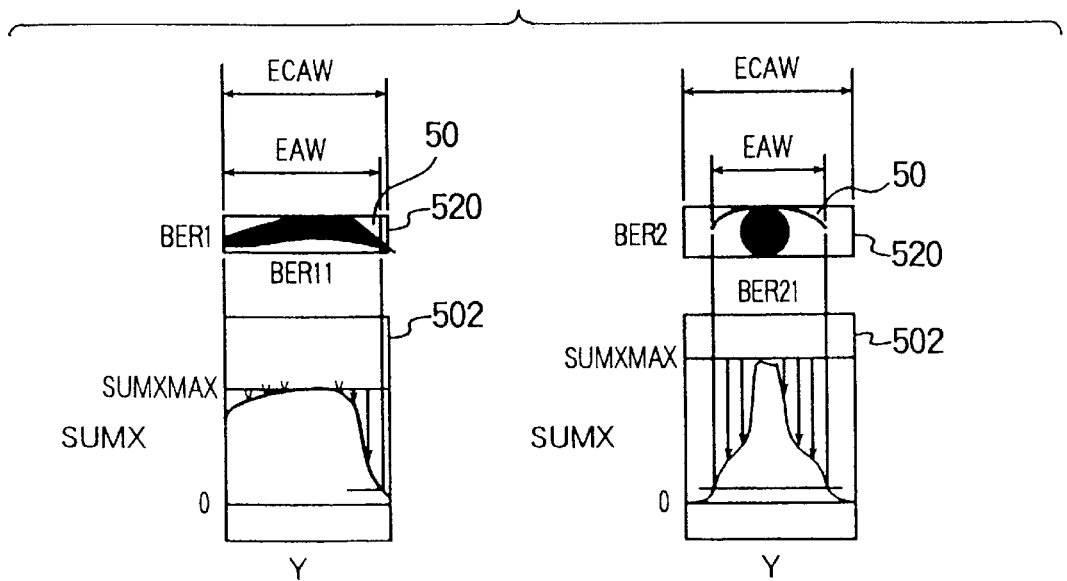
FIG. 8 is an X-direction histogram of an eye candidate area, according to the first embodiment.
Figure 9:
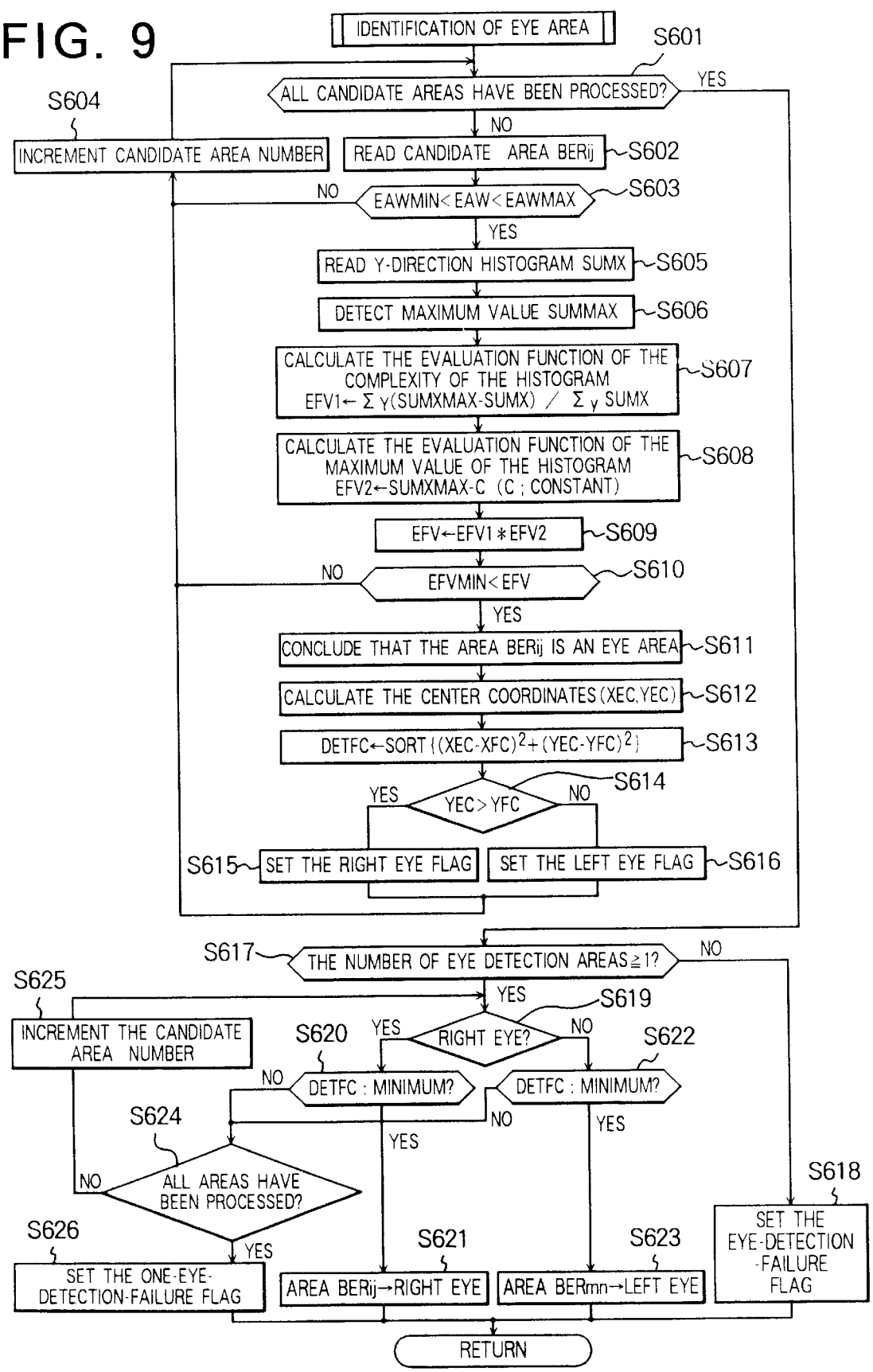
FIG. 9 is a flow chart of the process of detecting an eye area according to the first embodiment.
Figure 10:
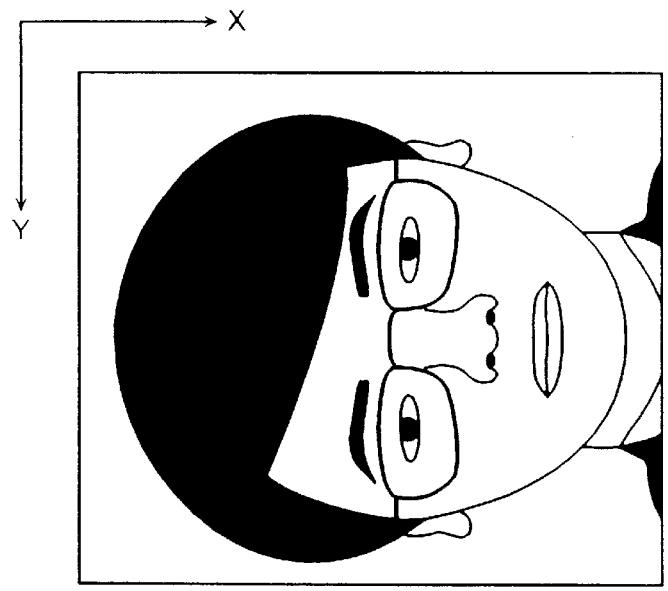
FIG. 10 is an image of a face with glasses, according to the first embodiment.
Figure 11:
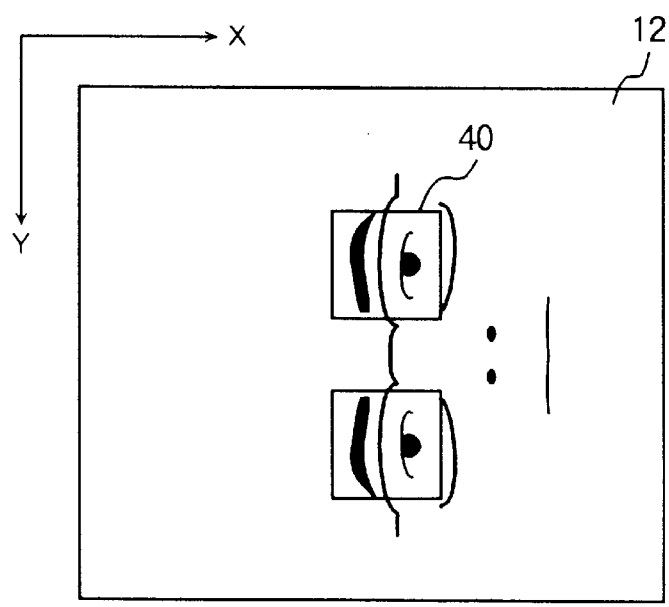
FIG. 11 is a binary image of the face with glasses, according to the first embodiment.
Figure 12:
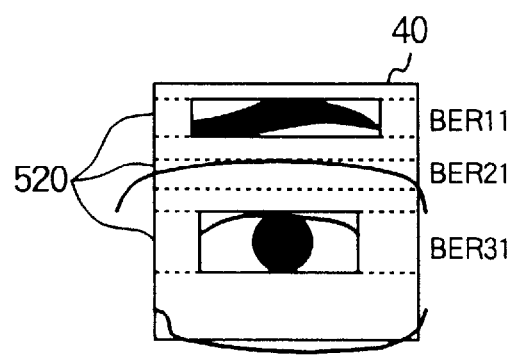
FIG. 12 is a binary image of an eye candidate area in an eye searching area, according to the first embodiment.

FIGS. 1 to 12 relate to a first embodiment of an apparatus of processing an image of a face, according to the present invention, wherein: FIG. 1 is a simplified block diagram of a driver's condition detector including an apparatus of processing an image of a face; FIG. 2 illustrates the entire construction of the apparatus of processing an image of a face; FIG. 3 is a circuit diagram of a MAX/MIN filter; FIG. 4 is a schematic representation of gray level conversion and further conversion to a binary image; FIG. 5 is a flow chart of a process of calculating a threshold with variable binarization means; FIG. 6 is a schematic representation of a process of defining an eye-existing region; FIG. 7 is a schematic representation of a process of setting an eye searching area; FIG. 8 is an X-axis histogram regarding an eye candidate area; FIG. 9 is a flow chart of identifying an eye area; FIG. 10 is an image of a face with glasses; FIG. 11 is a binary image of the face with glasses; and FIG. 12 is a binary image of an eye candidate area in an eye searching area of the face image with glasses. Referring to FIGS. 1 to 12, the first embodiment is described below.

As shown in FIG. 1, the driver's condition detector comprises a camera a, an apparatus b of processing an image of a face, instantaneous eye detection means c, doze judgement means d, alarm means e, illumination control means f, and near-infrared illumination device g. The apparatus b of processing an image of a face comprises image signal input means 1, gray level conversion means 2, variable binarization means 3, eye searching area setting means 4, candidate area setting means 5, and eye area detection means 6.

The camera 1 is of a very small size type using a solid state imaging device with 380,000 pixels arranged in the form of a 768×493 array. The camera 1 is disposed on a dashboard or instrument panel of a vehicle such as an automobile so that the camera 1 can take a picture, seen from front, of a face of a driver in such a manner that the vertical direction of the face image is parallel to the 768-pixel side of the solid state imaging device. To extract an eye area correctly, it is most preferable that the face image is taken from the front side at a position slightly lower than the face. The illumination control means determines the brightness of the image from the luminance signal output from the camera. If the detected brightness of the image is low, which can occur for example at night, the illumination control means control the optical output of the near-infrared illumination means g to a proper value corresponding to the brightness of the image. In the daytime, a bright enough image can be obtained, and thus the image can be taken under the visible light components of sunlight. In the operation during the daytime, a visible light rejection filter may be disposed in front of the camera so that a bright and sharp face image may be taken under the near-infrared light component of the sunlight without having the problem of the chromatic aberration of the camera lens.

The face image taken by the camera 1 is applied to the image input means 1 of the apparatus b of processing an image of a face and converted into a digital halftone image. The gray level conversion means 2 extracts black-level areas with a dimension less than a predefined value. The variable binarization means 3 then converts the digital halftone image into a binary image according to a variable threshold. The eye searching area setting means 4 defines a pair of rectangular areas in the binary image which are considered to have a high probability of containing right and left eyes, respectively, thereby restricting the eye searching areas in the above narrow areas. The candidate area setting means 5 further restricts eye candidate areas in narrower areas within the respective eye searching area. Finally, the eye area detection means 6 extracts an eye in each candidate area. After eyes have been extracted by the face image processing apparatus b, the instantaneous eye detection means c detects open-and-close motion of the eyes. The doze judgement means d determines whether the driver is dozing or not on the basis of the information of the open-and-close motion. If the doze judgement means d concludes that the driver is dozing, the alarm means e gives an alarm to the driver.

Each means in the apparatus b of processing an image of a face is described in greater detail below with reference to FIGS. 2 to 12.

In FIG. 2, if a digital halftone image is applied to the gray level conversion means 2, an averaging-along-X-axis filter 21 calculates an average value of signal levels of three adjacent picture elements thereby removing high spatial frequency noise and thus obtaining a smoothed image.

The resultant signal is divided into two, and one is applied to a subtractor 24 after passing through a maximum picture element signal extraction filter 22 and a minimum picture element signal extraction filter 23, while the other is applied directly to the subtractor 24. The subtractor 24 outputs a signal equal to the difference between these two input signals.

The maximum picture element signal extraction filter 22 and the minimum picture element signal extraction filter 23 are made up of hardware in such a manner as shown in the circuit diagram of FIG. 3. As can be seen from FIG. 3, these filters are each composed of picture element delay circuits 25 which impose a delay on each picture element signal (note that only a part of the delay circuit 25 is shown in FIG. 3) and comparators 26 for comparing the picture element signal level after delayed to the signal level before delayed. An input signal applied to the picture element delay circuit 25 via an input terminal DATA IN is transferred from each stage to its succeeding stage in the delay circuit in response to the control signal applied to a control terminal CLOCK. Each comparator 26 makes a comparison of the signal level of a picture element with that of an adjacent picture element. The results of comparisons are further compared to one another step by step according to the tournament rule. The ultimate filter output FLT OUT gives a maximum value (in the case of the maximum picture element signal extraction filter 22) or a minimum value (in the case of the minimum picture element signal extraction filter 23) of as many picture elements as the number (15 in the case of the example shown in FIG. 3) of nodes disposed between the input and output of the delay circuit 25. A control signal is applied to each comparator 26 via a terminal MAX/MIN so that when a MAX control signal is applied, each comparator 26 provides an output equal to a greater input signal of the two input signals, while when a MIN control signal is applied, each comparator 26 provides an output equal to a smaller input signal of the two input signals, whereby the delay circuit as a whole acts as a maximum picture element signal extraction filter 22 or the minimum picture element signal extraction filter 23. The number of nodes between the input and output terminals, or the number of picture elements whose maximum signal level is extracted, is set to a value slightly greater than the value corresponding to the height of the eye area. In the present embodiment, 28 is employed as the number of nodes.

Figure 43:
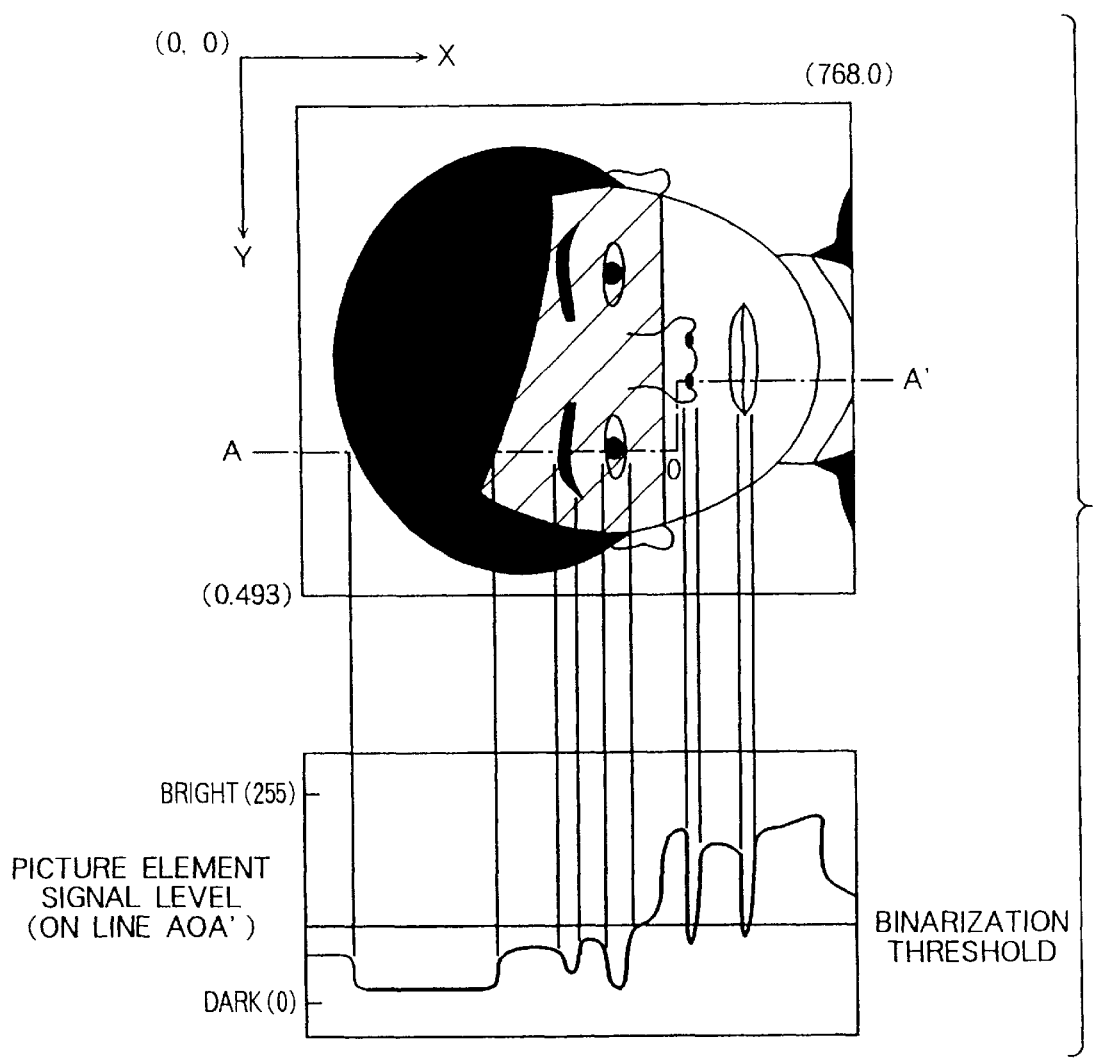
FIG. 43 is a schematic representation of the process of converting a face image into a binary form.

FIG. 4 illustrates processing steps of converting the picture element signal levels shown in FIG. 43 (along line AOA') into a binary image according to the present embodiment of the invention, wherein the conventional technique could not convert such the signal into a correct binary image. After passing through the averaging-along-X-axis filter 21, the picture element signal level of the image will be as such as represented by P1 in FIG. 4. In the image P2 obtained after passing through the maximum picture element signal extraction filter 22 and the minimum picture element signal extraction filter 23, the signal levels of the picture elements within ranges less than the filter length are fixed to the levels sliced by the filters. The subtractor 24 subtracts the signal levels of the image P1 from the that of the image P2. As a result, only the black-level areas with a dimension smaller than the filter length are successfully extracted as represented by P3 in FIG. 4. Therefore, even if the face is shaded by a disturbance which may occur depending on the direction or the altitude of the sun or by the influence of other circumstances such as sunlight filtering down through trees, it is possible to clearly extract the characteristic feature areas of the face, such as eyebrows, eyes, nares, and a line between lips, as shown in FIG. 4. In daytime, it is possible to take an image of a face under sunlight and process the face image without using any particular artificial illumination. This allows a reduction in cost of the apparatus. Furthermore, black areas which are greater in vertical direction than the predetermined filter length are not extracted. Therefore, at an early operation stage, it is possible to remove the hair area which varies from person to person and thus would result in a great influence on the operation.

Furthermore, the maximum picture element signal extraction filter 22, the minimum picture element signal extraction filter 23, and the subtractor 24 are preferably implemented by hardware consisting of the simple circuit configurations described above so that these circuits can operate in response to the control signal generated at the same timing as the image scanning timing. As a result, the gray level conversion means for extracting characteristic feature areas of the face can be realized at a low cost. Furthermore, this gray level conversion means can operate on a real time basis.

In this way, black-level areas are extracted, and thus a differential image P3 is obtained. Then in the variable binarization means 3, the binarization means 32 converts the differential image P3 into a binary image P4 according to the binarization threshold determined by the threshold calculation means 31. The resultant binary image P4 is stored in the binary image frame memory 11.

FIG. 5 is a flow chart of the operation of determining the threshold value which is used in the above binarization operation. First, in step S301, the threshold calculation means 31 calculates the sum SUMPX of the signal levels of the picture elements lying on the previous scanning line (in the X-direction) and memorizes the result as SUMPX. In step S302, a maximum picture element signal level is determined, and stored as MAXPX. Then in step S303, the threshold SHL is calculated according to the equation described below:

$$SHL = SUMPX/(768 - 2*SFLT) + MAXPX/C1 + C2 \quad (1)$$

where SFLT is the picture element length of the maximum picture element signal extraction filter 22 and the minimum picture element signal extraction filter 23, and C1, C2 are constants. Using this threshold value SHL, the binarization means 32 converts the signal levels of the picture elements lying on the current scanning line into binary values (two-level values). In equation (1), the first term on the right side represents the average of the signal levels of the picture elements lying on the previous scanning line. In this way, the signal levels of the picture elements on the current scanning line are converted into binary values according to the binarization threshold SHL determined as a weighted linear function of the average and the maximum value of the signal levels on the previous scanning line so as to ensure that conversion into binary values can always be performed correctly regardless of whether the image contains local or partial variations in gray level.

Using the face centroid detection means 41, the eye searching area setting means 4 calculates the sums of the picture element signal levels in the X- and Y-directions, respectively, of the binary image 12 stored in the binary image frame memory 11 thereby obtaining a Y-direction histogram SUMY501 and an X-direction histogram SUMX502, as shown in FIG. 6. From these results, the eye searching area setting means 4 further calculates the coordinates (XFC, YFC) of the position of the face centroid 7 according to the following equation:

$$XFC = \Sigma i\, Xi\, SUMX(Xi)/\Sigma i SUMX(Xi)$$

$$YFC = \Sigma j Yj\, SUMX(Yj)/\Sigma j SUMX(Yj) \quad (2)$$

In the above equation, $\Sigma i\, SUMX(Xi) = \Sigma j\, SUMX(Yj)$, and therefore it is not required to calculate $\Sigma j\, SUMX(Yj)$.

Thus, characteristic feature areas of the face such as eyebrows, eyes, nares, and a line between lips except for hair are extracted from the binary image 12, and it can be concluded that eyes are located at substantially symmetrical positions on the right and left sides near the face centroid 7. Therefore, using the coordinates (XFC, YFC) of the face centroid, the eye searching area definition means 42 defines a pair of base points PER and PEL for rectangular eye searching areas 40 as follows:

Base Point PER: $(X,Y) = (XFC-XECA, YFC-YECA)$,

Base Point PEL: $(X,Y) = (XFC-XECA, YFC+YECA-EACW)$. (3)

Thus a pair of eye searching areas 40 are defined in such a manner that they extend in the Y-direction by EACW and in the X-direction by ECAH from the base points PER and PEL, respectively. In the above definition, both XECA and YECA can have variable magnitudes depending on the distance between the camera and the face to be monitored and also on the camera viewing angle. Similarly, EACW and ECAH are set to proper values depending on the above conditions so that eyes are contained in the given areas. In this embodiment, the camera is disposed about 60 cm apart from the face, and EACW is set to a value corresponding to 100 picture elements and ECAH is set to a value corresponding to 180 picture elements.

Then, as shown in FIG. 7, the candidate area setting means 5 calculates the X-direction profile of the sum of the picture element values along the Y-direction within the eye searching area 40 using eye searching area Y-direction histogram calculation means 51 thereby obtaining a Y-direction histogram SUMY501. Then, using eye candidate zone setting means 52, the candidate area setting means 5 takes an area EAH which has a value of SUMY greater than the threshold value SHL as an eye candidate band area 520 thereby restricting the eye seeking area to a narrower area. In the example shown in FIG. 7, an eyebrow area BER1 and an eye area BER2 are nominated as eye candidate band areas 520.

Then as shown in FIG. 8, eye candidate area X-direction histogram calculation means 53 calculates a Y-direction profile of the sum of the signal levels of picture elements in the X-direction within the eye candidate band area 520 across the width ECAW of the eye-existing area thereby obtaining an X-direction histogram SUMX502. Then eye candidate area setting means 54 sets areas in the eye candidate band area 520 having a value of SUMX greater than the threshold value SHL as eye candidate areas 50 having a Y-direction length EAW and an X-direction length EAH. In the example shown in FIG. 8, In the example shown in FIG. 7, an eyebrow area BER11 and an eye area BER21 are nominated as eye candidate areas 50.

Finally in the eye area detection means 6, eye evaluation function calculation means 61 calculates an eye evaluation function for each eye candidate area 50 defined above and eye candidate area selection means 62 ultimately selects a pair of eye candidate areas 50 as eyes from the above eye candidate areas 50 judging from the eye evaluation function values.

FIG. 9 is a flow chart illustrating the detail of the above-described process of distinguishing eye areas. In step S601, it is judged whether an eye candidate area 50 is present or not. If there is an eye candidate area 50, then the width EAW of the eye candidate area BERij is read in step S602. In step S603, it is checked whether the width EAW is in the allowable range between a minimum value EAWMIN and a maximum value EAWMAX which are determined depending on the distance between a camera and a face to be monitored and also on the camera viewing angle. If it is concluded that the width EAW is out of the above allowable range, the area BERij is considered not to be an eye area. In this case, to call another eye candidate area, the process goes to step S604 and j or i of the area BER is incremented. Then the process returns to step S601. If the width EAW of the area BERij is in the allowable range, the process goes to step S605, and an X-direction histogram SUMX of the area BERij, which has been calculated in advance, is read. In step S606, a maximum value SUMXMAX of SUMX is determined, Then in step S607, an eye area evaluation function EFV1 which represents the complexity of the X-direction histogram is calculated according to equation (4) described below. That is, the sum of the difference between the maximum value SUMXMAX and each histogram value SUMX across the width EAW of the area BERij is calculated and then this value is normalized with respect to the sum of the entire histogram values.

$$EFV1 = \Sigma y(\text{SUM}X\text{MAX} - \text{SUM}X)/\Sigma y\text{SUM}X \qquad (4)$$

Then in step S608, an evaluation function EFV2 which represents the maximum value of the X-direction histogram relative to a constant C is calculated as described in equation (5).

$$EFV2 = \text{SUM}X\text{MAX} - C \qquad (5)$$

The product of these two evaluation function EFV1× EFV2 is calculated and the result is employed as the eye area evaluation function EFV. In step S610, the eye area evaluation function EFV is compared with the minimum value EFVMIN. If EFV is greater than EFVMIN, it is concluded that the area BERij is an eye area, and thus in step S611 the numbers (i, j) associated with the BERij are memorized. Then the process goes to step S612. If EFV is equal to or smaller than EFVMIN, the process returns to step S604.

Although the product of EFV1 and EFV2 is employed as the eye area evaluation function EFV in the above process, a linear combination with proper weighting constants C1, C2, that is, C1×EFV1+C2×EFV2, may also be employed as the eye area evaluation function EFV. In this case, experiments show that a relatively great value of the weighting constant C1 results in a good result in extracting an eye area.

As shown on the right side of FIG. 8, an eye area has a histogram which has a rather sharp peak corresponding to the black part of the eye area, and has large differences between the maximum value SUMXMAX and SUMX. On the other hand, as shown on the left side of FIG. 8, an eyebrow area in an eye searching area 40 has a histogram having a rather flat shape and small differences between the maximum value SUMXMAX and SUMX. Therefore, the evaluation function EFV1 of an eye area has a value a few time greater than that of other areas. Furthermore, when an eye is open, the black part of the eye has a large value in the maximum value SUMXMAX of the histogram and thus has a large value in the evaluation function EFV2 compared to the other areas. As a result, the product of the evaluation functions or EFV becomes maximum in an eye area. The minimum value EFVMIN used in step S610 described above is determined taking into account the person-to-person variation in EFV of an eye area in an eye searching area 40. In the present invention, as described above, the histogram representing characteristic features of an eye is used to detect an eye area, and thus it is possible to correctly detect the eye, as opposed to the conventional size-detection-based technique which often fails to detect an eye.

In step S612, the geometric center (XEC, YEC) of a rectangular eye detection area BERij is calculated and employed as a representative point of the area BERij. In step S613, the distance DETFC between the representative point (XEC, YEC) and the face centroid 7 (XFC, YFC) is calculated and memorized. Furthermore, in step S614, the Y-coordinate YEC of the representative point is compared with the Y-coordinate YFC of the face centroid. If YEC>YFC, then the process goes to step S615 and a right eye FLAG of the area BERij is set so as to indicate that the area BERij is a right eye detection area. In the opposite case, the process goes to step S616, and a left eye FLAG is set so as to indicate that the area BERij is a left eye detection area. The above steps S601–S616 are performed repeatedly until all eye candidate areas have been processed.

If each eye candidate area has been evaluated using the evaluation function EFV, the process goes to step S617 and it is determined whether tehere is an eye detection area. If there is no eye detection area, it is concluded that no eyes are extracted after all, and thus the process goes to step S618 in which an eye-detection-failure FLAG is set. In the case there is one or more eye detection areas, the process goes to step S619, and the FLAGs of the eye detection areas are checked. If the right eye FLAG is set, then the eye detection area is considered a right eye detection area. Then in step S620, it is judged whether the distance DETFC of the area BERij is a minimum of the right eye detection areas. If yes, then the area BERij is ultimately regarded as a right eye. On the other hand, if it is concluded in step S619 that the left eye FLAG is set, then the area is considered a left eye detection area. Thus, the process goes to step S622, and it is judged whether the distance DETFC of the area BERmn is a minimum of the left eye detection areas. If yes, then the area BERmn is ultimately regarded as a left eye. In steps S620 and S622, if the distance DETFC is not a minimum, then the process goes to step S624 so as to check whether there is another eye detection area. If there is still another eye detection area, the process goes to step S625 and the eye detection area number is incremented. The process returns to step S619. In the case where it is judged in step S624 that there is no further eye detection area, it is concluded that either a right or left eye is not extracted and thus a one-eye-detection-failure FLAG is set in step S626.

As shown in FIG. 6, in the present embodiment, the hair area is removed from the binary face image and therefore the centroid of the binary face image does not depend on the hair which has a large area and has a shape varying from person to person. As a result, the eye area is located at a position in the eye searching area nearest to the face centroid 7. These facts are effectively used in the present invention, as described above, to detect correctly eye areas judging from not only the shape of eyes but also the distance between the eyes and the face centroid 7.

FIGS. 10 to 12 illustrate an image of a face wearing glasses and the eye detection process for this face image using the technique disclosed in the first embodiment. FIG. 10 illustrates an input face image. FIG. 11 illustrates a binary image obtained after processing the input face image shown in FIG. 10 with the gray level conversion means 2 and the variable binarization means 3. As can be seen, the hair area is removed from the image with the gray level conversion means 2. Furthermore, the vertical parts of the frame of the glasses are also removed and thus there remains only the horizontal parts whose width measured in the vertical direction of the face is shorter than the filter length of the gray level conversion means 2. In such a case, as shown in FIG. 12, the upper horizontal frame portion BER21 of the glasses is included as one of the eye candidate areas 50 in an eye searching area 40 together with other eye candidate areas such as an eyebrow area BER11 and an eye area BER31. In the example shown in FIG. 12, the lower horizontal frame portion is partly included in the eye searching area 40. If a black area extends across a horizontal side of an eye searching area 40 as in this example, that black area is employed as an eye searching area 520. This is because black block areas are usually long in the horizontal direction of the face and thus the shape of the X-direction histogram SUMX of black block areas is influenced by the shape of the sliced portion of the eye searching area 40. Although it is not shown in the figures, the X-axis histogram SUMX of the upper horizontal frame portion BER31 of the glasses has a flat shape similar to that of the eyebrow area BER11 shown in FIG. 8. Therefore, as in the area BER11, such the area BER21 is rejected in the evaluation according to the evaluation function EFV performed in step S610 shown in FIG. 9 and thus is not employed as an eye detection area. Thus, only BER31 is employed as an eye area.

As described above, this first embodiment makes it possible to easily extract an eye area even when a driver wears glasses.

Furthermore, in this embodiment, the calculation of histograms such as the Y-direction histogram SUMY501 and the X-direction histogram SUMX502 is performed at a high speed using hardware including a counter circuit. The eye searching area setting means 4 and the candidate area setting means 5 are also preferably implemented with hardware, and thus it is possible to extract eyes for a short time.

Embodiment 2

Figure 13:
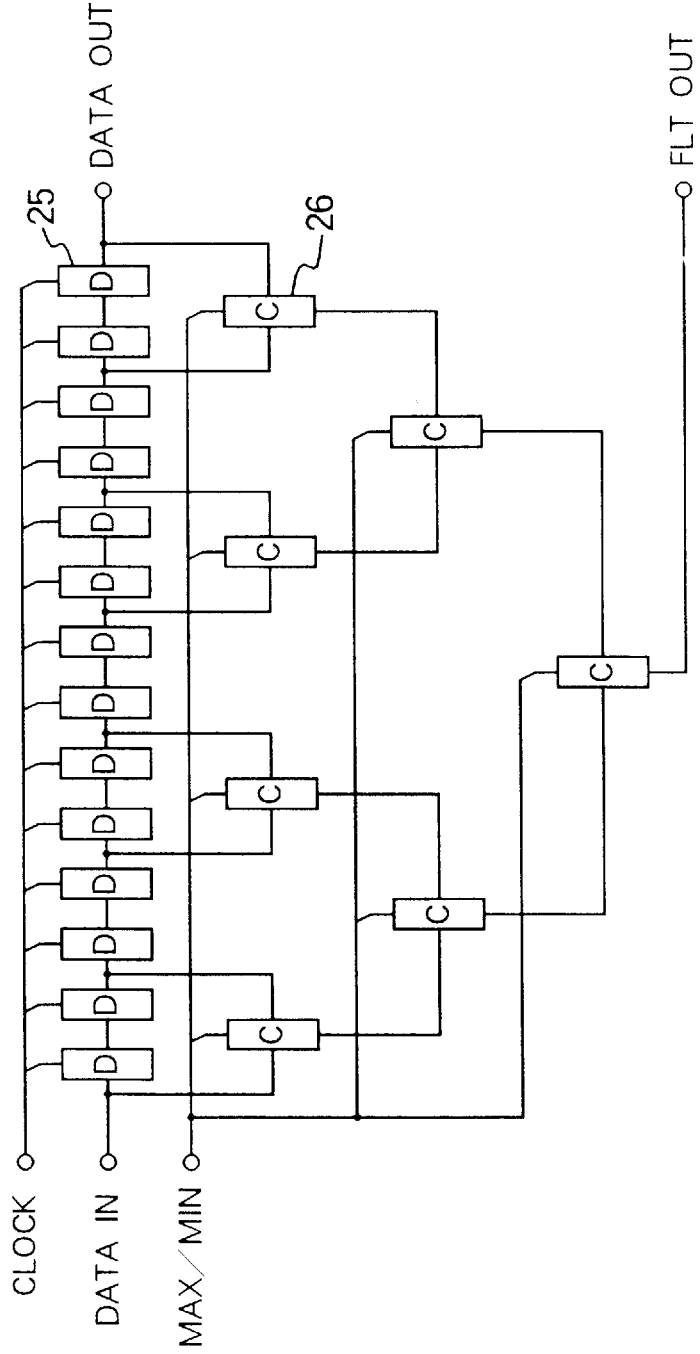
FIG. 13 is a circuit diagram of another embodiment of a MAX/MIN picture element signal extraction filter according to the present invention.

FIG. 13 is a circuit diagram of another embodiment of a MAX/MIN picture element signal extraction filter according to the present invention. As shown in FIG. 13, the filter has a filter length corresponding to 15 picture elements as in the first embodiment. However, unlike the first embodiment, the comparator 26 performs comparison of picture element signal levels every two picture elements, and finally outputs a maximum or minimum value of eight picture elements of the above-described 15 picture elements via the filter output terminal FLT OUT. The signal levels of picture elements are averaged over a several picture elements and high spatial frequency noise is removed by an averaging filter and thus the gray level distribution of an image is smoothed. Therefore, in the comparison operation, the MAX/MIN picture element signal extraction filter can jump as many number of picture elements as the number of picture elements of the averaging filter without having problems in extracting characteristic features of face. In the example described here, the comparison is performed every two picture elements, and therefore the filter needs only a half the number of comparators. This allows a reduction in cost.

Embodiment 3

Figure 14:
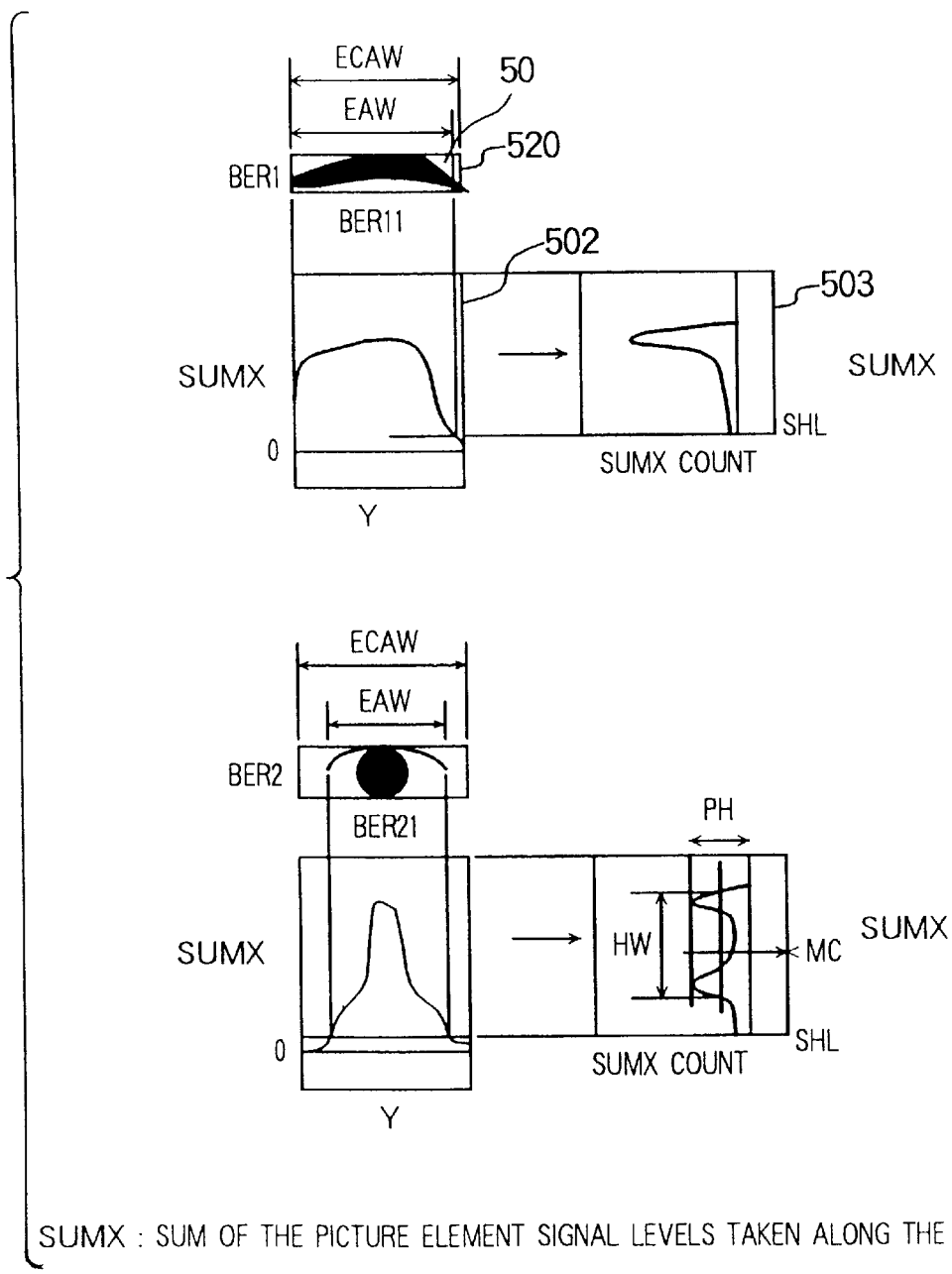
FIG. 14 is a schematic illustration of another eye area detection means according to the present invention.

FIG. 14 is a schematic illustration of another eye area detection means, wherein reference numeral 503 denotes a frequency distribution curve of an X-direction histogram SUMX502 of each eye candidate area 50, MC denotes the centroid position of the frequency distribution, PH denotes the peak value of the frequency distribution, and HW denotes the half-value width of the frequency distribution. As can be seen from FIG. 14, in the case of an eyebrow area BER11 the shape of SUMX results in a sharp single peak in the frequency distribution curve 503. In contrast, in an eye area BER21, the frequency distribution curve has twin peaks caused by the iris-and-pupil. Therefore, of eye candidate areas in the eye searching area 40, an eye candidate area having a maximum HM/PH and having two peaks on the right and left sides respectively of MC is regarded as an eye area by the eye area detection means 6.

Thus, the eye area detection means 6 can successfully extract an eye area. In this technique, high reliability can be obtained in the extraction of an eye area because the frequency distribution curve of the X-direction histogram has a great difference in shape between an eye area and the other characteristic feature areas.

Embodiment 4

Figures 15A, 15B, 15C:
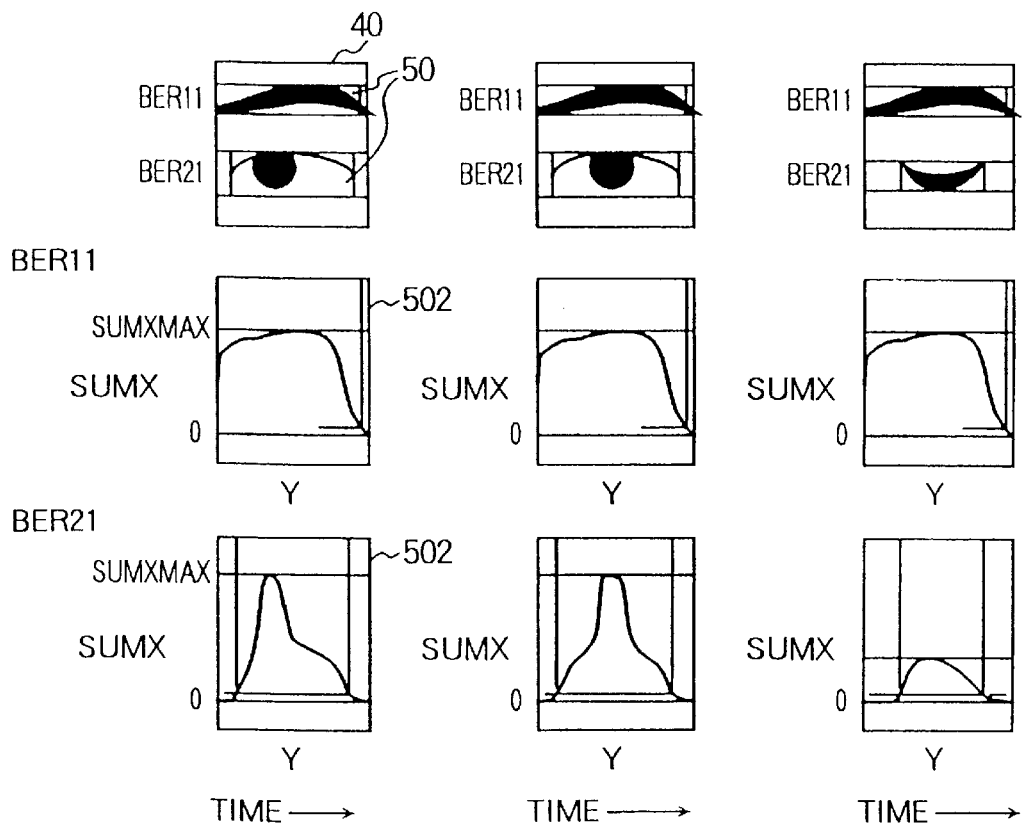
FIG. 15 is a schematic illustration of still another eye area detection means according to the present invention.
Figure 15D:
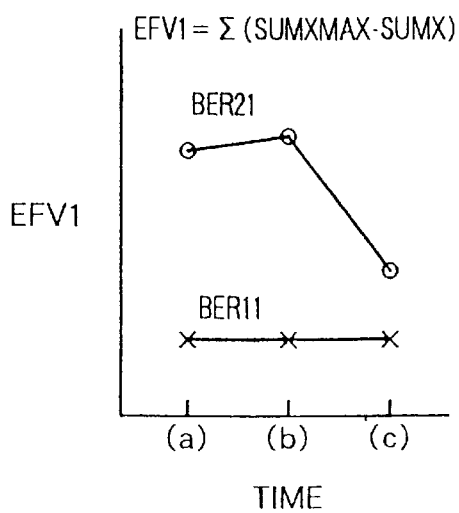
Figure 15E:
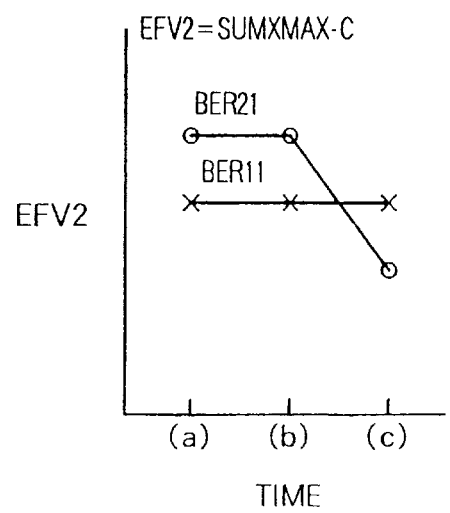

FIG. 15 is a schematic illustration of still another eye area detection means. In this eye area detection means, an eye area is detected by detecting a change in the shape of the eye with time. With elapse of time, the binary image of the eye searching area 40 and the X-direction histogram 502 of each eye candidate area existing in the eye searching area 40 change as illustrated at (a) through (c) in FIG. 15. In addition, FIG. 15 illustrate, at (d) and (e), changes in evaluation functions EFV1 and EFV2, respectively, calculated from the X-direction histogram 502 for each eye candidate area. As shown in FIG. 15, the X-direction histogram 502 of the eyebrow area BER11 has little change with elapse of time and is substantially flat in shape. As a result, both EFV1 and EFV2 remain substantially constant with elapse of time. In contrast, the X-axis histogram 502 of the eye area BER21 changes in shape with time because eyes are opened and closed and the viewing angle changes with time. Therefore, the eye evaluation functions EFV1 ad EFV2 show great changes, which result mainly from open-and-close motion of eyes. In view of the above, the eye evaluation functions EFV1 and EFV2 are calculated each time an image is input and the results are stored in memory. Changes in the eye evaluation functions EFV1 and EFV2 among a predetermined number of images are calculated, and an eye candidate area showing greatest changes is judged to be an eye.

In this embodiment, as described above, an eye area is detected on the basis of the change in the eye evaluation function with elapse of time. If an eye is detected judging from the evaluation function value of only one image, it can be difficult to correctly detect the eye. For example when the eye is closed, such difficulty occurs. However, the technique of the present embodiment makes it possible to correctly detect an eye without having confusion with other parts such as an eyebrow or glasses. Furthermore, if the evaluation function also includes, in addition to the above terms, the Y-coordinate or the centroid Y-coordinate of SUMX relative to the area width EAW so that peak position of the evaluation function reflects these parameters, then the evaluation function value reflects the change in the viewing angle of an eye and thus it becomes possible to more correctly extract an eye area.

Embodiment 5

Figure 16:
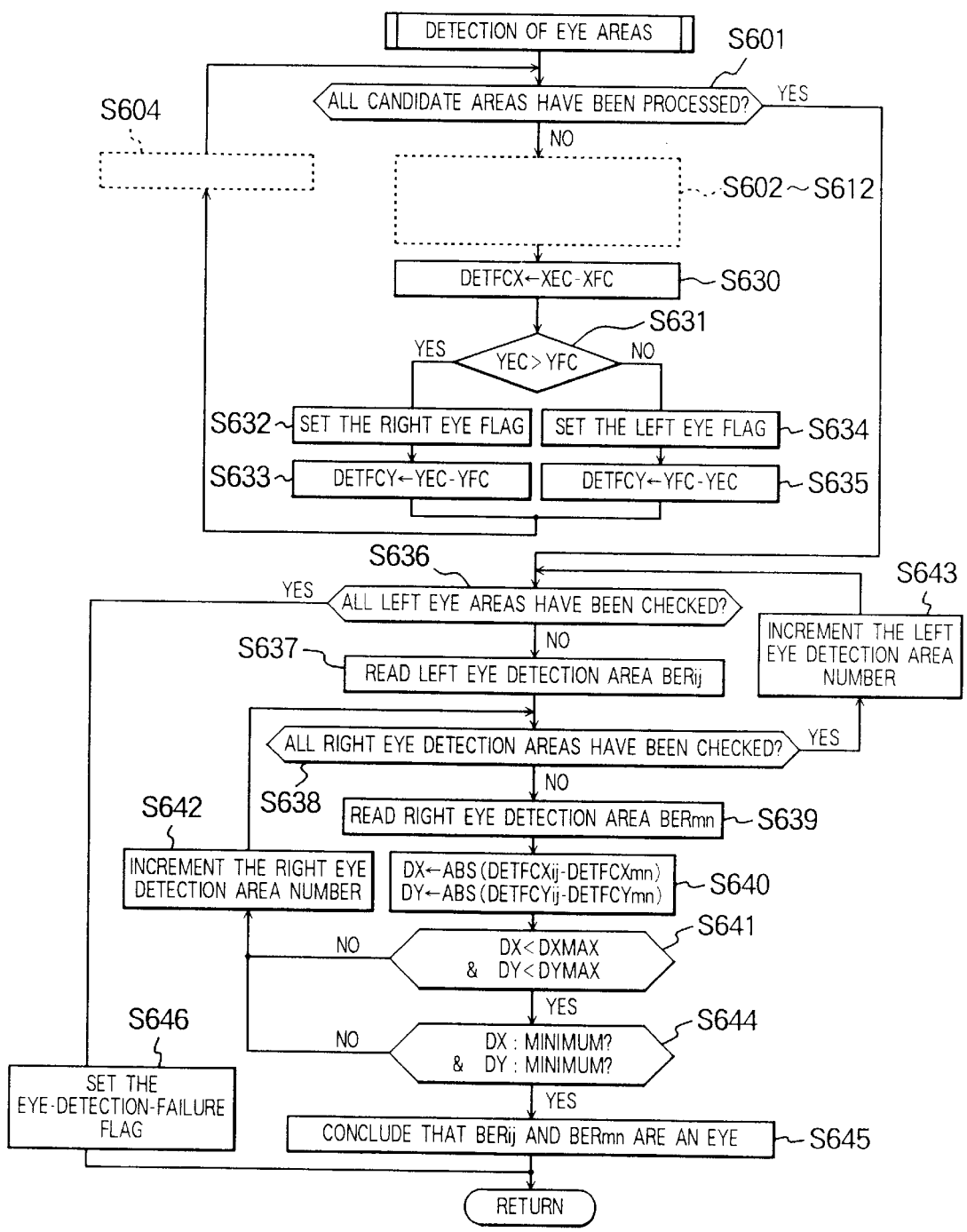
FIG. 16 is a flow chart of the process of detecting an eye area using still another eye area detection means according to the present invention.

FIG. 16 is a flow chart of the process of detecting an eye area using still another eye area detection means. In step S630 after completion of step S612, the difference DETFCX between the X-coordinate XEC of the representative point of the eye detection area BERij and X-coordinate XFC of the face centroid is calculated and stored in memory. In step S631, the Y-coordinate YEC of the representative point is compared with the Y-coordinate YFC of the face centroid. If YEC is greater than YFC, then it is concluded that the area BERij is located at the right of the face centroid 7, and thus the right eye FLAG is set in step S632. In step S633, the difference (DETFCY=YEC−YFC) is calculated and stored in memory. If YFC is greater than YEC, the process goes to step S634, and the left eye FLAG is set. Then in step S635, the difference (DETFCY=YFC−YEC) is calculated and stored in memory. The above process is performed for all candidate areas. If it is concluded in step S601 that the setting has been completed for all eye detection areas, the process goes to step S636 and it is checked whether there is a left eye detection area judging from the left eye FLAG. If a left eye detection area is present, the process goes to step S637 so as to call the left eye detection area BERij. In step S638, it is checked whether there is a right eye detection area judging from the right eye FLAG, and the right eye detection area BERmn is called in step S639. In step S640, the absolute values DX and DY of the differences DETFCX and DETFCX associated with the areas BERij and BERmn, respectively, are calculated and stored in memory together with the identification numbers (i, j) and (m, n) of the areas. In step S641, it is checked whether both DX and DY are smaller than the maximum values DXMAX and DYMAX, respectively. If either DX or DY is equal to or greater than the corresponding maximum value, it is concluded that the combination of the areas BERij and BERmn is not of an eye area. In this case, another right eye detection area is selected in step S642, and evaluated in a similar manner. If it is concluded in step S638 that all combinations for one left eye detection area has been evaluated, the process goes to step S643 to select another left eye detection area, and the process described above is repeated for that left eye detection area. If both DX and DY are smaller than the respective maximum values DXMAX and DYMAX, the process goes to step S644 so as to further check whether both DX and DY are equal to the respective minimum values. If yes, then in step S644 that combination of the areas BERij and BERmn is ultimately concluded to be an eye area. If either DX or DY is not equal to the corresponding minimum value, the process goes to step S642 so as to select another right eye detection area. In this process, if it is concluded in step S636 that all combinations for all eye detection areas have been evaluated, then it is concluded that there is no eye area and thus the process goes to step 646 in which the eye-detection-failure FLAG is set.

In the binary face image of the present invention, as described earlier, an eye area is located at a position in each eye searching area nearest to the face centroid 7, wherein one eye area is on the right side of the image and the other one is on the left side at positions which are substantially symmetric about a line extending in the X-direction passing through the face centroid 7. Taking into the account the above fact, an eye area is detected on the basis of the further detailed positional relationship between an eye and the face centroid 7 so that the eye can be detected with higher reliability.

Embodiment 6

Figure 17:
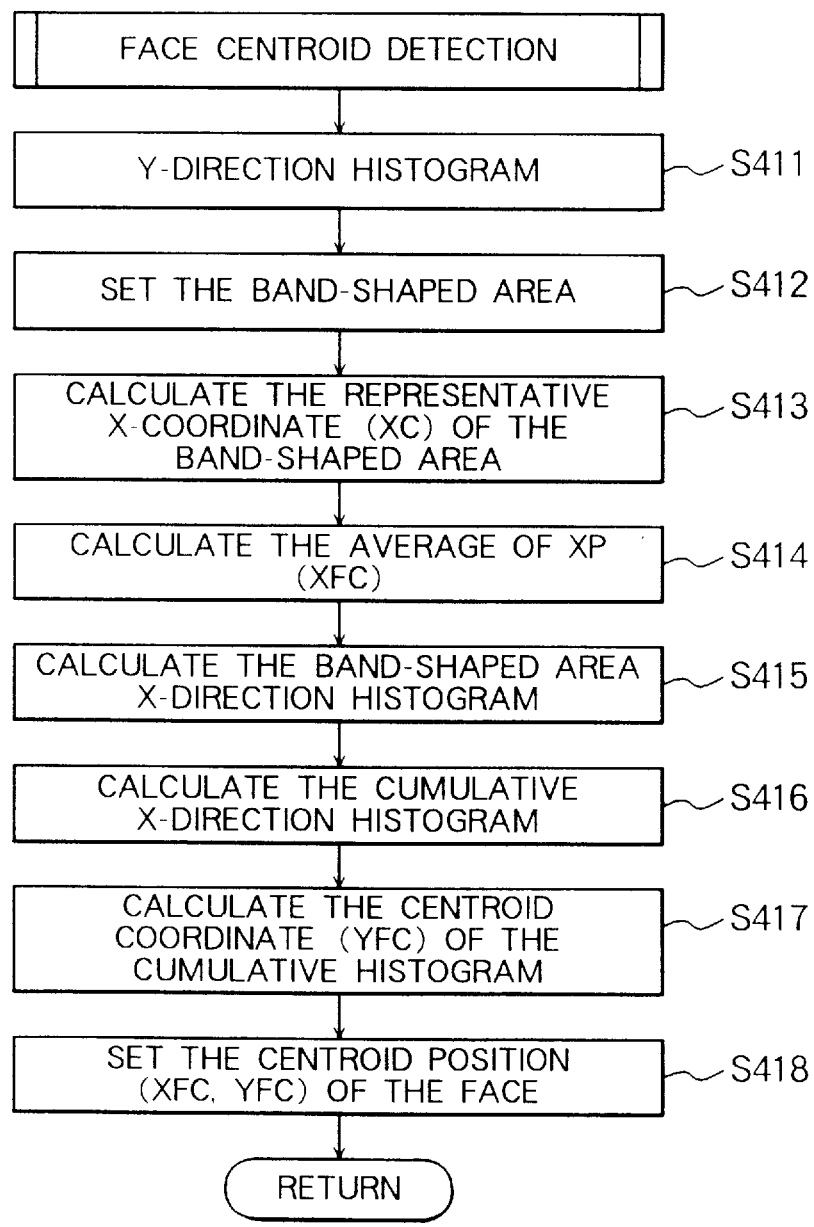
FIG. 17 is a flow chart of the process performed by face centroid detection means according to the present invention.
Figure 18:
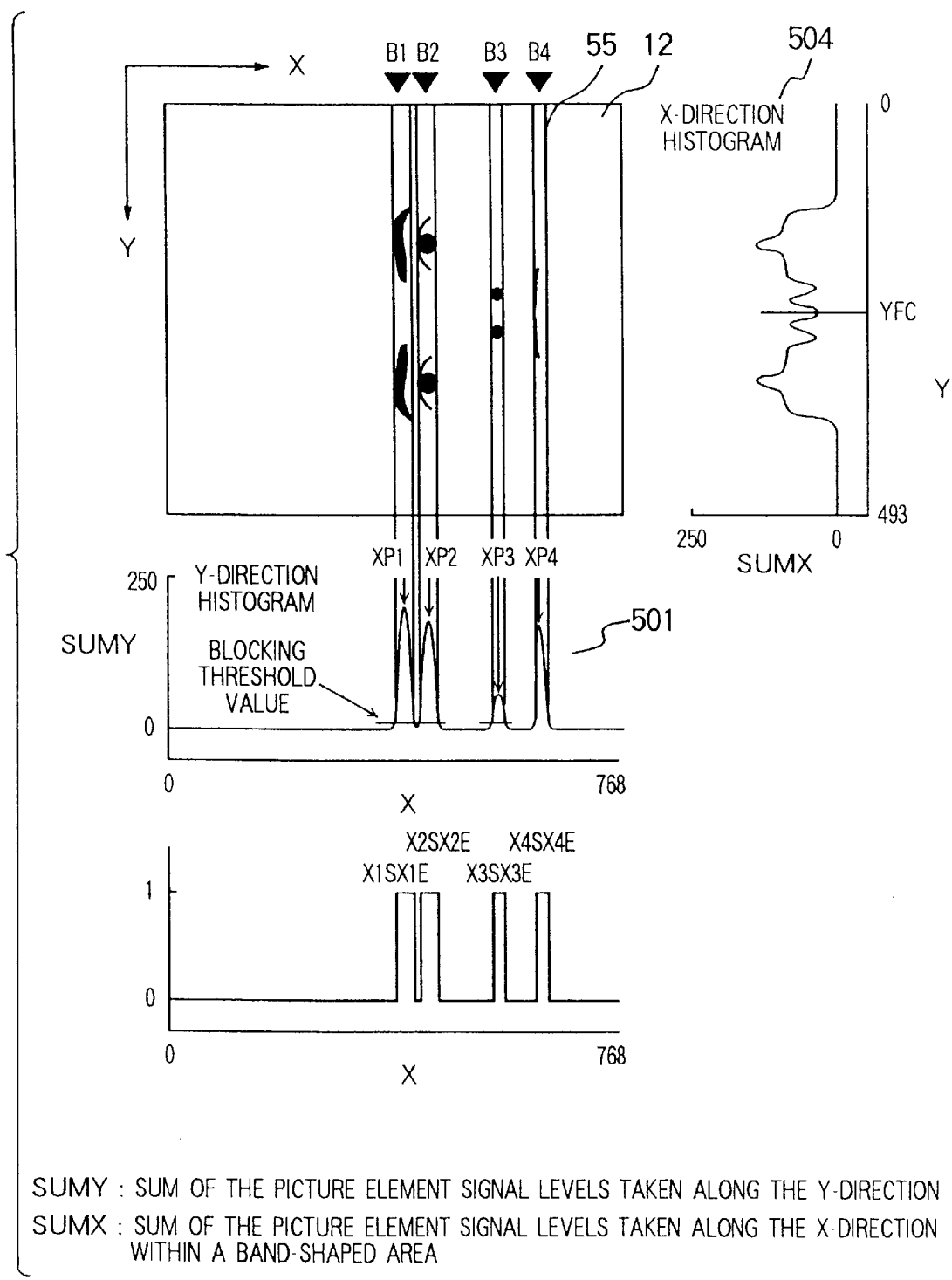
FIG. 18 is a flow chart of the process performed by another face centroid detection means according to the present invention.

FIGS. 17 and 18 illustrate another embodiment of face centroid detection means for detecting the face centroid 7 which is to be used to extract an eye area wherein FIG. 17 is a flow chart of the process performed by the face centroid detection means, and FIG. 18 is a schematic illustration of the process of detecting the centroid position of the face.

In step S411, an X-direction profile of the sum of the picture element values taken along the Y-direction of a binary image 12 is calculated thereby obtaining a Y-direction histogram SUMY501. In step S412, areas having a value of SUMY greater than a predefined blocking threshold value SHL are defined as band-shaped areas 55. In step S413, the peak position XPi of SUMY in each band-shaped area Bi is determined and employed as the representative point coordinate XC of the band-shaped area. Then in step S414, the average value XFC of XC is calculated. In the case where a band-shaped area Bi has two or more peaks, it is preferable that the coordinate of the middle point between the boundary coordinates Xis and Xie of the band-shaped area Bi is employed as the representative point coordinate XC. Then in step S415, a Y-direction profile of the sum of the picture element values taken in the X-direction is calculated thereby obtaining an X-direction histogram for each band-shaped area Bi. Furthermore, in step S416, the sums are added together for all band-shaped areas so as to obtain an X-direction histogram SUMX504. In step S417 the Y-coordinate YFC of the centroid of the resultant X-direction histogram SUMX is calculated. In step S418, XFC and YFC representing the coordinates (XFC, YFC) of the centroid position of the face FC are stored in memory.

In this embodiment, the face centroid 7 is determined calculating the histogram as in the previous embodiments. Furthermore, the calculation is preferably performed with hardware and thus it is possible to reduce the memory space required for the calculation as well as the calculation amount. This allows a reduction in time required to calculate the coordinates of the face centroid.

Embodiment 7

Figure 19:
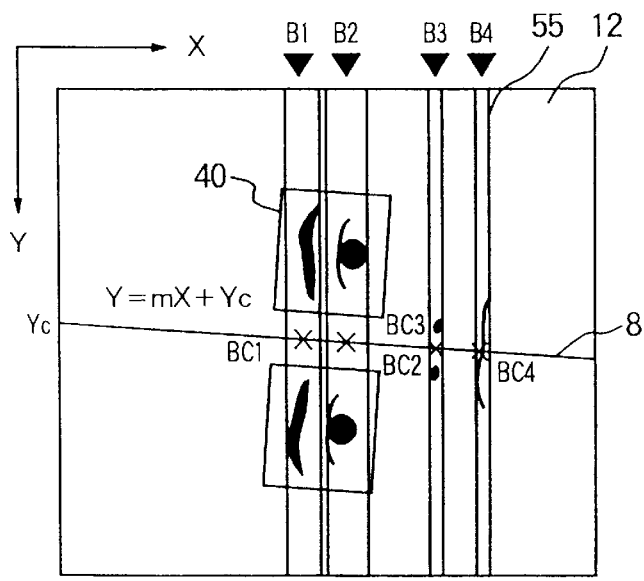
FIG. 19 is a schematic representation of the process of setting eye searching areas in a binary image on the basis of the face center line and the face centroid, according to the present invention.
Figure 20:
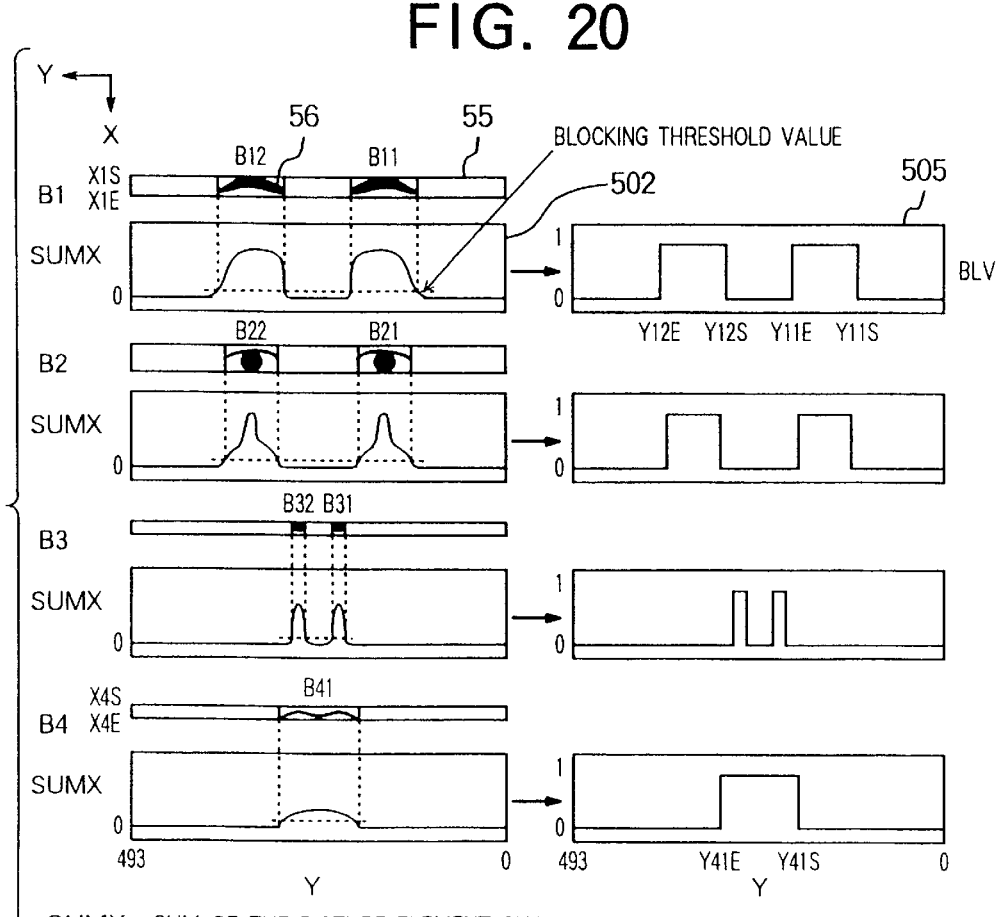
FIG. 20 is a schematic representation of the process of setting candidate areas using X-direction histograms of band-shaped areas, according to the present invention.

FIGS. 19 and 20 illustrates another embodiment of eye searching area setting means wherein FIG. 19 is a schematic representation of the process of setting eye searching areas in a binary image on the basis of the face center line and the face centroid, and FIG. 20 is a schematic representation of the process of setting candidate areas using X-direction histograms SUMX of band-shaped areas.

Referring to FIG. 19, characteristic feature areas are extracted in the binary image 12 and eye areas are located at the right and left of the vertical center line of the face at positions near the face centroid FC. As in Embodiment 6, band-shaped areas Bi55 are defined in the binary image 12. Then the X-coordinate XBCi of the centroid of the Y-direction histogram SUMY501 is calculated for the band-shaped areas Bi55 in the binary image 12. The Y-coordinate YBCi of the centroid position of the X-direction histogram SUMX502, which represent the Y-direction profile of the sum of the picture element signal level taken along the X-direction, is calculated for each band-shaped area Bi. A line Y=mX+Yc which best fits the centroid coordinates BGi(XBCi, YBCi) of the respective band-shaped areas Bi is determined, and this line is employed as the face center line 8. Such a line can be obtained using the least squares fitting method. Then as in Embodiment 6 described above, the coordinates (XFC, YFC) of the centroid position of the face FC are calculated from the Y-direction histogram SUMY501 and the X-direction histogram SUMX502. Furthermore, two points PER and PEL are determined which has an X-coordinate apart by XECA from the centroid position of the face FC along the face center line 8 and has Y-coordinates apart by YECA and YECA−EACW, respectively, from the face center line 8 in the direction vertical to the face center line 8. Then, using these two points PER and PEL as base points, a pair of rectangular eye searching areas 40 are defined so that one side is parallel to the face center line 8 and each rectangular eye searching area has a Y-direction length EACW and an X-direction length equal to ECAH thereby restricting the eye seeking areas in narrower areas, wherein X-direction is taken along the horizontal direction of the face, and Y-direction is taken along the vertical direction of the face as elsewhere. In this definition, as in Embodiment 1, EACW and ECAH are set to proper values taking into account the distance between the camera and a face to be monitored and the viewing angle of the camera so that these values ensure that eye areas are contained in the rectangular eye searching areas.

In the present embodiment, the calculations are performed on the basis of the calculation of the histograms as in Embodiment 6 and thus it is possible to quickly define eye searching areas. Furthermore, the eye searching areas are restricted in narrower areas determined with reference to the face center line 8 and the face centroid 7. This allows a further reduction in memory space required to detect eyes. Furthermore, even if a face is in a slanted position, eye searching areas can be defined so that eyes can be detected in the eye searching areas.

Embodiment 8

Figure 21:
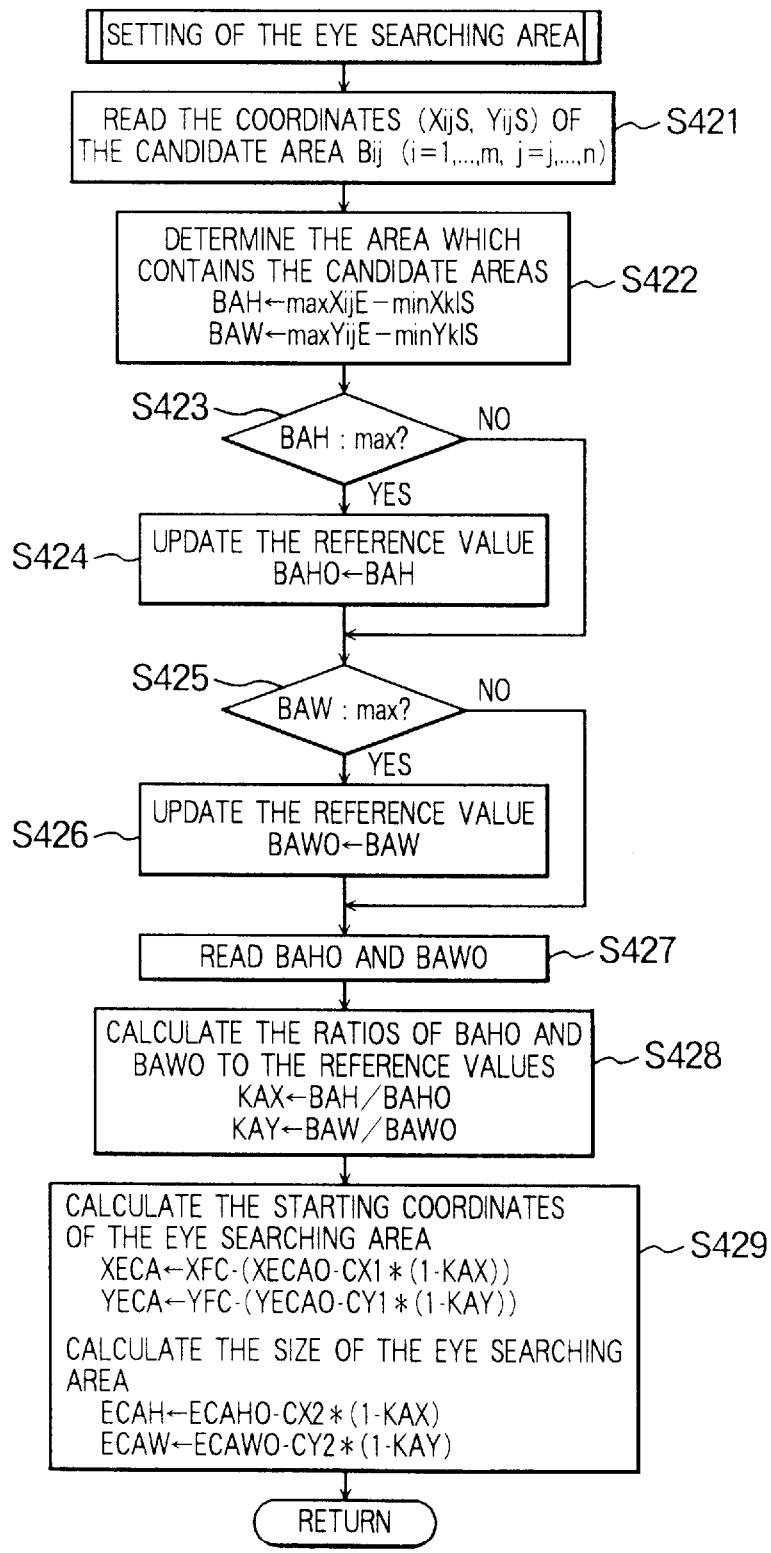
FIG. 21 is a flow chart of the process of setting eye searching areas according to another embodiment of the invention.
Figure 22:
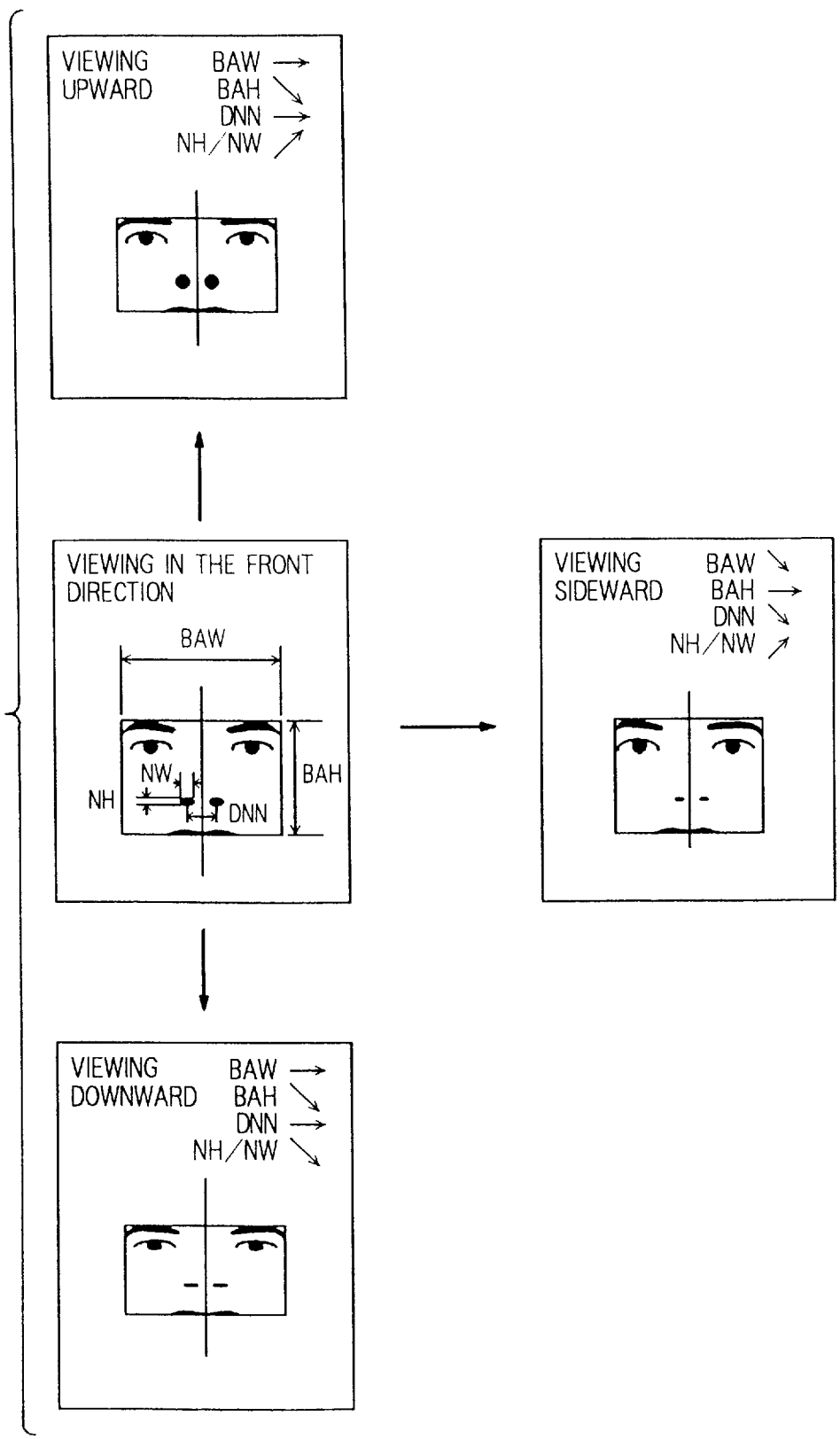
FIG. 22 illustrates the variations of the binary image with the change in the orientation of a face.

FIGS. 21 and 22 illustrate still another embodiment of eye searching area setting means, wherein FIG. 21 is a flow chart of the process of setting eye searching areas, and FIG. 22 illustrates the changes of the binary image 12 which occur depending on the orientation of the face. The present embodiment is described in detail below with reference to these figures and also FIGS. 18 and 20 as required.

Referring first to FIG. 18, the Y-direction histogram SUMY501 associated with the binary image 12 is calculated, and areas having a SUMY value greater than a predefined blocking threshold value SHL are taken as band-shaped areas 55. Then as shown in FIG. 20, X-direction histogram SUMX502 along the Y-direction is calculated for each band-shaped area Bi. Segments in which SUMX has a value greater than a predefined blocking threshold value SHL are sliced, and rectangular areas having an X-direction width equal to the width of the band-shaped area Bi and having a Y-direction width equal to the width of the above sliced segments are taken as candidate areas Bij. The starting point coordinates (Xijs, Yijs) and the ending point coordinates (Xije, Yije) located at the opposite angles of the candidate area Bij are stored in memory together with the identification number ij of the candidate area Bij. As for a band-shaped area Bi, the coordinates (X11s, Y11s) and (X11e, X11e) of a candidate area B11 containing the left eyebrow and the coordinates (X12s, Y12s) and (X12e, X12e) of a candidate area B12 containing right eyebrow are stored in memory.

Then in step S421 shown in FIG. 21, the coordinates of starting points and ending points of all candidate areas Bij in the current binary image 12 are read. In step S422, the minimum value of the starting point coordinates of all candidate areas Bij and the maximum values of the ending point coordinates in both X- and Y-directions of the image are calculated, and then a rectangular black block-existing area is defined using these minimum and maximum values so that all candidate areas Bij are contained in this rectangular black block-existing area, that is, the rectangular black block-existing area has a height BAH along the vertical direction of the face and has a width BAW along the horizontal direction of the face wherein BAH and BAW are equal to the difference between the maximum value of the ending point coordinates and the minimum value of the starting point coordinates in the corresponding directions. Then the information of this rectangular black block-existing area is stored in memory. Then in step S423, it is checked whether BAH is a maximum of a predetermined number of images by comparing it with a reference value BAHO of the previous images. If BAH is a maximum, that is BAH is greater than BAHO, then the process goes to step S424 so as to update the reference value BAHO by employing BAH as a new reference value. Similarly, in step S425 it is checked whether BAW is a maximum. If yes, then the process goes to step S426 and BAW is employed as a new reference value BAWO. In step S427, the reference values BAHO and BAWO are read, and then in step S428 the ratios of BAH and BAW to the reference values BAHO and BAWO are calculated as KAX and KAY, respectively. In step S429, using these ratios KAX and KAY, the starting coordinates (XECA, YECA) of an eye searching area and the size ECAH, ECAW of the eye searching area are calculated as follows:

$$XECA = XFC - (XECAO - CX1 \times (1-KAX))$$

$$YECA = YFC - (YECAO - CY1 \times (1-KAY)) \quad (6)$$

$$ECAH = ECAHO - CX2 \times (1-KAX)$$

$$ECAW = ECAWO - CY2 \times (1-KAY) \quad (7)$$

where CX1, CY1, CX2, CY2 are weighting factors, XECAO and YECAO are reference distances under the conditions of KAX=1, KAY=1, ECAHO is a reference height of the eye searching area under the condition of KAX=1, and ECAWO is a reference width of the eye searching area under the condition of KAY=1. In the above description, the starting coordinates of the eye searching area are of the left eye and those of the right eye are not described here.

As shown in FIG. 22, the distance between right and left eyes varies depending on the horizontal deviation in the face orientation, and the distance between the eyes and the eyebrows and the distance between the eyes and the nares vary depending on the vertical deviation in the face orientation. The black block-existing area becomes greatest in width BAW and height BAH when the face is in the front position. In the present embodiment, the width and height of the black block-existing area which are obtained when the driver's face is in front position are employed as the reference values for determining the position and size of the eye searching area 40. This ensures that the eye searching area 40 can be set in an optimum fashion depending on the orientation of the driver's face, the variation from person to person in the face shape, and the distance between the camera and the face.

In the present embodiment, as described above, the height and width of the black block-existing area of a predetermined number of images are stored in memory and the reference height BAHO and width BAWO of the black block-existing area are determined by detecting the maximum height and width among the predetermined number of images. However, if the fact that the driver's face is most frequently in the front position is taken into account, it is also possible to define the reference values as follows. That is, the appearing frequencies of the width BAW and height BAH are counted with proper segments, and the medians of BAW and BAH of segments showing the greatest counts are employed as the reference values.

Furthermore, in the present embodiment, the location and the size of the black block-existing area are defined using the ratios KAX and KAY of the width BAW and height BAH to the reference values BAWO and BAHO. However, it is also possible to define the location and the size of the eye searching area using an equation in which 1−KAX and 1−KAY are substituted by the height BAH and the width BAW.

Embodiment 9

In Embodiments 6 and 7, the coordinates (XFC, YFC) of the face centroid FC are determined from the Y-direction histogram SUMY501 of the binary image 12 and the X-direction histogram SUMX504 of band-shaped areas defined on the basis of the Y-direction histogram SUMY501. However, the coordinates (XFC, YFC) of the face centroid FC may also be determined as follows. The representative point coordinates (XBij, YBij) of each candidate area Bij are represented by the middle points between the starting point coordinates (Xijs, Yijs) and the ending point coordinates (Xije, Yije) as written below.

$$XBij = (Xijs + Xije)/2$$

$$YB_{ij}=(Y_{ijs}+Y_{ije})/2 \qquad (8)$$

Then using the number $N_{ij}$ of black level picture elements within the candidate area $B_{ij}$, the coordinates (XFC, YFC) of the face centroid FC are determined according to the following equation:

$$XFC=\Sigma i \Sigma j N_{ij} XB_{ij}/\Sigma i \Sigma j N_{ij}$$

$$YFC=\Sigma i \Sigma j N_{ij} YB_{ij}/\Sigma i \Sigma j N_{ij} \qquad (9)$$

In this embodiment, the number of black-level picture elements in each candidate area $B_{ij}$ is quickly counted by a counter and the face centroid FC (7) can be determined by a small number of multiplication and division operations. Thus, the calculations required are simplified and it is possible to quickly determine the coordinates of the face centroid.

Embodiment 10

Figure 23:
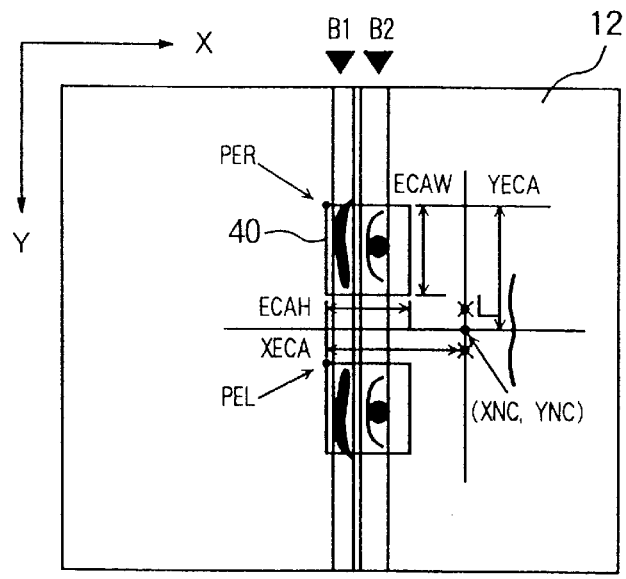
FIG. 23 is a schematic representation of the process of setting eye searching areas in a binary image, according to still another embodiment of the invention.
Figure 24:
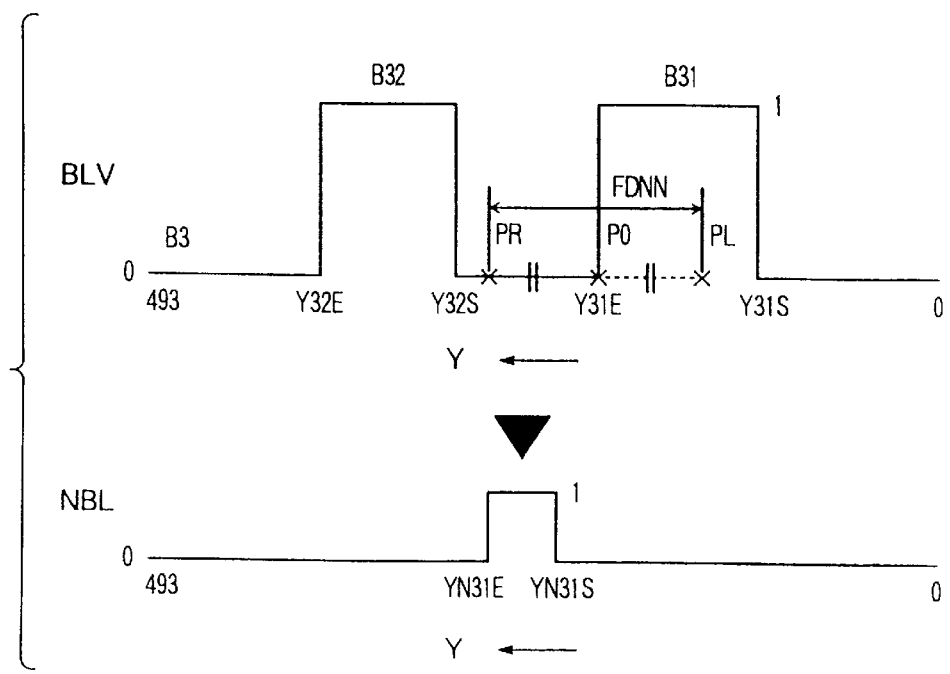
FIG. 24 is a schematic representation of the process of detecting a naris area, according to the present invention.

FIGS. 23 and 24 illustrate another embodiment of eye searching area setting means based on the position of nares, wherein FIG. 23 is a schematic representation of the process of setting eye searching areas in a binary image, and FIG. 24 is a schematic representation of the process of detecting a naris area. The present embodiment is described in detail below with reference to these figures wherein FIG. 20 will be also referred to as required. As shown in FIG. 23, a left naris area LNA and a right naris area RNA are extracted from the candidate areas $B_{ij}$ which are defined in the binary image 12 in the above-described manner. Then the middle point (XNC, YNC) between the representative point coordinates (XLN, YLN) and (XRN, YRN) of each area is calculated. Taking into account the fact that eye areas are located at particular positions relative to the locations of naris areas, a pair of rectangular eye searching area 40 can be defined using two edge points PER and PEL located at particular positions represented by equation (3) relative to the middle points (XNC, YNC) between nares so that the eye searching area 40 has a Y-direction width of EACH and an X-direction height ECAH. thereby restricting the eye searching area in the above-described particular area.

The naris area LNA and RNA are derived as follows. As shown in FIG. 20, the X-direction histogram 502 across the width of a band-shaped area is calculated for each band-shaped area Bi which is set in a binary image 12 on the basis of the Y-direction histogram 501. The X-direction histograms 502 are sliced with respect to the blocking threshold value thereby setting candidate areas $B_{ij}$. In the present embodiment, the candidate areas $B_{ij}$ are stored in binary form in memory BLV at a location having a zone number i for each band-shaped area Bi as shown on the right side of FIG. 20. For example, in the case of B1, "1" is stored in a zone from Y11S to Y11E of the memory BLV so as to represent a candidate area B11, and also in a zone from Y12S to Y12E so as to represent an area B12 wherein the other memory portions are filled with "0".

Then as shown in FIG. 24, the memory BVL is scanned and accessed along the Y-direction while monitoring the values stored in the memory BLV at three points PL, PO, PR in the zone i wherein these three points are apart by FDNN/2 from each other. If "1" is detected at both end positions PL and PR apart by FDNN and "0" is detected at the middle point P0, "1" is stored in memory NBL at a location corresponding to the middle point P0. In the other cases, "0" is stored in the memory NBL. In the above process, the distance FDNN refers to an average distance between nares, and is stored beforehand in memory. In this embodiment, the distance FDNN is set to a value corresponding to 45 picture elements. After scanning all band-shaped areas Bi, two widest zones Bij and Bij+1 having "1" in the memory NBL are taken as naris areas. In the case of the band-shaped area B3 shown in FIG. 24, BLV has a value of "1" when PO is in the range from YN31S slightly greater than Y31E of the candidate area B31 to YN31E slightly smaller than Y32S of the candidate area B32. In contrast, in the other band-shaped areas B1, B2, B4 shown in FIG. 20, adjacent candidate areas are apart by a distance greater than FDNN and thus there is no area having "1" in the memory NBL. Therefore, it is concluded that the candidate areas B31 and B32 are naris areas LNA and RNA.

The representative point coordinates (XLN, YLN) (or (XRN, YRN)) of the naris area LNA (or RNA) can be determined so that XLN is at the peak position or so that the X-coordinate of the centroid of the Y-direction histogram 501 of a band-shaped area containing a naris area LNA and XLN is equal to the Y-coordinate of the centroid of the X-direction histogram 502 of the naris area LNA. In this calculation, if it is taken into account the fact that the naris has a substantially elliptic and thus symmetric shape, it is also possible to determine XLN and YLN by simply calculating a middle point between the starting point coordinate and the ending point coordinate of a candidate area of each naris, as represented in equation (8).

In this embodiment, as described above, nares are detected by simply comparing the distance between adjacent candidate areas with a preset reference naris-to-naris distance. Then taking into account the fact that eyes must be located above the nares detected, two rectangular area are disposed as eye searching areas at the right and left sides of a point above the middle point between the naris areas thereby restricting detection areas of eyes in narrower areas. In this technique it is possible to correctly detect eyes with reference to the naris positions even in the case where because of the presence of a black block area other than characteristic feature areas, the face centroid 7 is shifted from a correct position and thus it becomes difficult to detect eyes on the basis of the face centroid 7.

Embodiment 11

Figure 25:
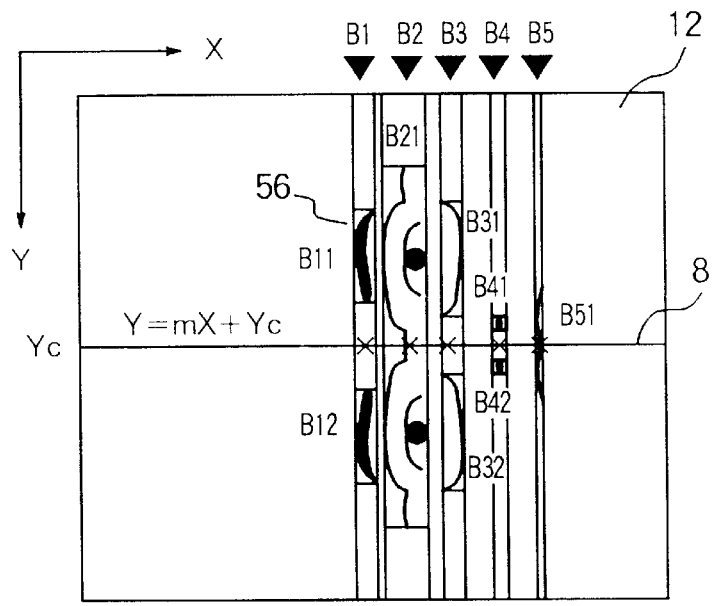
FIG. 25 illustrate a binary image of a face wearing glasses in which candidate areas and the face center line are defined.
Figure 26:
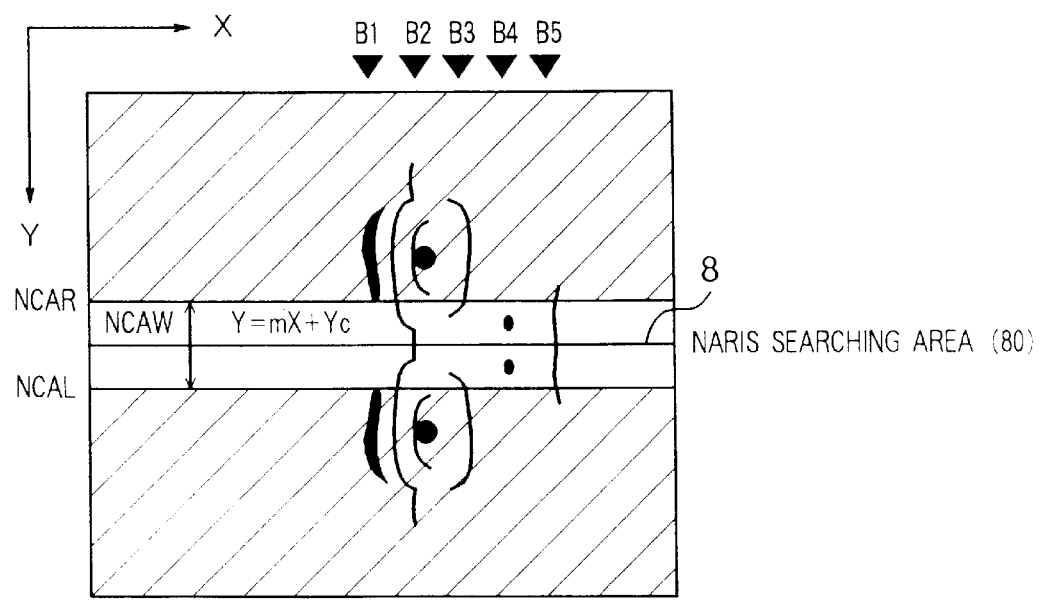
FIG. 26 illustrates naris searching areas defined in the binary image.
Figure 27:
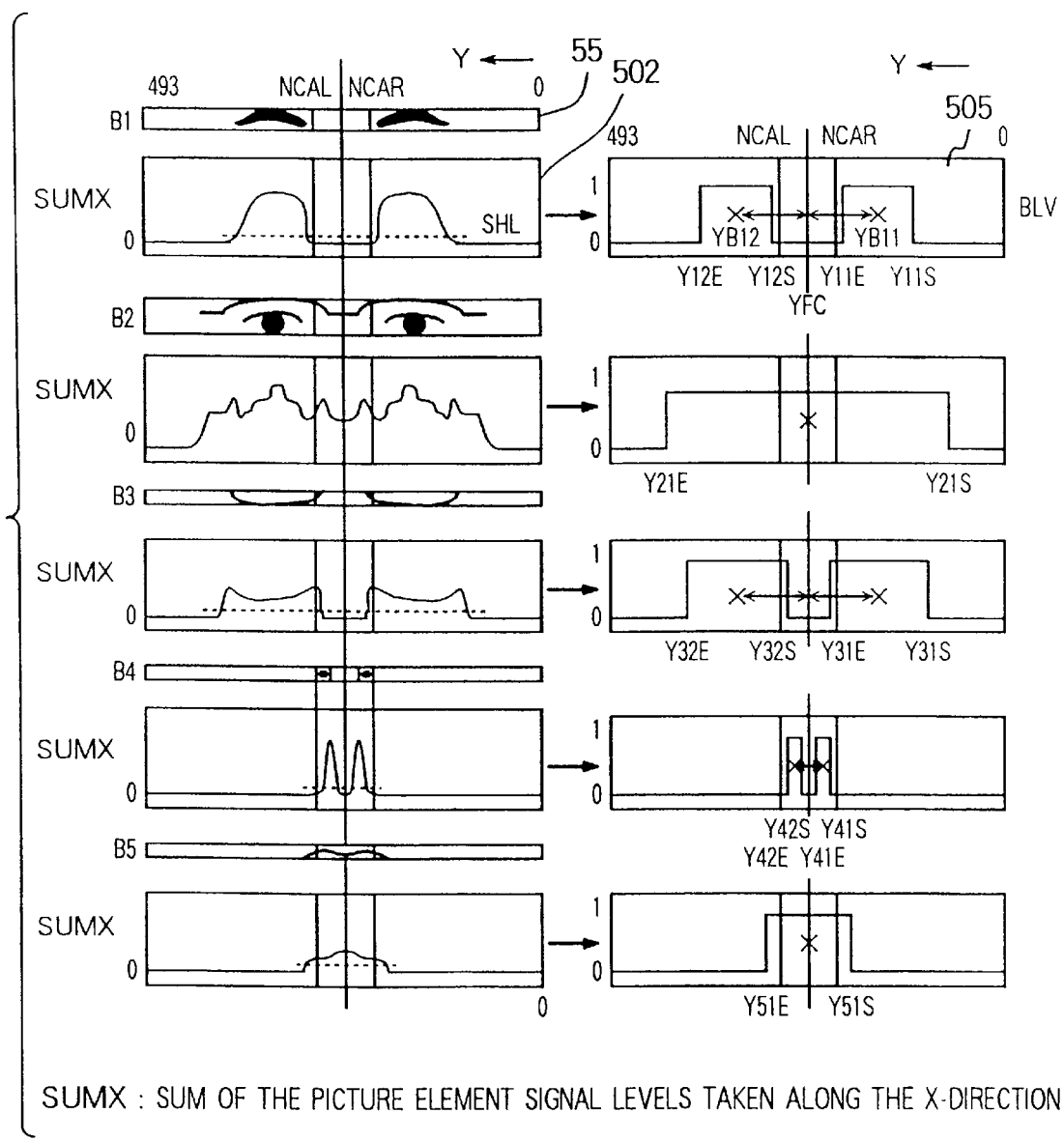
FIG. 27 is a schematic illustration of the process of setting naris searching areas according to the present embodiment.
Figure 28:
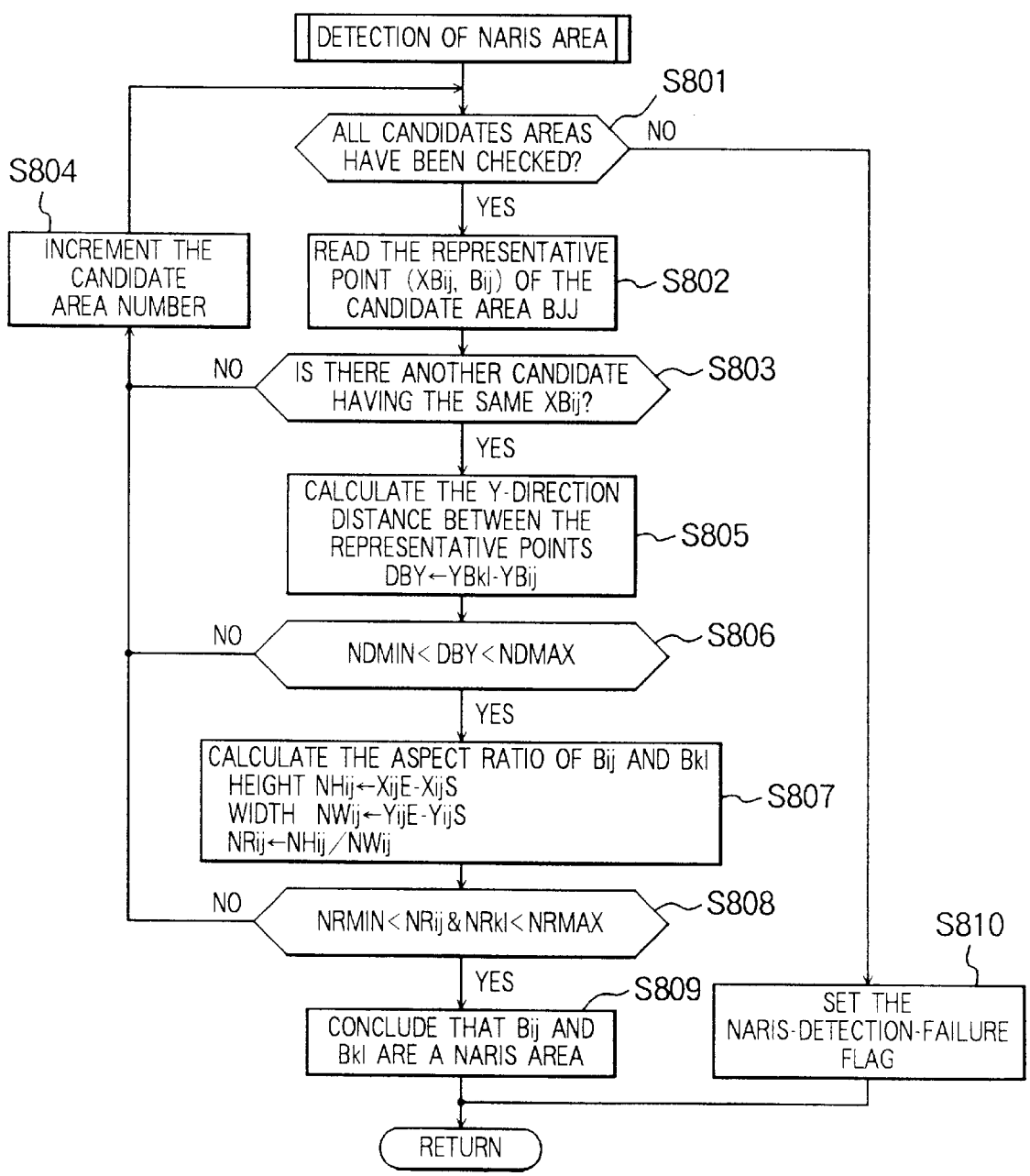
FIG. 28 is a flow chart of the process of judging whether an area is a naris area according to the present embodiment.
Figure 29:
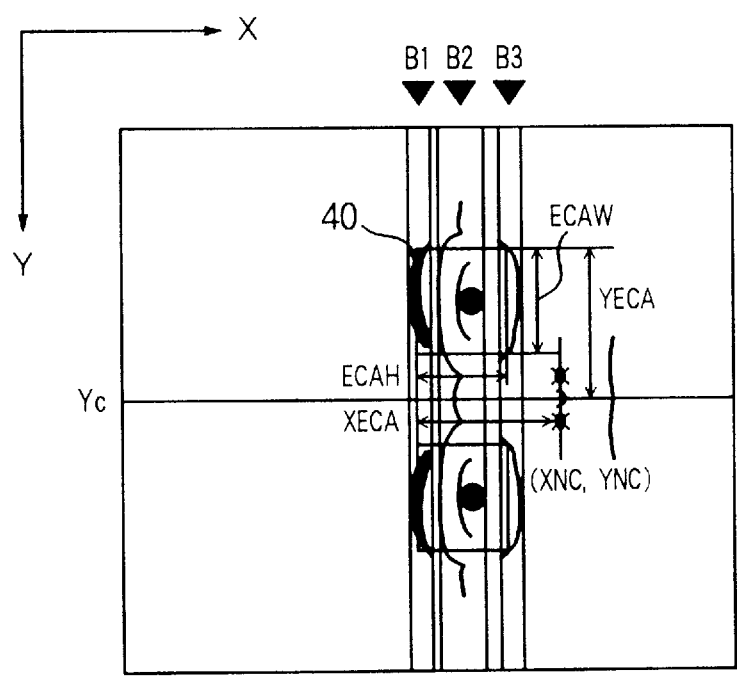
FIG. 29 illustrates eye searching areas defined in a binary image.
Figure 30:
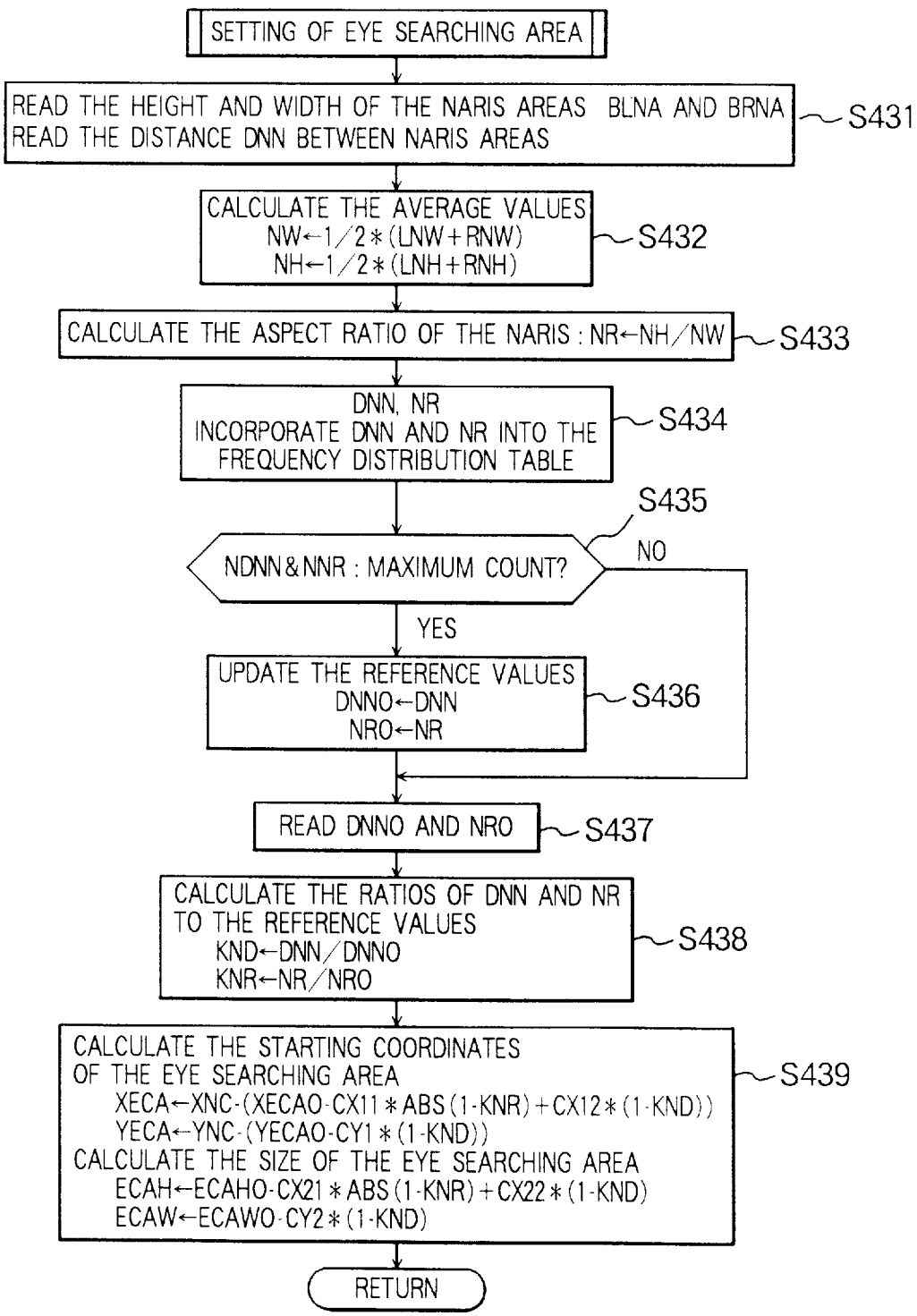
FIG. 30 is a flow chart of the process of setting an eye searching area according to another embodiment of the present embodiment.

FIGS. 25 to 30 illustrate another embodiment of eye searching area setting means on the basis of the position of nares, wherein FIG. 25 illustrate a binary image of a face wearing glasses in which candidate areas and the face center line are shown, FIG. 26 illustrates naris searching areas defined in the binary image, FIG. 27 is a schematic illustration of the process of setting naris searching areas according to the present embodiment, FIG. 28 is a flow chart of the process of judging whether an area is a naris area according to the present embodiment, FIG. 29 illustrates eye searching areas defined in a binary image, and FIG. 30 is a flow chart of the process of setting an eye searching area according to the present embodiment. The present embodiment is described in detail below with reference to these figures wherein FIG. 22 will be also referred to as required.

In FIG. 25, as in the previous embodiment, band-shaped areas Bi are determined from the Y-direction histogram 501 of a binary image 12 and candidate areas $B_{ij}$ are then determined from X-direction histogram 502 of each band-shaped area. In the above calculation, the representative point coordinates ($XB_{ij}$, $YB_{ij}$) of each candidate area $B_{ij}$ are determined so that the X-coordinate $XB_{ij}$ of the representative point of each candidate area $B_{ij}$ located in the same band-shaped area Bi is at the peak position of the X-coordinate of the centroid of Y-direction histogram 501 of the band-shaped area Bi, and the Y-coordinate $YB_{ij}$ of the representative point of each candidate area $B_{ij}$ is equal to the Y-coordinate of the centroid of the X-direction histogram 502 of each candidate area Bij. Then a line Y=mX+Yc that best fits to these representative point coordinates (XBij, YBij) is determined according to the least squares fitting method, and this line is employed as the face center line 8.

In this technique, the face center line 8 can be determined with a less amount of calculation than in the case of Embodiment 7. As a result, the face center line 8 can be obtained more quickly. Furthermore, the representative point coordinate XBij and YBij are defined by the middle points between the starting and ending points of the band-shaped area Bi and candidate area Bij. This simplified calculation allows a further reduction in time required for obtaining the face center line 8.

Of characteristic feature areas, some are present in a pair fashion. Of these pair-type characteristic feature areas, naris areas are located nearest to the face center line 8. If this fact is taken into account, naris areas can be detected as follows. As shown in FIG. 26, parallel lines NCAL and NCAR are disposed at the left and right sides respectively of the given face center line 8 so that each line is apart from the given face center line 8 by a distance NCAW/2, and the band-shaped area between these parallel lines is set as a naris searching area 80. Then naris areas are extracted from candidate areas Bij located within the naris searching area 80. In the setting of the naris searching area 80, its band width NCAW may be set to a value about twice the average distance FDNN between nares. In this embodiment, the band width NCAW is set to a value corresponding to 80 picture elements. In the example shown in FIG. 27, only two candidate areas within a band-shaped area B4 can be candidates of naris areas.

In this technique, naris candidate areas are restricted in the naris searching area 80, and nares are extracted from these naris candidate areas. As a result, nares can be easily extracted with a small amount of calculation without being disturbed by the presence of glasses or the like.

Then, representative point coordinates (XBij, YBij) of candidate areas Bij within the naris searching area 80 are calculated in the above-described manner, and naris areas are detected judging from the representative point coordinates and the starting and ending coordinates of the areas. Referring to FIG. 28, in step S801, it is checked whether there is a naris candidate area. If there is a candidate area Bij, then the process goes to step S802 and its representative point coordinates (XBij, YBij) are read. Then in step S803, it is checked whether there is another candidate area Bkl. If no, the process goes to step S804 and the identification number of the candidate area is incremented and the steps S801 to S803 are repeated. If it is concluded in step S803 that there is another candidate area Bkl, the process goes to step S805 and the distance between two candidate areas Bij and Bkl is determined by calculating the difference DBY between the representative point Y-coordinates. In step S806, it is checked whether DBY is within the predetermined allowable range from NDMIN to NDMAX. The allowable lower and upper limits NDMIN and NDMAX are preferably set to about 0.6 and 1.8 times the average distance FDNN between nares. If the two candidate areas Bij and Bkl are located within the above-described range, then the process goes to step S807 and the height NH, width NW, and the aspect ratio NR of each area are determined from the starting point coordinates and the ending point coordinates of each candidate area. In step S808, if it is concluded that NRij and NRkl are both within a predetermined range, the process goes to step S809 and it is concluded that two candidate areas Bij and Bkl are naris areas LNA and RNA.

If the conditions are not met in step S806 or S808, the process returns to step S804 so as to select another combination of candidate areas. Then the above-described steps are repeated. If it is concluded in step S801 that no further combination of candidate areas remains, the process goes to step S810 and the naris-detection-failure FLAG is set so as to indicate that no nares are detected.

Thus, in this embodiment, nares can be correctly detected on the basis of the evaluation function which reflects not only the distance between nares but also the naris's shape which is greatly different from the shape of other characteristic feature areas.

Then eye searching areas are defined on the basis of the positions and shape of detected nares. Referring now to FIG. 30, in step S431, the heights LNH and RNH and the widths LNW and RNW of the detected naris areas LNA and RNA as well as the distance DNN between the Y-coordinates of the representative points, which represents the distance between the two naris areas are read. In step S432, the averages of the heights and widths NH and NW are calculated, and then in step S433 the naris aspect ratio NR is calculated from NH and NW. The result is stored in memory. In the case where the naris aspect ratio NR is stored in memory, the stored naris aspect ratio NR may be read to detect a naris. Then in step S434, the naris-to-naris distance DNN and the naris aspect ratio NR are added to a frequency distribution table having segments with a proper width, and the count associated with that segment is incremented. At the same time, the count of the segment which has been counted at the process for a predetermined number plus one previous image is decremented so that the frequency distribution table always reflects the given constant number of images. Then in step S435, it is checked whether the counts NDNN and NNR corresponding to DNN and NR respectively show maximum values for the predetermined number of images. If both counts NDNN and NNR show maximum values, then the process goes to step S436 and the reference distance DNNO between nares and the reference naris aspect ratio NRO are updated to DNN and NR, respectively. In step S437, the above reference values DNNO and NRO are read. In step S438, the ratios KND and KNR of DNN and NR to the reference values DNNO and NRO, respectively, are calculated. In step S438, as shown in FIG. 29, two eye searching area 40 are defined so that each eye searching area has a height ECAH and width ECAW and is located at the starting coordinates which are apart by distance XECA and YECA from the middle point (XNC, YNC) between nares as described in the following equations:

$$XECA = XNC - (XECAO - CX11*ABS(1-KNR) + CX12*(1-KND))$$
$$YECA = YNC - (YECAO - CY1*(1-KND)) \quad (10)$$
$$ECAH = ECAHO - CX21*ABS(1-KNR) + CX22*(1-KND)$$
$$ECAW = ECAWO - CY2*(1-KND) \quad (11)$$

where equation (10) represents the starting coordinates of a left eye and CX11, CX12, CY1, CX21, CX22, and CY2 are predetermined weighting factors, and XECAO, YECAO, ECAHO, and ECAWO are variables similar to those in Embodiment 8.

In this embodiment, the eye searching area 40 is defined using the reference values of the distance DNN between nares and the naris aspect ration NR and the ratios of these reference values. Alternatively, the distance DNN between nares and the naris aspect ratio NR may also be used in a direct fashion. Otherwise, instead of the naris aspect ratio NR, the naris area SN defined by SN=NH*NW or the reference value SNO of the naris area SN may also be employed.

As shown in FIG. 22, the location of eyes relative to the location of nares vary with the distance DNN between nares, the naris aspect ratio NR, or the naris area SN. the naris area SN Taking into account the fact that the driver's face is most frequently in front position, maximum values of DNN and NR or SN among a predetermined number of images are employed to determine the position and the size of the eye searching area 40. Thus, the parameters under the condition in which the driver's face is in front position are employed as the reference values so that the eye searching area 40 can be set in an optimum fashion depending on the orientation of the face, the variation in face, and the distance between the camera and the face.

Embodiment 12

In Embodiment 11 described above, the band width NCAW of the naris searching area 80 is set to a fixed value. Alternatively, the band width NCAW may also be set as follows. Referring to FIG. 27, average value DBFYi of the distance DBFYij between the Y-coordinates YBij of the representative points of the candidate areas Bij located within the band-shaped area Bi and the Y-coordinates of the face center line 7 at the X-coordinate XBij of the representative points of the band-shaped area Bi is calculated for each band-shaped area Bi. Furthermore, the average value DBFY of the maximum and minimum values of the average values DBFYi for all band-shaped area Bi is calculated, and the band width NCAW is determined according to the following equation:

$$NCAW = NCAWO + 2*CD*DBFY \quad (12)$$

where NCAWO is the reference band width corresponding to about 20 picture elements, and CD is the weighting factor about 0.6. In the case where there is only one candidate area Bij in a band-shaped area Bi, as is in B2 or B5 shown in FIG. 27, the above calculation is not performed.

In this technique, the naris searching area can be set in a best fashion regardless of the variation in the shape of a face from person to person.

Embodiment 13

Figure 31:
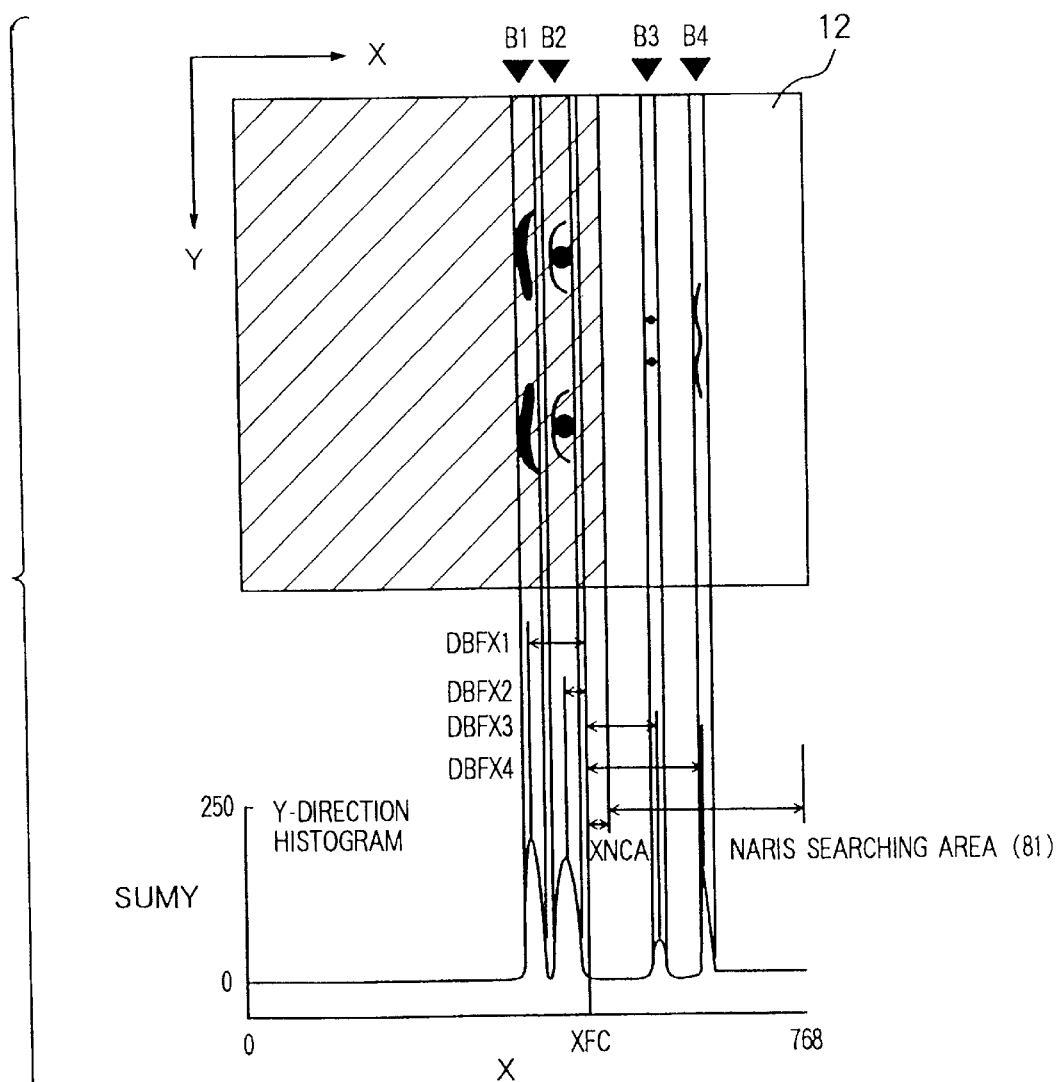
FIG. 31 is a schematic representation of the process of setting a naris searching area in a binary image, according to another embodiment of the invention.
Figure 32:
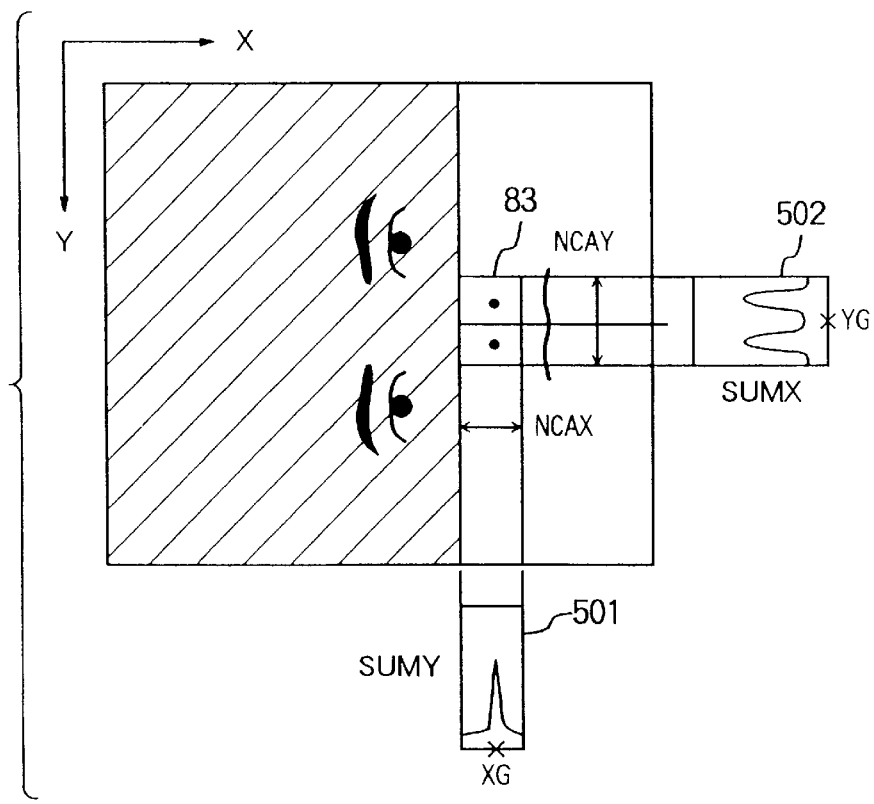
FIG. 32 is a schematic representation of defining a further limited area in the naris searching area in a binary image, so that nares are to be detected in that area.

FIGS. 31 and 32 relates to another method of extracting nares, wherein FIG. 31 is a schematic representation of setting a naris searching area in a binary image, and FIG. 32 is a schematic representation of defining a further limited area in the naris searching area in a binary image, so that nares are to be detected in that area.

As shown in FIG. 31, in the binary image 12 according to the present invention, the position (XFC, YFC) of the face centroid 7 is located between eye areas and naris areas regardless of the existence of glasses. Thus, a naris searching area 81 is given as an area lower than a line extending in the horizontal direction of the face passing through a point which is located below the face centroid 7 wherein this point is a predetermined distance XNCA apart downward from the face centroid in the X-direction or the vertical direction of the face. Then, nares are detected from the candidate areas Bij in this naris searching area 81. In the above process, although the distance XNCA may be set to a fixed value corresponding to about 20 picture elements, the distance XNCA may also be determined as follows. The peak point of the Y-direction histogram is employed as the representative point X-coordinate XBi of the band-shaped area Bi, and the distance DBFXI between XBi and XFC is determined for each band-shaped area. The distance XNCA is then determined according to the following equation:

$$XNCA = XNCAO + CD*\Sigma iXBi/n \quad (13)$$

According to this technique, the naris searching area 81 can be set in a proper fashion regardless of the variations in shape of a face from person to person. In the above equation, XNCAO is the reference value corresponding to about 20 picture elements, CD is the weighting factor about 0.2, and n is the peak number of the Y-direction histogram. If CD is varied in a step fashion with the peak number n so that CD increases as n increases, then the naris area can be set in a more reliable fashion regardless of the existence of glasses.

Thus, in this embodiment, the process of extracting a naris area is performed in the limited naris searching area 81 thereby ensuring that nares can be readily extracted with a small amount of calculation regardless of the existence of glasses.

In the example shown in FIG. 32, a naris extraction area 83 is defined in the above-described naris searching area 81 so that the process of extracting nares can be performed in the further restricted area. The naris extraction area 83 has an upper side coincident with the upper side of the naris searching area 81. The height NCAX of the naris extraction area 83 is determined using the Y-direction histogram 501 so that the naris extraction area 83 contains a band-shaped area Bi which is in the naris searching area 81 at the location nearest to the above-described upper side. On the other hand, the width NCAY is determined so that the width NCAY has a predetermined value for example 100 picture elements extending in the Y direction passing through the center point whose Y-coordinate is equal to the Y-coordinate YFC of the face centroid 7. Finally, the centroid XG of Y-direction histogram 501 and the centroid YG of the X-direction histogram 502 of the naris extraction area 83 are calculated and the resultant coordinates (XG, YG) are employed as the middle point between naris areas.

In this embodiment, as described above, the process of extracting nares is performed in a further limited area, and the middle point between naris areas is determined simply by calculating the centroid of picture elements in the above limited naris extraction area. Thus it is possible to extract nares very quickly.

Embodiment 14

In Embodiment 13 described above, the naris searching area 81 is defined as an area lower than the face centroid and the naris extraction area 83 is then defined in this naris searching area 81 so as to limit extraction process in this narrow area 83. Alternatively, in this embodiment, a naris extraction area 83 (not shown) is defined in a naris searching area 80 in the band shape extending parallel to the face center line 8 shown in Embodiment 11 whereby the middle point between naris areas is determined. In this case, the naris extraction area 83 is defined so that the upper side of the naris extraction area 83 is apart by a predetermined distance XNCA from the X-coordinate XFC of the face centroid and the height NCAX of the naris extraction area 83 is set in the same manner as in the previous embodiment. The width NCAY is set to a value equal to the band width NCAW of the naris searching area 80. This technique is as effective as Embodiment 13.

Embodiment 15

Figure 33:
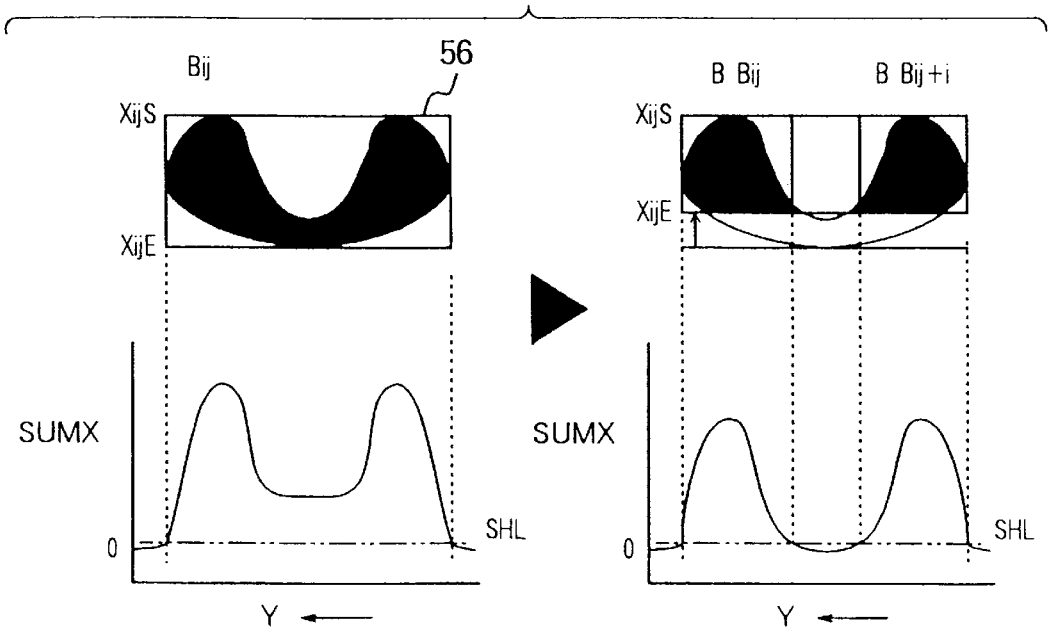
FIG. 33 is a schematic representation of the process of detection naris areas according to another embodiment of the invention.

FIG. 33 illustrates another method of detecting naris areas. In the example of binary image 12 shown in FIG. 33, two naris areas are combined into one due to a mustache or bridge. The present embodiment offers an effective method to extract naris areas under such a condition. When a naris searching area is limited in a particular area according to any of Embodiments described above, there is a possibility that nares cannot be detected in any candidate areas Bij and thus the naris-detection-failure is set. In this case, a candidate area Bij is produced so that the distance between the representative point coordinate of the candidate area Bij and the face center line 8 is less than a predetermined value for example 50 picture elements. Then as shown in FIG. 33, the X-direction ending coordinate YijE of the candidate area Bij is reduced by shifting upward the lower side of the candidate area Bij from its original position while calculating the X-direction histogram SUMX502. In this process, it is checked whether SUMX of some area becomes greater than a predetermined threshold thereby monitoring whether the original area is divided into a plurality of parts. If divided areas are found, these areas are assigned as candidate areas BBij and BBij+1, and naris areas are detected according to for example the technique disclosed in Embodiment 10.

Thus, in this embodiment, nares be extracted even if nares are connected to each other via a mustache or a bridge.

In Embodiments described above, it has been assumed that band-shaped areas or candidate areas are determined according to the predetermined fixed threshold value SHF of the histograms. Alternatively, the threshold value SHL may be varied with the peak value of the histogram so that band-shaped areas or candidate areas are properly separated even if the histogram has a complicated shape having a plural peaks.

Embodiment 16

Figure 34A:
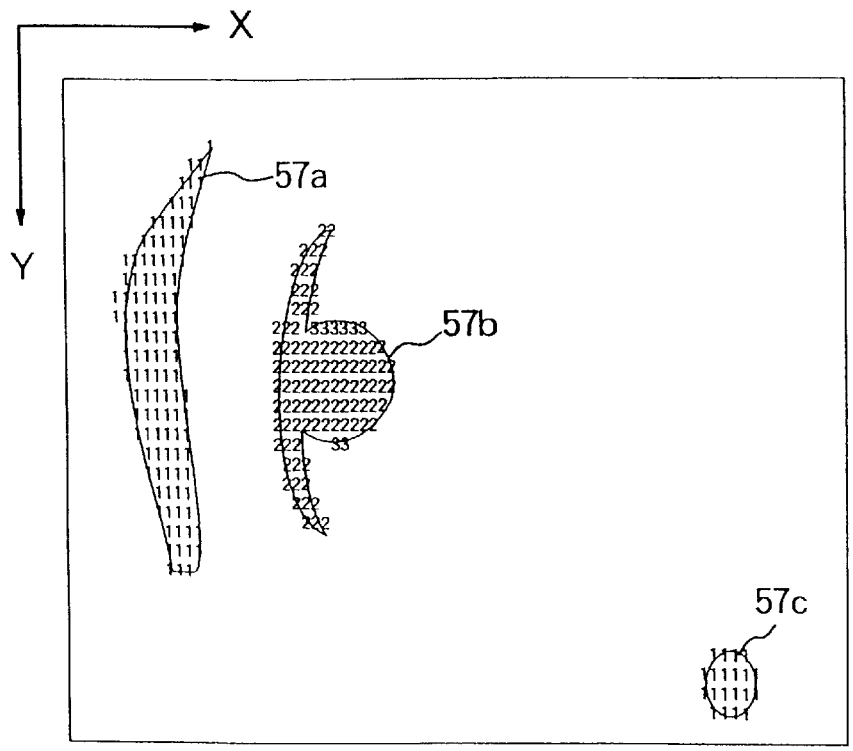
FIG. 34 is a schematic representation of the process of setting candidate areas by means of labelling, according to the present invention.
Figure 34B:
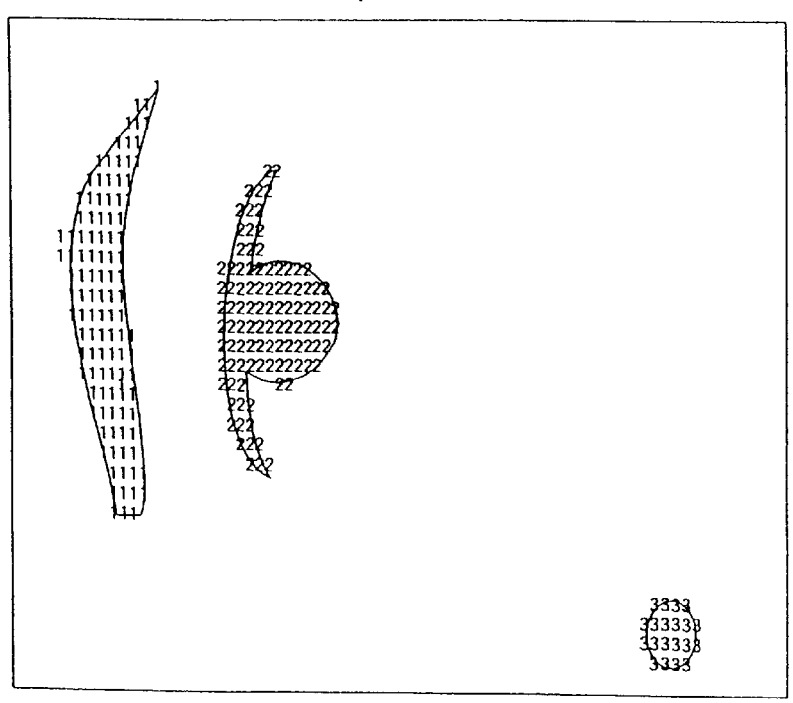
Figure 35:
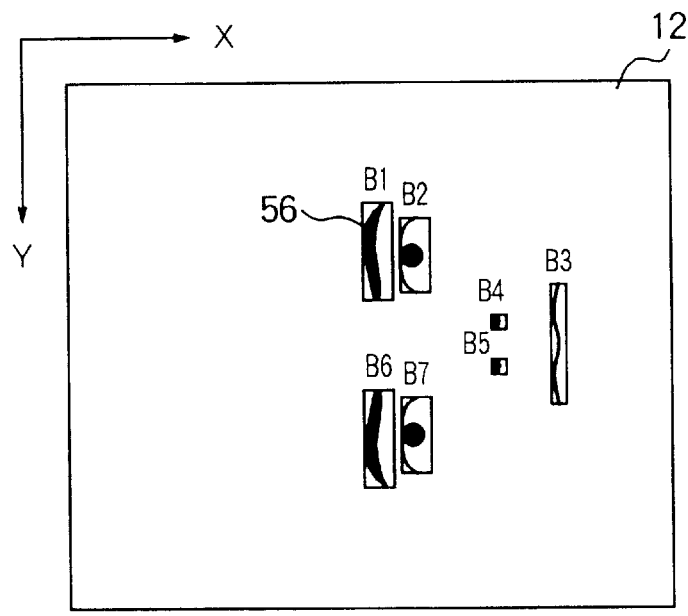
FIG. 35 illustrates a binary image in which candidate areas have been set by means of labelling.

FIGS. 34 and 35 are schematic representations of the process of setting candidate areas according to another embodiment, wherein FIG. 34 illustrates a technique of setting candidate areas by means of labelling, and FIG. 35 illustrates a binary image in which candidate areas have been set.

In the binary image 12, as shown at (a) in FIG. 34, the image is scanned in the primary direction along the X axis and in the secondary scanning direction along the Y axis while examining whether there are black picture elements. A black picture element which is found first in the X direction is labelled "1". If another black picture element is found at an isolated location in the X direction the incremented label number i is given to that black picture element while successive black picture elements are given the same label number. In the example shown in FIG. 34, black picture element blocks of an eyebrow area 57*a* and a naris area 57*c* are given label 1. On the other hand, in an eye area 57*b*, there is a partial separation between an upper black picture element part and a black picture element part of the iris-and-pupil, and thus different two labels "2" and "3" are given to these parts. Then, as shown at (b) in FIG. 34, the image is scanned again in the primary direction along the Y axis and in the secondary direction along the X direction so as to compare the picture elements adjacent in the Y direction. If it turns out that black picture elements at successive locations in the Y direction have different label numbers, then the smallest label number of those successive black picture elements is given to all these successive black picture elements. If the same label number is given to isolated black blocks, then re-labelling is performed so that the label number of the black picture element block increases with the Y coordinate of the end point of the block. The number of black picture elements contained in a black picture element block is less than a predetermined value, then the label number assigned to that block is cancelled and other label numbers are updated as required. In the example shown in FIG. 35, label numbers are given to a left eyebrow, left eye, line between lips, left naris, right naris, right eyebrow, and right eye so that the label number increases in this order. Then a candidate area Bi is defined for each black picture element block according to end point coordinates of the corresponding black picture element block in the X-direction and Y-direction so that a rectangular area Bi contains entirely a black picture element block with label number i. From these candidate areas Bi, naris areas and eye areas are then detected according to the technique of any Embodiment described above.

In the example described above, the labelling is performed over the entire area of the binary image 12 so as to setting the candidate areas Bi. Alternatively, the labelling may also be performed only within the naris searching areas 80, 81 or within the eye searching areas 40 thereby detecting naris areas or eye areas.

Thus, in this embodiment, it is possible to readily set candidate areas Bi even if an image includes a complicated black picture element pattern such as glasses or a mustache.

Embodiment 17

Figure 36:
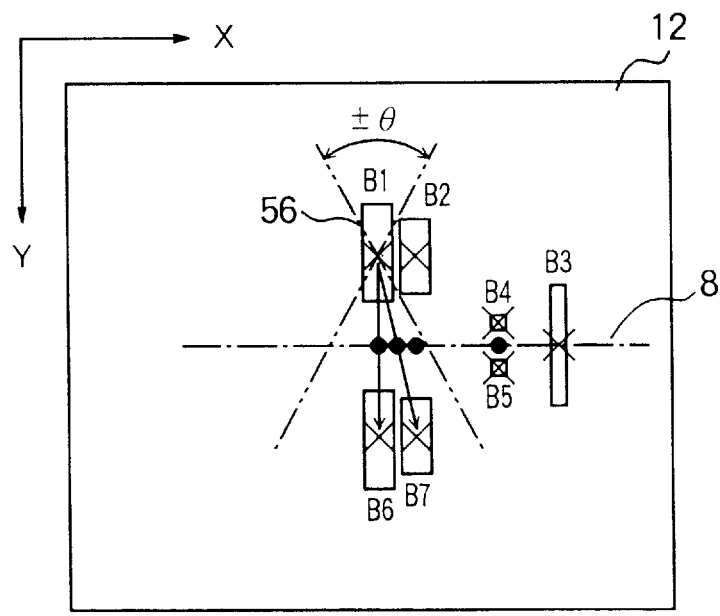
FIG. 36 is a schematic representation of the process of determining a face center line according to another embodiment of the present invention.

FIG. 36 illustrates a technique of determining a face center line 8 according to another embodiment. First, candidate areas Bi56 are set in a manner according to any Embodiment described above. Then the coordinates (XBCij, YBCij) of the middle point between the representative point (XBi, YBi) of each candidate area Bi56 and the representative point (XBj, YBj) of another candidate area Bj which is located within an area between two lines at an angle in the range of ±θ relative to the Y-axis of the image plane. A line which best fits to the middle points coordinates (XBCij, YBCij) is determined and is employed as the face center line 8.

In this technique, the vertical center line of the face can be determined quickly with a simple calculation even if the face is slanted in the image.

Embodiment 18

Figure 37:
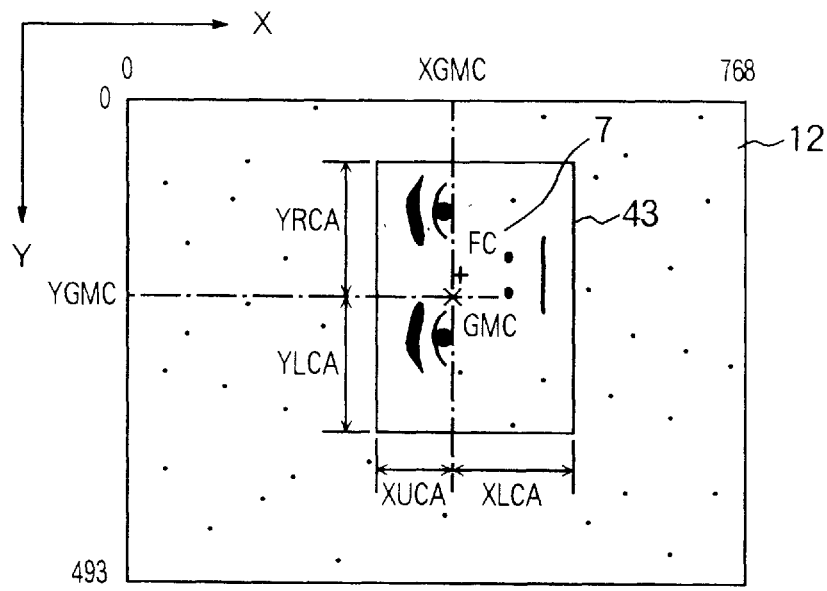
FIG. 37 illustrates a candidate-existing area disposed in a binary image.
Figure 38:
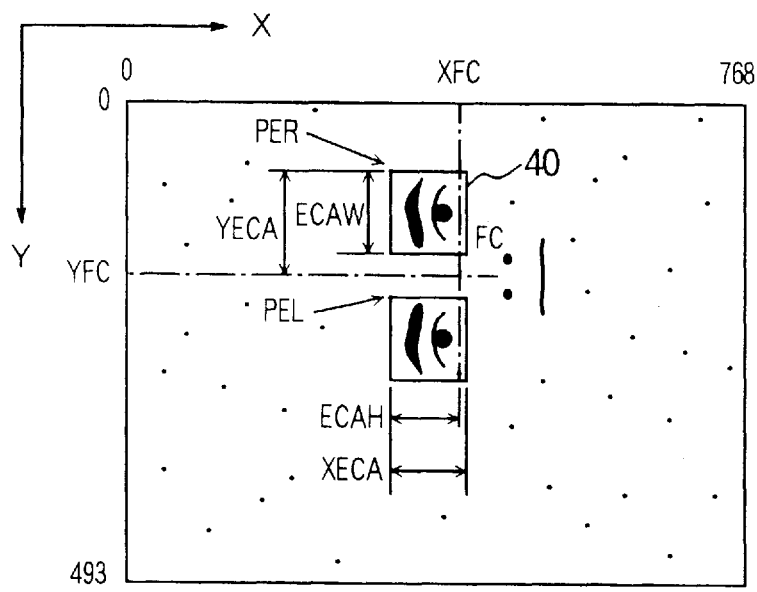
FIG. 38 illustrates eye searching areas in the candidate-existing area in the binary image.

FIGS. 37 and 38 illustrate another embodiment of candidate-existing area setting means for setting a candidate-existing area so that processing is performed in this limited area, wherein FIG. 37 illustrates a candidate-existing area disposed in a binary image, and FIG. 38 illustrates eye searching areas in the candidate-existing area in the binary image.

Referring to FIG. 37, the coordinates (XGC, YGC) of the centroid position CMC of black picture elements included in a binary image 12 is calculated for the entire binary image according to equation (2) described in Embodiment 1. If the image contains noise, as is the case in FIG. 37, due to insufficient intensity of illumination light which can occur for example in evening, or if a driver's face is not located at the center of the image and thus a fine pattern such as a back rest is partly incorporated into the image, the centroid position CMC of the entire image can shift from the face centroid 7 although the degree of the shift is slight in most cases. To avoid the above problem, in this embodiment, a rectangular candidate-existing area 43 is disposed so that its two sides parallel to the Y axis are apart from GMC by distances +XLCA and −XUCA, respectively, and the other two sides parallel to the X axis are apart from GMC by distance +YLCA and −YRCA, respectively. As shown in FIG. 37, the lengths of the sides of the candidate-existing area 43 are set to predetermined values satisfying the conditions XLCA>XUCA and YLCA=YRCA so that the candidate-existing area 43 may contain characteristic feature areas. In this embodiment, XLCA, XUCA, YLCA are preferably set to 200 picture element length, 120 picture element length, and 150 picture element length, respectively. Within this candidate-existing area 43, as shown in FIG. 38, the face centroid FC(XFC, YFC) is calculated and eye searching areas 40 are set at locations which are determined with reference to the face centroid FC in a similar manner to the previous embodiments.

In this embodiment, the processing required to extract eyes is performed in a limited area given in the above-described manner, and thus eyes can be extracted correctly without being influenced by background patterns or black blocks other than characteristic feature areas or noise.

Embodiment 19

Figure 39:
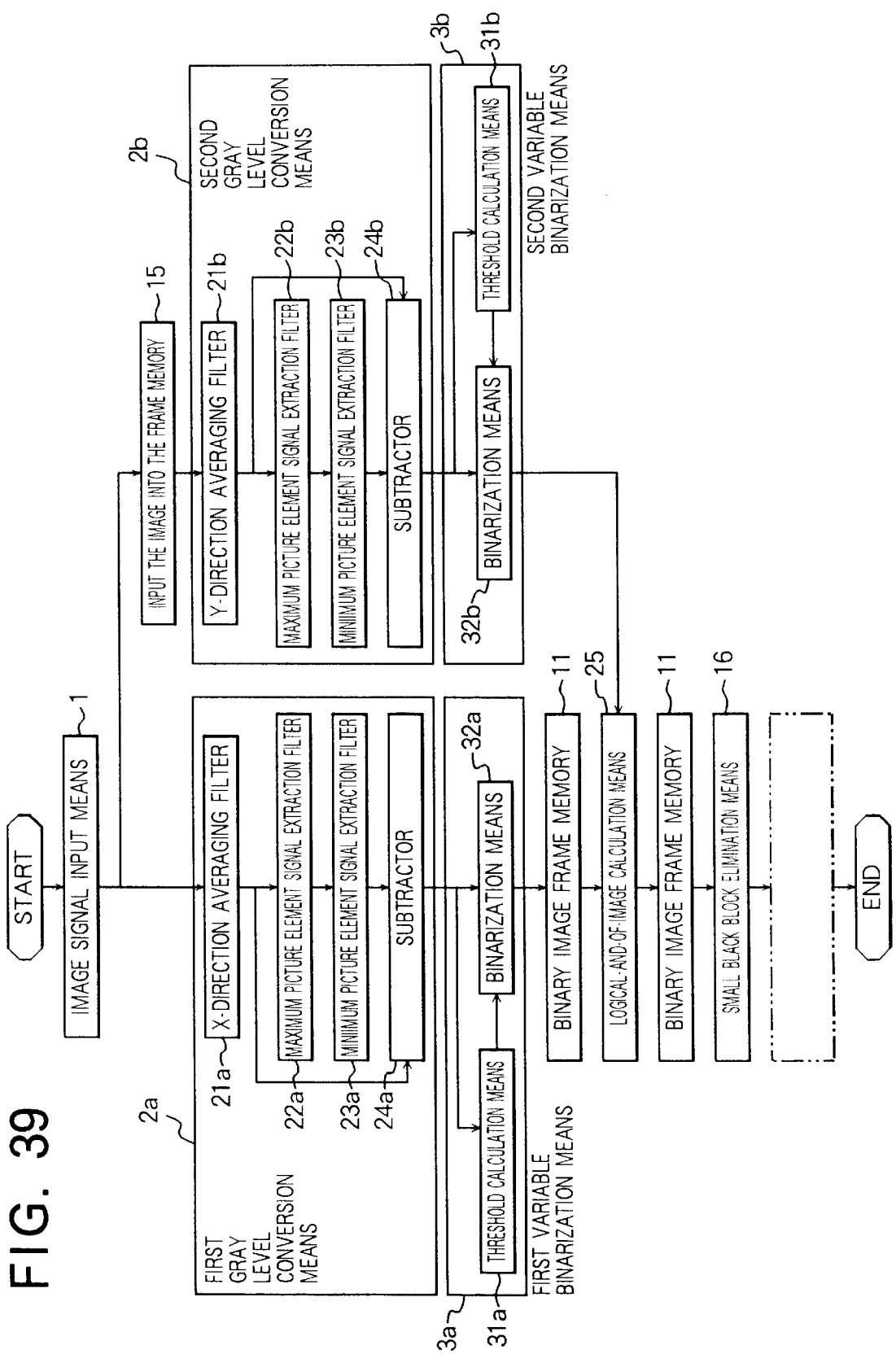
FIG. 39 is a block diagram illustrating the detailed construction of an apparatus of processing an image of a face according to another embodiment of the invention.
Figure 40:
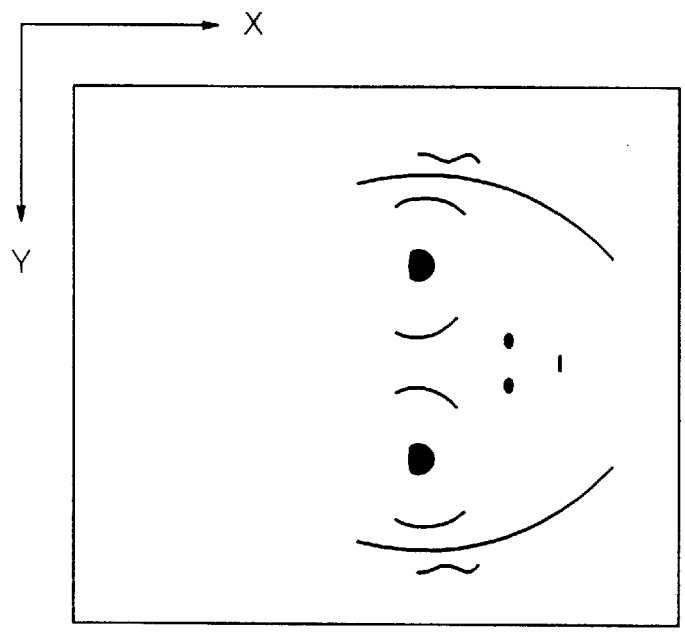
FIG. 40 illustrates a binary image processed by a Y-axis filter, according to another embodiment of the invention.
Figure 41:
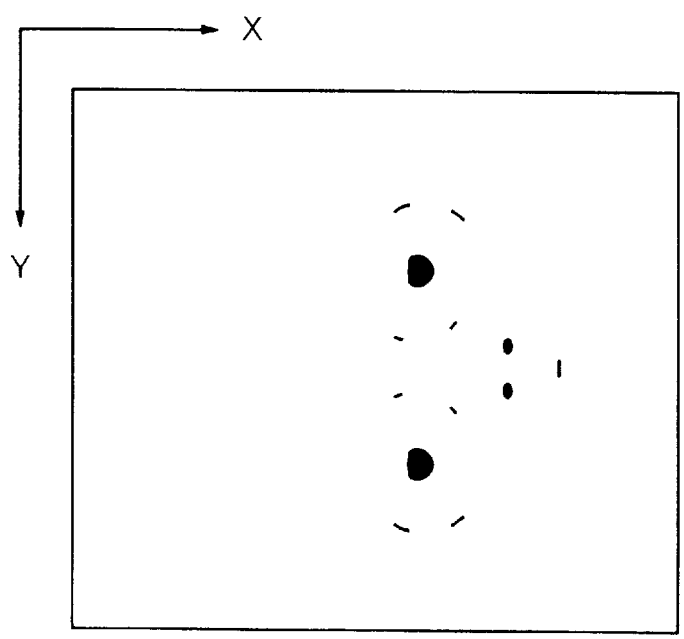
FIG. 41 is a binary image obtained after subjected to a logical-AND-of-image operation.
Figure 42:
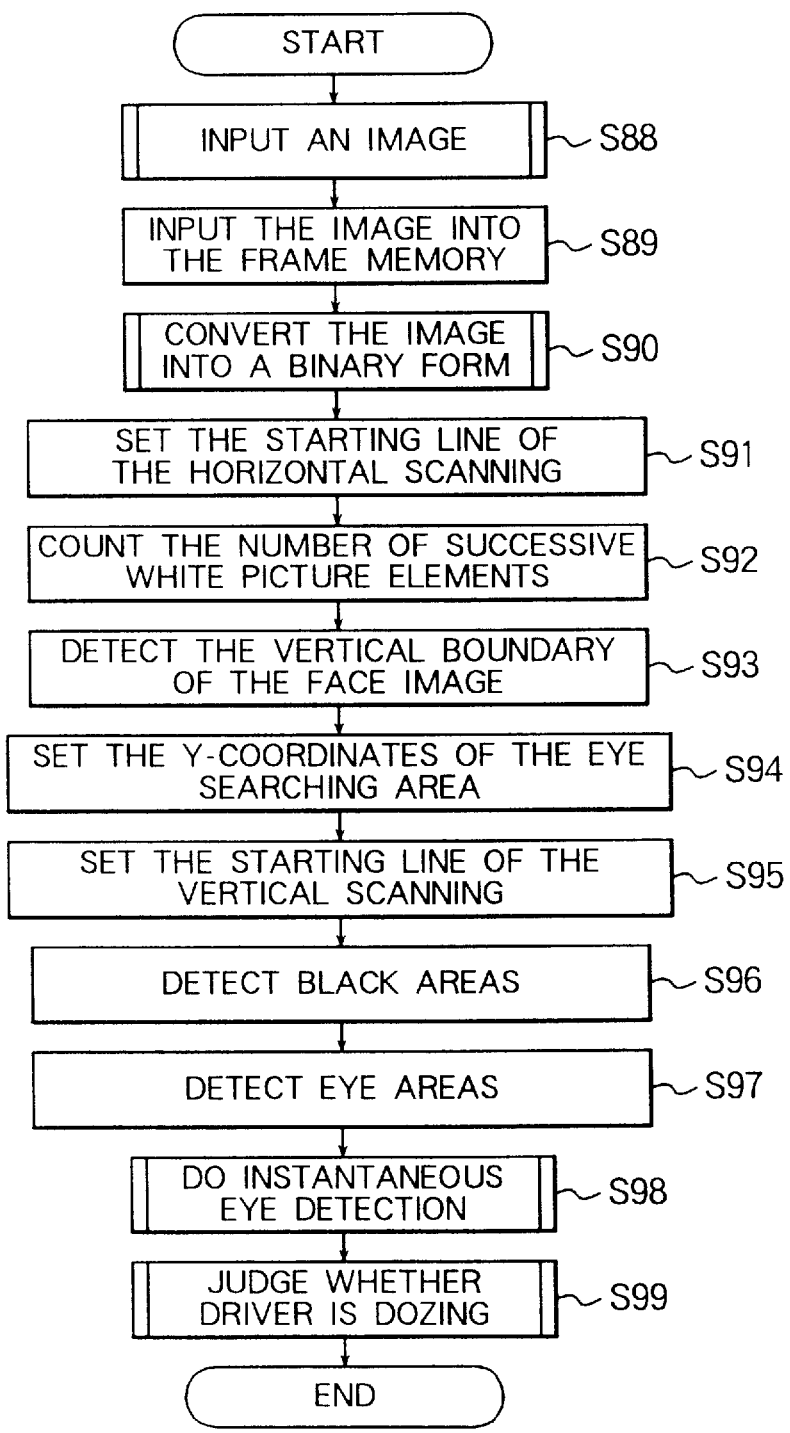
FIG. 42 is a flow chart of the process of detecting the condition of a driver according to a conventional technique.

FIGS. 39 to 41 illustrates another embodiment of an apparatus for processing an image of a face according to the present invention, wherein FIG. 39 illustrate the general construction of the apparatus, FIG. 40 illustrates a binary image output by a Y-direction filter, and FIG. 41 illustrates a binary image subjected to a logical-AND-of-image operation. The present embodiment is described in detail below with reference to these figures wherein FIGS. 10 and 11 will be also referred to as required.

Referring first to FIG. 39, an input face image such as that shown in FIG. 10 is output in the form of a digital halftone image from image signal input means 1, and divided into two signals. One is input to an averaging-along-X-axis filter 21a of a first gray level conversion means 2a, by which signal levels of three adjacent picture elements are averaged and thus high spatial frequency noise is removed. The output signal of the averaging-along-X-axis filter 21a is divided into two signals, and one is applied to a subtractor 24a which serves as a differential circuit via a maximum picture element signal extraction filter 22a and a minimum picture element signal extraction filter 23a, while the other signal is applied directly to the subtractor 24a. The subtractor 24a outputs two difference signals. These output signals are applied to binarization means 32a and threshold calculation means 31a respectively of a first variable binarization means 3a. The threshold calculation means 31a determines a threshold value and the binarization means 32a converts the received signal into a binary signal with reference to the threshold value given by the threshold calculation means 31a. As a result, a binary image containing only black-level areas smaller in the X-direction dimension than the above-described filter length is obtained as shown in FIG. 11. The obtained binary image is then stored in a binary image frame memory 11.

The other output signal of the image signal input means 1 is temporarily stored in a frame memory 15, and then read from the frame memory 15 in the Y scanning direction. The signal read from the frame memory 15 is applied to a Y-axis averaging filter 21b of second gray level conversion means 2b in which the signal levels of three adjacent picture elements are averaged. The output signal of the Y-axis averaging filter 21b is divided into two signals, and one is applied to a subtractor 24b which serves as a differential circuit via a maximum picture element signal extraction filter 22b and a minimum picture element signal extraction filter 23ba while the other signal is applied directly to the subtractor 24b. The output signal of the subtractor 24b is applied to binarization means 32b and threshold calculation means 31b of a second variable binarization means 3b. The threshold calculation means 31b determines a threshold value and the binarization means 32b converts the received signal into a binary signal with reference to the threshold value given by the threshold calculation means 31b. As a result, a binary image containing only black-level areas smaller in the Y-direction dimension than the above-described filter length is obtained as shown in FIG. 40. In the above process, the filter length is preferably set to a value corresponding to 28 picture elements as in Embodiment 1.

Then, the binary image shown in FIG. 11 stored in the binary image frame memory 11 and the binary image shown in FIG. 40 output from the binarization means 32b are subjected to a logical AND operation with logical-AND-of-image calculation means 25. As a result, only those black areas overlapping between these two binary images are extracted and thus an image such as that shown in FIG. 41 is obtained. In this image, only black areas which are smaller in both dimensions along X- and Y-directions than 28 picture element length are extracted, and therefore iris-and-pupils and nares are readily extracted without being influenced by glasses or a mustache. The resultant binary image is stored again in the binary image frame memory 11. The binary image is then read from the binary image frame memory 11 and applied to small black block elimination means 16, which removes small black blocks with dimensions less than 10 picture elements such as corner portions of glasses. Then eye areas are extracted in a similar manner to Embodiment 1.

In this embodiment, as in Embodiment 1, binarization can be performed correctly without disturbance for example due to shading of sunlight and substantially only characteristic feature areas are extracted. Thus, only iris-and-pupils and naris areas remain in the image and thus the probability of correctly extracting eyes is enhanced.

While the present invention has been described with reference to specific embodiments, the description is illustrative of the invention and is not to be construed as limiting the invention. Various modifications may occur to those skilled in the art without departing from the true spirit and scope of the invention as defined by the appended claims. For example, although a camera having a CCD solid state imaging device is employed in the embodiments described above, solid state imaging devices of other types or picture tubes may also be employed. Furthermore, the present invention may be applied not only to an apparatus for processing an image of the face of a car driver but also to a general-purpose face image processing apparatus.

What is claimed is:

1. An apparatus for processing an image of a face, comprising:

a camera for taking an image of a face;

image signal input means for inputting an image signal from said camera;

gray level conversion means for converting a gray level of a face image input via said image signal input means in such a manner as to extract all black-level areas of the entire face image that are only smaller at least in the dimension along one image axis (X-axis), parallel or nearly parallel to a vertical direction of a face, than a predefined length corresponding to an up-to-down width of an eye;

variable binarization means for converting an output image of said gray level conversion means into a binary image according to a variable threshold;

eye searching area setting means for setting an eye searching area in a binary image provided by said variable binarization means;

candidate area setting means for setting one or more candidate areas in said eye searching area; and eye area detection means for detecting an eye area from said candidate areas;

wherein said gray level conversion comprises:

a maximum value extraction filter for redefining the signal level of each picture element of the face image received via said image signal input means by extracting a maximum signal level from a group of successive picture elements corresponding to said predefined length.

2. An apparatus for processing an image of a face, according to claim 1, wherein said gray level conversion means extracts black-level areas in a direction parallel to the a picture element scanning direction of said camera.

3. An apparatus for processing an image of a face, comprising:

a camera for taking an image of a face;

image signal input means for inputting an image signal from said camera;

first gray level conversion of means for converting a gray level of a face image input via said image signal input means in such a manner as to extract black-level areas smaller in the dimension along the X-axis which is parallel to a vertical direction of a face than a predefined length corresponding to an up-to-down width of an eye;

first variable binarization means for converting an output image of said first gray level conversion means into a binary image according to a variable threshold;

second gray level conversion means for converting the gray level of the face image via said image signal input means in such a manner as to extract black-level areas smaller in the dimension along the Y-axis perpendicular to the X-axis less than a predefined length corresponding to the up-to-down width of an eye;

second variable binarization means for converting an output image of said second gray level conversion means into a binary image according to a variable threshold;

logical-AND-of-image calculation means for calculating the product of binary images provided by said first and second variable binarization means;

eye searching area setting means for setting an eye searching area in a binary image obtained as a result of the logical AND operation;

candidate area setting means for setting one or more candidate areas in said eye searching area; and eye area detection means for detecting an eye area from said candidate areas from said centroid position of the face.

4. An apparatus for processing an image of a face, according to claim 1, wherein said gray level conversion means comprises:

a maximum value extraction filter for redefining the signal level of each picture element of the face image received via said image signal input means so that the signal level of said picture element is equal to the maximum of the signal levels of its neighboring picture elements located at successive positions in a predetermined range containing said picture element at its center position;

a minimum value extraction filter for redefining the signal level of each picture element output by said maximum value extraction filter so that the signal level of said picture element is equal to the minimum of the signal levels of its neighboring picture elements located at successive positions in a predetermined range containing said picture element at its center position; and a subtractor for subtracting the output of said minimum value extraction filter from the input face image.

5. An apparatus for processing an image of a face, according to claim 1, wherein said gray level conversion means comprises:

a maximum value extraction filter for redefining the signal level of each picture element of the face image received via said image signal input means so that the signal level of said picture element is equal to the maximum of the signal levels of picture elements selected one every predetermined number of picture elements from its neighboring picture elements located in a predetermined range containing said picture element at its center position;

a minimum value extraction filter for redefining the signal level of each picture element output by said maximum value extraction filter so that the signal level of said picture element is equal to the minimum of the signal levels of picture elements selected one every predetermined number of picture elements from its neighboring picture elements located in a predetermined range containing said picture element at its center position; and a subtractor for subtracting the output of said minimum value extraction filter from the input face image.

6. An apparatus for processing an image of a face, according to claim 1, wherein said variable binarization means performs binarization on picture elements lying on a scanning line on the basis of a binarization threshold determined as a function of the sum of at least the weighted peak level and the weighted average of the picture elements on the previous scanning line.

7. An apparatus for processing an image of a face, according to claim 1, wherein said eye searching area setting means includes face centroid detection means for calculating a centroid position of the face within said binary image, and said eye searching area setting means disposes two rectangular eye searching areas at two base positions on the right and left sides of the face, each base position being a predefined distance apart from said centroid position of the face, one side of each said rectangular eye searching area extending by a predefined distance from the corresponding base position in a direction along the X-axis which is parallel to the vertical direction of the face, another side of each said rectangular eye searching area extending by a predefined distance from the corresponding base position along the Y-axis which is parallel to the horizontal direction of the face.

8. An apparatus for processing an image of a face, according to claim 1, wherein said eye searching area setting means includes face centroid detection means for calculating a centroid position of the face within said binary image and also includes face center line detection means for calculating an X-axis vertical center line of the face, and said eye searching area setting means disposes two rectangular eye searching areas at two base positions on the right and left sides of the face, each base position being apart from said centroid position of the face by a predefined distance, one side of each said rectangular eye searching area extending parallel to said face center line by a predefined distance from the corresponding base position in a direction along the X-axis which is parallel to the vertical direction of the face, another side of each said rectangular eye searching area extending by a predefined distance from the corresponding base position along Y-axis which is parallel to the horizontal direction of the face.

9. An apparatus for processing an image of a face, according to claim 1, wherein said eye searching area setting means includes naris area detection means for detecting a naris area in said binary image, and said eye searching area setting means disposes two rectangular eye searching areas at two base positions on the right and left sides of the face, each base position being apart from the middle point between right and left naris areas by a predefined distance, one side of each said rectangular eye searching area extending by a predefined distance from the corresponding base position in a direction along the X-axis which is parallel to the vertical direction of the face, another side of each said rectangular eye searching area extending by a predefined distance from the corresponding base position along the Y-axis which is parallel to the horizontal direction of the face.

10. An apparatus for processing an image of a face, according to claim 1, wherein said eye area detection means includes X-direction vertical histogram calculation means for calculating the Y-direction horizontal profile of the sum of the binary levels taken along the X-axis which is parallel to the vertical direction of the face within a candidate area, and when the horizontal width of said candidate area is within a predefined range, said eye area detection means judges whether said candidate area is an eye area or not on the basis of an evaluation function including both the representative value of the magnitude said vertical histogram and the representative value of the shape of said vertical histogram.

11. An apparatus for processing an image of a face, according to claim 10, wherein said eye area detection means includes memory means for storing the evaluation function value of each candidate area in said two right and left rectangular eye searching areas, said evaluation function value being stored for each image, and said eye area detection means examines the evaluation function values stored in said memory means and regards a candidate area having a maximum variation in the evaluation function value among a predetermined number of images as an eye.

12. An apparatus for processing an image of a face, according to claim 1, wherein said eye area detection means includes representative point calculation means for calculating a representative point of each candidate area which has been regarded as an eye in said eye searching area, and said eye area detection means ultimately selects a candidate area as an eye from said candidate areas regarded as an eye when said candidate area has the least distance to a face centroid wherein the distance is measured by the distance between the representative point of the candidate area and the face centroid.

13. An apparatus for processing an image of a face, according to claim 1, wherein said eye area detection means includes representative point calculation means for calculating a representative point of each candidate area which has been regarded as an eye in each eye searching area, and said eye area detection means ultimately identifies one right candidate area as right and left eye, respectively, from said candidate area regraded as right and left eyes when said candidate areas have a least distance to a face centroid, said least distance being less than a predetermined value, said distance being measured by the distance between the representative point of the candidate area and the face centroid.

14. An apparatus for processing an image of a face, according to claim 9, wherein said naris area detection means includes:
candidate area setting means for setting one or more candidate areas in said binary image;
face center line detection means for determining an X-axis vertical center line of the face in said binary image; and
naris searching area setting means for disposing a naris searching area between two parallel lines, one parallel line being at the right of said face center line, the other being at the left of said face center line, each line being a predefined constant distance apart from said face center line;
whereby a nares is detected from said candidate areas contained in said naris searching area.

15. An apparatus for processing an image of a face, according to claim 14, wherein said naris searching area setting means includes candidate area representative point calculation means for calculating the representative point coordinates of each candidate area disposed in said binary image, whereby the average distance between the Y-coordinates of the representative points of candidate areas having the same vertical representative point coordinates and the Y-coordinates of the face center line is calculated, and the distance between said parallel lines is determined as a function of said average distance.

16. An apparatus for processing an image of a face, according to claim 9, wherein said naris area detection means includes:
candidate area setting means for setting one or more candidate areas in said binary image;
face centroid detection means for calculating a centroid position of the face in said binary image; and
naris searching area setting means by which a naris searching area is set in an area lower than a horizontal line which is apart downward by a predetermined distance from the face centroid;
whereby a nares is detected from said candidate areas contained in said naris searching area.

17. An apparatus for processing an image of a face, according to claim 16, wherein said naris searching area setting means includes:
candidate area representative point calculation means for calculating the representative point coordinates of each candidate area disposed in said binary image,
band-shaped area representative point calculation means for creating a band-shaped area including candidate areas whose X-coordinate of the representative point is equal to each other, and then employing said X-coordinate as the X-coordinate of the representative point of said band-shaped area;
wherein said predetermined distance is given as a function of the number of areas included in said band-shaped area and the difference in X-coordinate between said face centroid and the representative point of each band-shaped area.

18. An apparatus for processing an image of a face, according to claim 14, further comprising naris extraction area limiting means for defining a limited detection area in said naris searching area so that a naris detection operation is performed in said limited detection area, whereby the centroid of the picture elements in said limited naris extraction area is regarded as the middle point between naris areas.

19. An apparatus for processing an image of a face, according to claim 9, wherein said naris area detection means includes: candidate area setting means for setting one or more candidate areas in said binary image; and candidate area representative point calculation means for calculating the coordinates of the representative point of each candidate area; whereby the Y-direction distance between candidate areas whose X-coordinate of the representative point is identical to each other is calculated, and then said Y-direction distance is compared with a predefined reference naris-to-naris distance, and thus a pair of candidate areas whose distance between their representative points is closest to said reference naris-to-naris distance is regarded as nares.

20. An apparatus for processing an image of a face, according to claim 9, wherein said naris area detection means includes: candidate area setting means for setting one or more candidate areas in said binary image; and candidate area representative point calculation means for calculating the coordinates of the representative point of each candidate area; whereby the Y-direction distance between candidate areas whose X-coordinate of the representative point is identical to each other is calculated, and naris areas are detected on the basis of an evaluation function including the aspect ratio of candidate areas and the difference in Y-coordinate between the representative points.

21. An apparatus for processing an image of a face, according to claim 9, wherein said naris area detection means includes:
candidate area setting means for setting one or more candidate areas in said binary image; candidate area limiting means for reducing the length of the vertical sides of each candidate area which has been set by said candidate area setting means wherein said reduction in length is performed by shifting upward the lower side of each candidate area; and
X-direction vertical histogram calculation means for calculating the Y-direction horizontal profile of the sum of the binary levels taken within each candidate area along the X-axis which is parallel to the vertical direction of the face;
whereby naris areas are detected judging from the change in the shape of said vertical histogram which occurs when the length of the vertical sides of the candidate area is reduced.

22. An apparatus for processing an image of a face, according to claim 7, wherein the coordinates of said centroid position of the face are defined by the centroid coordinates of the picture elements in said binary image.

23. An apparatus for processing an image of a face, according to claim 7, further includes:
Y-direction horizontal histogram calculation means for calculating the X-direction vertical profile of the sum of the binary levels taken within said binary image along the Y-axis which is parallel to the horizontal direction of the face;
band-shaped area setting means for setting band-shaped areas extending parallel to the horizontal direction of the face, said band-shaped areas being determined on the basis of said horizontal histogram calculation means;
band-shaped area representative point calculation means for calculating the X-coordinates of the representative points of said band-shaped areas; and
X-direction vertical histogram calculation means for calculating the Y-direction horizontal profile of the sum of the binary levels taken over the range of the X-direction width of said band-shaped areas said sum being taken for all band-shaped areas;
wherein the X-coordinate of said centroid position of the face is defined by the average coordinate of the representative points of band-shaped areas and the Y-coordinate of said centroid position of the face is defined by the centroid coordinate of said vertical histogram.

24. An apparatus for processing an image of a face, according to claim 7, further comprising candidate area setting means for setting one or more candidate areas in said binary image, and the coordinates (Xg, Yg) of said centroid position of the face is defined using the number Ni of black level picture elements existing in each candidate area i, the coordinates (Xi, Yi) of the representative point of each candidate area i, and the number m of the candidate areas i according to the following equation:

$Xg = \Sigma mNiXi/\Sigma Ni,$ $Yg = \Sigma mNiYi/\Sigma Ni.$

25. An apparatus for processing an image of a face, according to claim 8, wherein said face center line detection means includes:
X-direction vertical histogram calculation means for calculating the Y-direction horizontal profile of the sum of the binary levels taken along the X-axis which is parallel to the vertical direction;
band-shaped area setting means for setting one or more band-shaped areas extending parallel to the horizontal direction of a face, said band-shaped areas being set on the basis of said vertical histogram calculation means; and
band-shaped area centroid detection means for calculating the centroid position of picture elements existing in each said band-shaped area;
whereby an X-axis vertical center line of the face is determined from the centroid position of the band-shaped areas.

26. An apparatus for processing an image of a face, according to claim 8, wherein said face center line detection means includes:
candidate area setting means for setting one or more candidate areas in said binary image;
candidate area representative point calculation means for calculating the representative point coordinates of each candidate area in said binary image;
band-shaped area representative point calculation means for calculating the average of the Y-coordinates of the representative points of candidate areas existing in a band-shaped area which is produced so that candidate areas whose representative point X-coordinate is equal to each other are included in said band-shaped area, and employing the resultant average as the representative point Y-coordinate of said band-shaped area;
thereby determining the X-axis vertical center line of the face on the basis of said representative points of band-shaped areas.

27. An apparatus for processing an image of a face, according to claim 8, wherein said face center line detection means includes:
candidate area setting means for setting one or more candidate areas in said binary image;
candidate area representative point calculation means for calculating the representative point coordinates of each candidate area in said binary image; and
point-on-face-center line candidate calculation means for calculating the coordinates of the middle point between the representative point of each candidate area and the representative point of another candidate area which exists within an area between two lines at an angle in the range of $\pm\theta$ relative to the Y-axis of the image plane;
whereby the X-axis vertical center line of the face is determined on the basis of said point-on-face-centerline candidate.

28. An apparatus for processing an image of a face, according to claim 7, further comprising:
first centroid detection means for calculating the centroid position of all picture elements in said binary image; and
candidate-existing area setting means for setting a rectangular area having a predetermined size around said first centroid position.

29. An apparatus for processing an image of a face, according to claim 7, wherein said eye searching area setting means sets an eye searching area in such a manner that a black block-existing area in a rectangular shape is defined so that the X- and Y-coordinates of its end points in the X- and Y-directions are equal to the minimum and maximum X-coordinates and the minimum and maximum Y-coordinates of all end points of black block areas present in said binary image, each said black block areas containing a predetermined number of successive black picture elements, and the starting coordinates and the lengths of the sides of said eye searching area are given as a function of the starting coordinates and the lengths of the sides of said black block-existing area or as a function of the starting coordinates of said black block-existing area and the ratios of the lengths of the sides of said black block-existing area to the respective reference lengths.

30. An apparatus for processing an image of a face, according to claim 29, further comprising memory means for storing the lengths of the sides of said black block-existing area for each image, and said reference lengths of the sides are set to the maximum lengths of the sides among a predetermined number of images stored in said memory means or set to the lengths of the sides which appear most frequently.

31. An apparatus for processing an image of a face, according to claim 9, wherein said eye searching area setting means sets an eye searching area so that said eye searching area's starting coordinate and its length along the Y-axis which is parallel to the horizontal direction of the face are determined as a function of the distance between naris areas detected by said naris area detection means or as a function of the ratio of the distance between naris areas to a reference value.

32. An apparatus for processing an image of a face, according to claim 9, wherein said eye searching area setting means sets an eye searching area so that said eye searching area's starting coordinate and its length along the X-axis, which is parallel to the vertical direction of the face, are determined as a function of at least one of the following:

(1) the distance between naris areas detected by said naris area detection means and the area of the naris areas;

(2) the distance between naris areas detected by said naris area detection means and the aspect ratio of the naris areas;

(3) the ratio of the distance between naris areas detected by said naris area detection means to its reference value and the ratio of the area of the naris areas to its reference value; and (4) the ratio of the distance between naris areas detected by said naris area detection means to its reference value and the ratio of the aspect ratio of the naris area to its reference value.

33. An apparatus for processing an image of a face, according to claim 31, further including memory means for storing said distance between the naris areas and the lengths of the sides of the naris areas for each image, wherein the respective reference values of the distance between the naris areas, the area of the naris areas, and the aspect ratio of the naris areas are set to the maximum values of the distance between the naris areas among a predetermined number of images stored in said memory means or set to the most-frequently-appearing values of the distance between the naris areas, the area of the naris areas, and the aspect ratio of the naris areas.

34. An apparatus for processing an image of a face, according to claim 1, wherein said candidate area setting means includes:

Y-direction horizontal histogram calculation means for calculating the X-direction vertical profile of the sum of the binary levels taken along the Y-axis which is parallel to the horizontal direction of the face;

band-shaped area setting means for setting a band-shaped area extending parallel to the X-axis which is parallel to the vertical direction of the face, said band-shaped area being determined on the basis of said horizontal histogram calculation means; and X-direction vertical histogram calculation means for calculating the Y-direction horizontal profile of the sum of the binary levels taken over the range in the X-direction width of said band-shaped area;

whereby said candidiate area is set as a rectangular area having a height equal to said width of the band-shaped area and having a width equal to the length in the Y-axis horizontal direction of the face determined on the basis of said vertical histogram.

35. An apparatus for processing an image of a face, according to claim 1, wherein said candidate area setting means includes black block area extracting means for extracting, by means of labeling, an isolated black block area containing a predetermined number of or more successive black level picture elements of the binary image, and said candidate area setting means sets a candidate area in a rectangular shape so that the rectangular candidate area surrounds the end points in the X- and Y-directions of said labelled black block area.

36. An apparatus for processing an image of a face, comprising:

a camera for taking an image of a face;

image signal input means for inputting an image signal from said camera;

gray level conversion means for converting a gray level of a face image input via said image signal input means in such a manner as to extract all black-level areas of the entire face image that are only smaller at least in the dimension along one image axis (X-axis), parallel or nearly parallel to a vertical direction of a face, than a predefined length corresponding to an up-to-down width of an eye;

variable binarization means for converting an output image of said gray level conversion means into a binary image according to a variable threshold;

eye searching area setting means for setting an eye searching area in a binary image provided by said variable binarization means;

candidate area setting means for setting one or more candidate areas in said eye searching area; and eye area detection means for detecting an eye area from said candidate areas;

wherein said gray level conversion means comprises:

a maximum value extraction filter for redefining the signal level of each picture element of the face image received via said image signal input means by extracting a maximum signal level from a group of successive picture elements corresponding to said predefined length; and a minimum value extraction filter for redefining the signal level of each picture element output by said maximum value extraction filter.

* * * * *